United States Patent
Ehara et al.

(10) Patent No.: US 8,936,854 B2
(45) Date of Patent: Jan. 20, 2015

(54) METHOD OF FORMING ANTIFOULING COATING FILM

(75) Inventors: Ryo Ehara, Neyagawa (JP); Haruyasu Minami, Neyagawa (JP); Soichiro Tomiyama, Neyagawa (JP)

(73) Assignee: Nippon Paint Marine Coatings Co., Ltd., Hyogo (JP)

( * ) Notice: Subject to any disclaimer, the term of this patent is extended or adjusted under 35 U.S.C. 154(b) by 0 days.

(21) Appl. No.: 13/576,865

(22) PCT Filed: Jun. 14, 2011

(86) PCT No.: PCT/JP2011/063596
§ 371 (c)(1),
(2), (4) Date: Aug. 2, 2012

(87) PCT Pub. No.: WO2011/162129
PCT Pub. Date: Dec. 29, 2011

(65) Prior Publication Data
US 2012/0294825 A1 Nov. 22, 2012

(30) Foreign Application Priority Data
Jun. 23, 2010 (JP) .................... 2010-142566

(51) Int. Cl.
*C09D 5/16* (2006.01)
*B32B 27/30* (2006.01)
*C09D 143/04* (2006.01)
*C09D 201/10* (2006.01)
*B05D 5/08* (2006.01)

(52) U.S. Cl.
CPC .............. *C09D 5/165* (2013.01); *C09D 5/1675* (2013.01); *C09D 143/04* (2013.01); *C09D 201/10* (2013.01); *B05D 5/083* (2013.01); *B05D 2201/00* (2013.01); *B05D 2202/00* (2013.01); *B05D 2203/30* (2013.01)
USPC ........... 428/500; 428/522; 524/143; 524/190; 524/297; 524/413; 524/430; 525/191; 525/213; 525/222; 526/240; 526/279; 526/319; 526/323.1; 526/333

(58) Field of Classification Search
None
See application file for complete search history.

(56) References Cited

U.S. PATENT DOCUMENTS

| | | | |
|---|---|---|---|
| 4,883,852 A | 11/1989 | Masuoka et al. | |
| 6,846,878 B2 * | 1/2005 | Yamamori et al. | 525/100 |
| 2003/0139558 A1 | 7/2003 | Yamamori et al. | |
| 2006/0258772 A1 | 11/2006 | Sugihara et al. | |

FOREIGN PATENT DOCUMENTS

| | | | |
|---|---|---|---|
| CN | 1341493 A | | 3/2002 |
| CN | 1432585 A | | 7/2003 |
| CN | 1761727 A | | 4/2006 |
| EP | 2 489 710 | | 8/2012 |
| EP | 2 489 711 | | 8/2012 |
| JP | 2000-5692 | | 1/2000 |
| JP | 2001-226440 | * | 8/2001 |
| JP | 2002-66445 A | * | 3/2002 |
| JP | 2004-300410 | | 10/2004 |
| JP | 2006-503115 | | 1/2006 |
| JP | 2006-077095 | | 3/2006 |
| WO | WO 03/070832 A2 | | 8/2003 |
| WO | WO 2004/081121 A1 | * | 9/2004 |
| WO | WO 2008/105122 A1 | | 9/2008 |

OTHER PUBLICATIONS

Machine-generated translation of JP 2002-66445 into English.*
Translation of paragraphs [0006-0009] of JP 2002-66445 by human interpreter into English.*
International Search Report PCT/JP2011/063596 dated Sep. 20, 2011.
Chou et al., "A Fidelity Metric for Assessing Visual Quality of Color Images", Computer Communications and Networks, 2007, pp. 1154-1159.
Database WPI, Week 200625 Thomson Scientific, London, GB; AN 2006-235185 XP002691811.
International Search Report dated Mar. 1, 2013 issued in connection with Application No. EP11798015.
First Office Action Chinese Application No. 201180018425.X dated Apr. 16, 2013.

* cited by examiner

*Primary Examiner* — Marc Zimmer
(74) *Attorney, Agent, or Firm* — Foley & Lardner LLP

(57) ABSTRACT

Provided is a method of forming an antifouling coating film including the steps of [1] preparing a colored antifouling paint containing a prescribed Si-containing hydrolyzable resin and a color pigment such that a coating film having a target dry film thickness T completely hides a surface of an object to be coated, the colored antifouling paint has a color difference ΔE1 between the coating film having the thickness T and a coating film having a dry film thickness of 0.8 T, at least 2.0, and preferably the colored antifouling paint has a color difference ΔE2 between the coating film having the thickness T and a coating film having a dry film thickness of 1.2 T, less than 1, and [2] coating a surface of the object with the colored antifouling paint until the surface of the object is completely hidden by the coating film formed from the colored antifouling paint.

11 Claims, 2 Drawing Sheets

METHOD OF FORMING ANTIFOULING COATING FILM

TECHNICAL FIELD

The present invention relates to a method of forming an antifouling coating film on an object to be coated such as marine vessels and power generating plants, and more specifically to a method of substantially uniformly forming an antifouling coating film having a prescribed dry film thickness in a simplified manner.

BACKGROUND ART

A surface of such an underwater structure as marine vessels and power generating plants is painted with an antifouling paint in order to prevent adhesion of such aquatic organisms as acorn barnacle, mussels, and algae. Since the underwater structures painted with the antifouling paint are normally large in size, painting with an antifouling paint is often carried out by using a crane truck or the like. It is not easy, however, to paint the entire surface of an underwater structure having a large area uniformly to a prescribed film thickness.

An antifouling paint has a prescribed dry coating film thickness range (in particular, a minimum coating film thickness) necessary for exhibiting expected coating film performance (such as antifouling performance). For example, when a thickness is smaller than the prescribed minimum coating film thickness and even though a portion where a film thickness is insufficient is a part of the entire surface, expected antifouling performance cannot be provided to an underwater structure and an effective antifouling period is virtually shortened.

In order to address such a problem, for example, Japanese Patent Laying-Open No. 2000-005692 (PTL 1) discloses a method of forming an antifouling coating film by using such a film thickness determinable antifouling paint characterized in that a color difference between the film thickness determinable antifouling paint and an object to be coated, a color difference between a completely hiding coating film with a target dry film thickness and a coating film having a dry film thickness less than (target dry film thickness−50) μm, and a color difference between the completely hiding coating film with the target dry film thickness and a coating film having a dry film thickness exceeding (target dry film thickness+50) μm are each within a prescribed range and that a content of an antifouling agent and a color pigment is not greater than a prescribed value. According to such a film thickness determinable antifouling paint, whether the coating film has reached a prescribed film thickness or not can be determined by visually observing change in color difference between the coating film being applied and the object to be coated, and hence painting with the antifouling paint can be carried out substantially uniformly in a simplified manner, without excess or shortage in coating film thickness.

The film thickness determinable antifouling paint described in PTL 1 above, however, is relatively small in color difference between the coating film having the target dry film thickness and the coating film immediately before reaching the target dry film thickness, and therefore it may sometimes be difficult to determine whether a coating film being applied has reached a prescribed film thickness or not by visual observation by a paint operator, and there has been a room for improvement.

CITATION LIST

Patent Literature

PTL 1: Japanese Patent Laying-Open No. 2000-005692

SUMMARY OF INVENTION

Technical Problem

The present invention was made to solve the above-described problem, and an object thereof is to provide a method allowing extremely easy determination as to whether a coating film being applied has reached a prescribed film thickness or not and thus allowing a uniform antifouling coating film having a prescribed dry film thickness to be formed more accurately in a more simplified manner.

Solution to Problem

The present invention is directed to a method of forming an antifouling coating film on a surface of an object to be coated, and characterized by including the steps [1] and [2] below:

[1] preparing a colored antifouling paint containing a hydrolyzable resin and a color pigment and satisfying such conditions that (a) a coating film formed from the colored antifouling paint having a target dry film thickness T completely hides the surface of the object to be coated, (b) a color difference $\Delta E1$ between the coating film formed from the colored antifouling paint having the target dry film thickness T and a coating film formed from the colored antifouling paint having a dry film thickness of 0.8 T is equal to or greater than 2.0, and (c) the hydrolyzable resin above contains a hydrolyzable resin (i) and/or a hydrolyzable resin (ii); and

[2] coating the surface of the object to be coated with the colored antifouling paint until the surface of the object to be coated is completely hidden by the coating film formed from the colored antifouling paint.

Here, hydrolyzable resin (i) above is a hydrolyzable resin having a metal-atom-containing group containing a divalent metal atom M and at least one type of a silicon-containing group selected from the group consisting of a group expressed in a general formula (I)

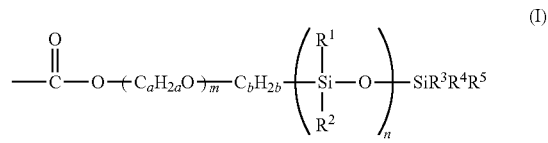

[where a and b each independently represent an integer from 2 to 5, m represents an integer from 0 to 50, n represents an integer from 3 to 80, and $R^1$ to $R^5$ each independently represent an alkyl group, an alkoxy group, a phenyl group, a substituted phenyl group, a phenoxy group, or a substituted phenoxy group], a group expressed in a general formula (II)

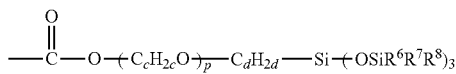

[where c and d each independently represent an integer from 2 to 5, p represents an integer from 0 to 50, and $R^6$, $R^7$, and $R^8$ each independently represent an alkyl group, $R^a$, or $R^b$, with $R^a$ being

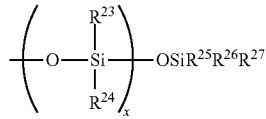

(where x represents an integer from 0 to 20 and $R^{23}$ to $R^{27}$ are identical or different and represent an alkyl group), with $R^b$ being

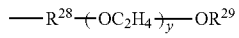

(where y represents an integer from 1 to 20 and $R^{28}$ and $R^{29}$ are identical or different and represent an alkyl group)], a group expressed in a general formula (III)

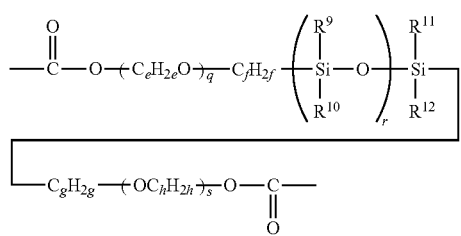

[where e, f, g, and h each independently represent an integer from 2 to 5, q and s each independently represent an integer from 0 to 50, r represents an integer from 3 to 80, and $R^9$ to $R^{12}$ each independently represent an alkyl group, an alkoxy group, a phenyl group, a substituted phenyl group, a phenoxy group, or a substituted phenoxy group], and a group expressed in a general formula (IV)

[where i, j, k, and l each independently represent an integer from 2 to 5, t and u each independently represent an integer from 0 to 50, v and w each independently represent an integer from 0 to 20, and $R^{13}$ to $R^{22}$ are identical or different and represent an alkyl group].

In addition, hydrolyzable resin (ii) above is a hydrolyzable resin having at least one type of a silicon-containing group selected from the group consisting of the groups expressed in the general formulae (I), (II), (III), and (IV) above and a triorganosilyloxy carbonyl group expressed in a general formula (V)

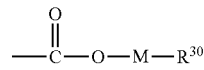

[where $R^{40}$, $R^{41}$, and $R^{42}$ are identical or different and represent a hydrocarbon residue having a carbon number from 1 to 20].

Color difference ΔE1 above is preferably not smaller than 2.5. In addition, the colored antifouling paint above preferably satisfies such a condition (d) that a color difference ΔE2 between the coating film formed from the colored antifouling paint having the target dry film thickness T and a coating film formed from the colored antifouling paint having a dry film thickness of 1.2 T is less than 1. Color difference ΔE2 is more preferably not greater than 0.5.

In the method of forming an antifouling coating film according to the present invention, preferably, whether the surface of the object to be coated has completely been hidden or not is determined based on visual observation.

A content of the hydrolyzable resin above is preferably from 30 to 97 mass % in a paint solid content.

The metal-atom-containing group which hydrolyzable resin (i) above has is preferably at least one type of group selected from the group consisting of groups expressed in general formulae (VI) and (VII) below.

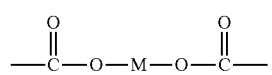

Here, in the general formula (VI) above, M represents a divalent metal atom and $R^{30}$ represents an organic acid residue or an alcohol residue.

$$—\overset{\overset{O}{\|}}{C}—O—M—O—\overset{\overset{O}{\|}}{C}— \quad (VII)$$

Here, in the general formula (VII) above, M represents a divalent metal atom.

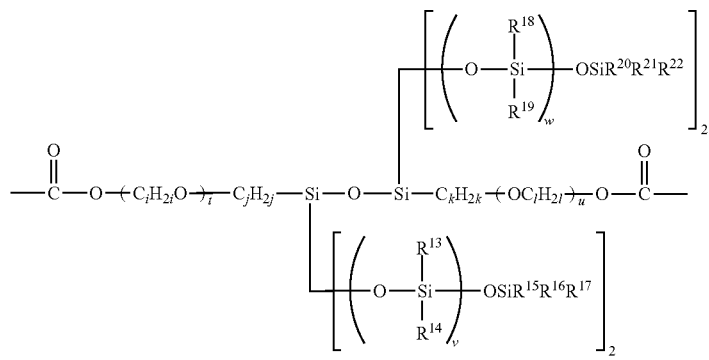

Hydrolyzable resin (i) above is preferably a resin including a constitutional unit derived from at least one type of a silicon-containing polymerizable monomer (a) selected from the group consisting of a monomer (a1) expressed in a general formula (I') below, a monomer (a2) expressed in a general formula (II') below, a monomer (a3) expressed in a general formula (III') below, and a monomer (a4) expressed in a general formula (IV') below and a constitutional unit derived from a metal-atom-containing polymerizable monomer (b) containing a divalent metal atom M.

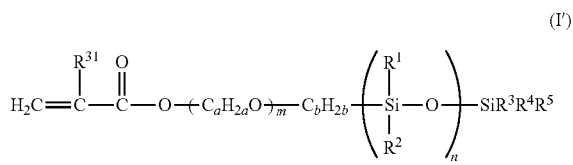
(I')

Here, in the general formula (I') above, $R^{31}$ represents a hydrogen atom or a methyl group, and a, b, m, n, and $R^1$ to $R^5$ represent the same meaning as described above.

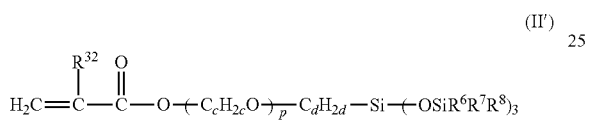
(II')

Here, in general formula (II') above, $R^{32}$ represents a hydrogen atom or a methyl group, and c, d, p, and $R^6$ to $R^8$ represent the same meaning as described above.

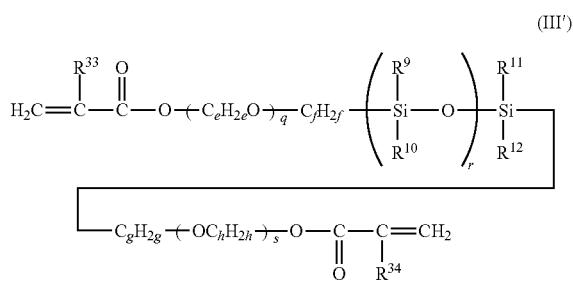
(III')

Here, in the general formula (III') above, $R^{33}$ and $R^{34}$ represent a hydrogen atom or a methyl group, and e, f, g, h, q, r, s, and $R^9$ to $R^{12}$ represent the same meaning as described above.

Here, in the general formula (IV') above, $R^{35}$ and $R^{36}$ represent a hydrogen atom or a methyl group, and i, j, k, l, t, u, v, w, and $R^{13}$ to $R^{22}$ represent the same meaning as described above.

Metal-atom-containing polymerizable monomer (b) containing divalent metal atom M above preferably includes at least one type selected from the group consisting of a monomer (b1) expressed in a general formula (VI') below and a monomer (b2) expressed in a general formula (VII') below.

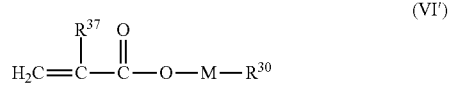
(VI')

Here, in the general formula (VI') above, $R^{37}$ represents a hydrogen atom or a methyl group and M and $R^{30}$ represent the same meaning as described above.

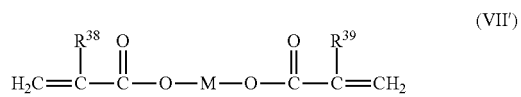
(VII')

Here, in the general formula (VII') above, $R^{38}$ and $R^{39}$ represent a hydrogen atom or a methyl group and M represents the same meaning as described above.

Hydrolyzable resin (ii) above preferably further has at least one type of a metal-atom-containing group selected from the group consisting of groups expressed in the general formulae (VI) and (VII) above.

Hydrolyzable resin (ii) above is preferably a resin including a constitutional unit derived from at least one type of a silicon-containing polymerizable monomer (a) selected from the group consisting of a monomer (a1) expressed in the general formula (I') above, a monomer (a2) expressed in the general formula (II') above, a monomer (a3) expressed in the general formula (III') above, and a monomer (a4) expressed in the general formula (IV') above and a constitutional unit derived from triorganosilyl(meth)acrylate (c) expressed in a general formula (V') below.

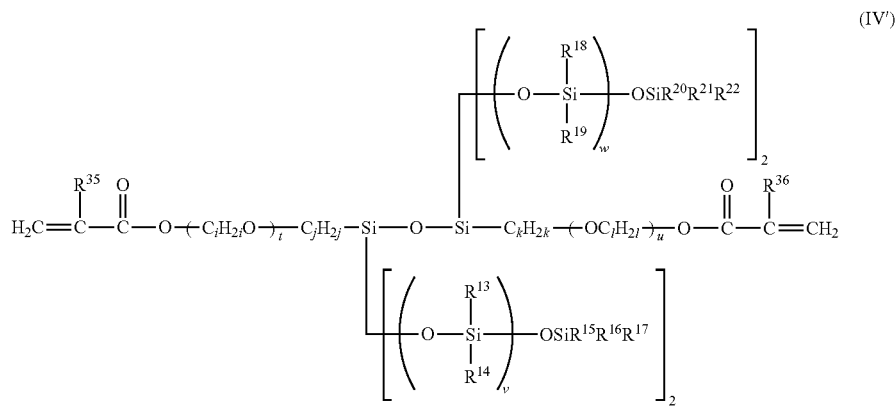
(IV')

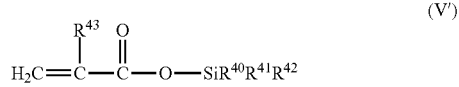

Here, in the general formula (V') above, $R^{43}$ represents a hydrogen atom or a methyl group and $R^{40}$ to $R^{42}$ represent the same meaning as described above.

Hydrolyzable resin (ii) above preferably further includes a constitutional unit derived from at least one type of a metal-atom-containing polymerizable monomer (b) selected from the group consisting of a monomer (b1) expressed in the general formula (VI') above and a monomer (b2) expressed in the general formula (VII') above.

The colored antifouling paint can further contain an antifouling agent. In this case, a content of the antifouling agent is preferably equal to or lower than 10 mass in a paint solid content.

In addition, the colored antifouling paint above can further contain a thermoplastic resin and/or a plasticizer. In this case, a total content of the thermoplastic resin and the plasticizer is preferably 3 to 100 parts by mass with respect to 100 parts by mass of the hydrolyzable resin above.

The thermoplastic resin above is preferably at least one type selected from the group consisting of chlorinated paraffin, polyvinyl ether, rosin, and a vinyl chloride-isobutyl vinyl ether copolymer.

In addition, the plasticizer above is preferably at least one type selected from the group consisting of a phthalate-ester-based plasticizer and a phosphoric-ester-based plasticizer.

The colored antifouling paint above can also be prepared by mixing two or more types of antifouling paints different from one another in content of the color pigment, although satisfying the conditions (a) to (c) above.

The object to be coated above which is coated with the colored antifouling paint may have an undercoat coating film formed from an anti-corrosive paint or an antifouling paint on its surface. In this case, a surface of the undercoat coating film is coated with the colored antifouling paint. The object to be coated can be a structure made of steel, plastic, or concrete, and in particular it can be an underwater structure.

Advantageous Effects of Invention

The present invention provides a colored antifouling paint having a film thickness determination function, of which color difference between a coating film having a target dry film thickness and a coating film immediately before reaching the target dry film thickness is greater than that of a conventional paint. According to the method of the present invention using the colored antifouling paint, whether a coating film being applied has reached a prescribed film thickness or not can readily be determined, and a uniform antifouling coating film having a prescribed dry film thickness can accurately be formed. Thus, adhesion or the like of aquatic organisms due to an insufficient film thickness that has often conventionally occurred can be prevented. In addition, since an excessive film thickness can also be prevented, a paint can also be saved. Moreover, according to the method of the present invention, an antifouling coating film excellent in a long-term antifouling property and resistance to cracking can be formed.

Further, according to the method of the present invention, since such a complicated operation as successively measuring a coating film thickness and checking whether the coating film has reached a prescribed film thickness or not can be avoided, significant improvement in efficiency in a painting operation can be achieved, and burden imposed on a paint operator can considerably be lessened.

The method according to the present invention can be applied to antifouling painting of various structures (in particular, underwater structures). According to the method of the present invention, in such a case as providing an outer surface of such a large-sized structure as a marine vessel with antifouling painting, a uniform antifouling coating film having a prescribed dry film thickness can accurately be formed in a simplified manner even on a structure or on a part thereof which is difficult to paint.

DESCRIPTION OF EMBODIMENTS

Figure 1:
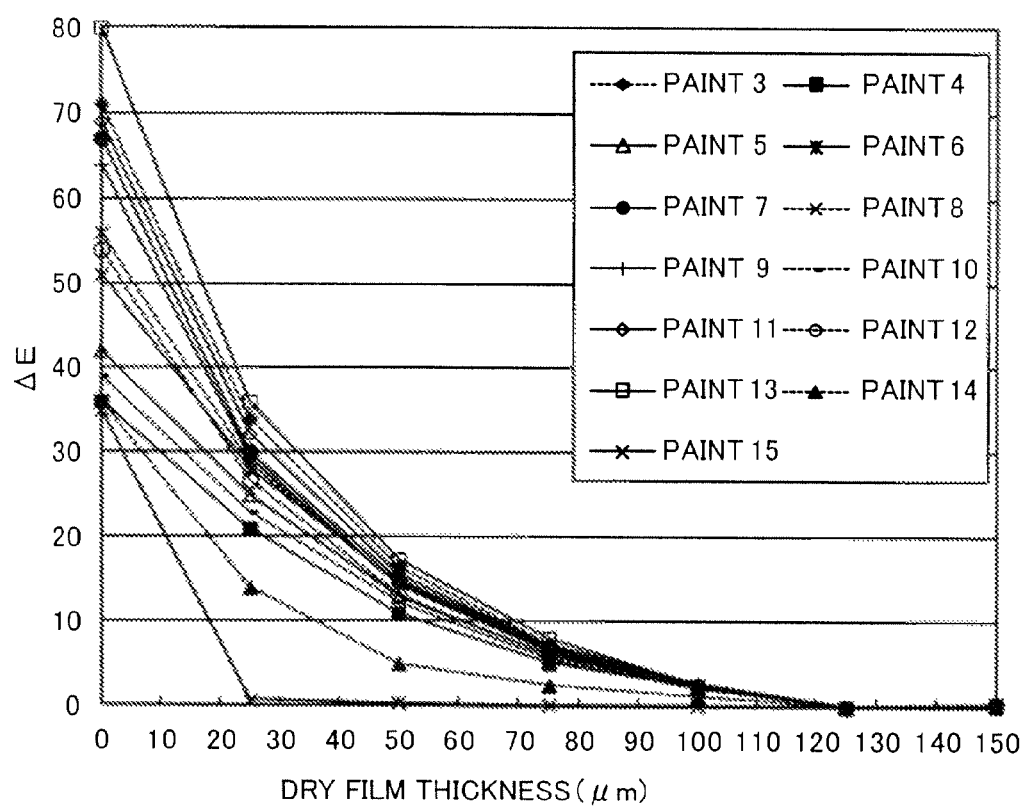
FIG. 1 is a diagram showing relation between a dry film thickness and a color difference ΔE (a color difference between a topcoat antifouling coating film having each dry film thickness and a topcoat antifouling coating film having a target dry film thickness) of paints 3 to 15 prepared in Examples and Comparative Examples.

The present invention will be described hereinafter in detail.

<Colored Antifouling Paint>

In a method of forming an antifouling coating film according to the present invention, a colored antifouling paint containing a prescribed hydrolyzable resin and a color pigment is employed as a paint for forming an antifouling coating film. As will be described in detail later, this colored antifouling paint is an antifouling paint having a "film thickness determination function" for allowing determination as to whether a prescribed film thickness has been reached or not, by observing change in color difference between a coating film being applied and a surface of an object to be coated. A colored antifouling paint employed in the present invention will be described hereinafter in detail.

(A) Hydrolyzable Resin

A colored antifouling paint contains hydrolyzable resin (i) or hydrolyzable resin (ii) or both of them as a vehicle component. Hydrolyzable resins (i) and (ii) are excellent in resin transparency and a sharp color tone of a color pigment is not interfered by a color tone of the resin. Therefore, various sharp color tones in accordance with a hue of a color pigment can be provided to an antifouling paint. Thus, a color difference between the colored antifouling paint and the surface of the object to be coated can be increased and dependence of a color tone of a coating film on a film thickness, inter alia, dependence of a color tone of a coating film on a film thickness from immediately before target dry film thickness T (around 0.8 T) to target dry film thickness T can be made greater, and thus an excellent film thickness determination function is provided to the colored antifouling paint. In addition, since various sharp color tones can be provided to the antifouling paint (there can be color variation of an antifouling paint), a degree of freedom in colors of the surface of the object to be coated, to which the method according to the present invention can be applied, increases, and the method of the present invention is substantially applicable whichever color the surface of the object to be coated may have.

Moreover, since hydrolyzable resins (i) and (ii) themselves have good antifouling performance based on their own hydrolyzability and a silicon-containing group, a colored antifouling paint containing hydrolyzable resin(s) (i) and/or (ii) can form an antifouling coating film exhibiting high antifouling performance for a long period in a stable manner (having an excellent long-term antifouling property) even though a separate antifouling agent is not contained or an amount of blend thereof is small. Being free from a separate antifouling agent or decrease in an amount of blend thereof means that a sharp color tone of a color pigment is less likely to be interfered by an antifouling agent, which can further improve sharpness, color variation, and a film thickness determination function of a colored antifouling paint.

[Hydrolyzable Resin (i)]

Hydrolyzable resin (i) that can be contained in the colored antifouling paint has at least one silicon-containing group selected from the group consisting of groups expressed in the general formulae (I), (II), (III), and (IV) above and at least one metal-atom-containing group containing divalent metal atom M. Such hydrolyzable resin (i) having a specific silicon-containing group and a metal-atom-containing group exhibits such a property as being gradually hydrolyzed in water (in particular in sea water), owing to a hydrolyzability of the metal-atom-containing group. Therefore, an antifouling coating film formed from a colored antifouling paint containing hydrolyzable resin (i) as a vehicle has its surface self-polished by being immersed in water, and thus renewability of the surface of the coating film is obtained. Therefore, an organism is less likely to adhere, and together with an antifouling effect as a result of hydrolysis of the metal-atom-containing group and an antifouling effect exhibited by the silicon-containing group, excellent antifouling performance is exhibited until the coating film is completely consumed even in a case of not containing an antifouling agent.

In the general formula (I) above, a and b each independently represent an integer from 2 to 5, m represents an integer from 0 to 50, and n represents an integer from 3 to 80. $R^1$ to $R^5$ each independently represent an alkyl group, an alkoxy group, a phenyl group, a substituted phenyl group, a phenoxy group, or a substituted phenoxy group.

In the general formula (II) above, c and d each independently represent an integer from 2 to 5 and p represents an integer from 0 to 50. $R^6$, $R^7$, and $R^8$ each independently represent an alkyl group, $R^a$, or $R^b$. $R^a$ and $R^b$ are as described above.

In the general formula (III) above, e, f, g, and h each independently represent an integer from 2 to 5, q and s each independently represent an integer from 0 to 50, and r represents an integer from 3 to 80. $R^9$ to $R^{12}$ each independently represent an alkyl group, an alkoxy group, a phenyl group, a substituted phenyl group, a phenoxy group, or a substituted phenoxy group.

In addition, in the general formula (IV) above, i, j, k, and l each independently represent an integer from 2 to 5, t and u each independently represent an integer from 0 to 50, and v and w each independently represent an integer from 0 to 20. $R^{13}$ to $R^{22}$ are identical or different and represent an alkyl group.

Hydrolyzable resin (i) may have two or more types of silicon-containing groups selected from the group consisting of the groups expressed in the general formulae (I), (II), (III), and (IV) above. In this case, hydrolyzable resin (i) may have two or more types of the groups expressed in the general formula (I) above, two or more types of the groups expressed in the general formula (II) above, two or more types of the groups expressed in the general formula (III) above, and/or two or more types of the groups expressed in the general formula (IV) above.

The metal-atom-containing group containing divalent metal atom M which hydrolyzable resin (i) has is preferably at least one type of group selected from the group consisting of the groups expressed in the general formulae (VI) and (VII) above. This is because it can maintain a self-polishing property of the coating film for a long period in a stable manner, and thus it can form a coating film excellent in a long-term antifouling property and also in resistance to cracking and adhesiveness to an underlying substrate. In the general formulae (VI) and (VII) above, M represents a divalent metal atom and $R^{30}$ represents an organic acid residue or an alcohol residue. Hydrolyzable resin (i) may have both of the groups expressed in the general formulae (VI) and (VII) above. Examples of divalent metal atom M include Mg, Zn, Cu, and the like, and preferably Zn or Cu is employed.

Hydrolyzable resin (i) is not particularly limited so long as it has the silicon-containing group and the metal-atom-containing group above, however, an acrylic resin including a constitutional unit derived from at least one type of silicon-containing polymerizable monomer (a) selected from the group consisting of monomer (a1) expressed in the general formula (I') above, monomer (a2) expressed in the general formulae (II') above, monomer (a3) expressed in the general formula (III') above, and monomer (a4) expressed in the general formula (IV') above and a constitutional unit derived from metal-atom-containing polymerizable monomer (b) containing divalent metal atom M can suitably be employed.

Here, in the general formula (I') above, $R^{31}$ represents a hydrogen atom or a methyl group, and a, b, m, n, and $R^1$ to $R^5$ represent the same meaning as described above. In the general formula (II') above, $R^{32}$ represents a hydrogen atom or a methyl group, and c, d, p, and $R^6$ to $R^8$ represent the same meaning as described above. In the general formula (III') above, $R^{33}$ and $R^{34}$ represent a hydrogen atom or a methyl group, and e, f, g, h, q, r, s, and $R^9$ to $R^{12}$ represent the same meaning as described above. In the general formula (IV') above, $R^{35}$ and $R^{36}$ represent a hydrogen atom or a methyl group, and i, j, k, l, t, u, v, w, and $R^{13}$ to $R^{22}$ represent the same meaning as described above.

Monomer (a1) expressed in the general formula (I') above, monomer (a2) expressed in the general formula (II'), monomer (a3) expressed in the general formula (III'), and monomer (a4) expressed in the general formula (IV') are silicon-containing polymerizable monomers having the silicon-containing groups expressed in the general formulae (I), (II), (III), and (IV) above, respectively.

The metal-atom-containing polymerizable monomer (b) containing divalent metal atom M above preferably contains at least one type selected from the group consisting of monomer (b1) expressed in the general formula (VI') above and monomer (b2) expressed in (VII'). This is because it can maintain a self-polishing property of the coating film for a long period in a stable manner, and thus it can form a coating film excellent in a long-term antifouling property and also in resistance to cracking and adhesiveness to an underlying substrate. In the general formula (VI') above, $R^{37}$ represents a hydrogen atom or a methyl group and M and $R^{30}$ represent the same meaning as described above. In addition, in the general formula (VII') above, $R^{38}$ and $R^{39}$ represent a hydrogen atom or a methyl group and M represents the same meaning as described above.

Monomer (b1) expressed in the general formula (VI') above and monomer (b2) expressed in (VII') above are metal-atom-containing polymerizable monomers having the metal-atom-containing groups expressed in the general formulae (VI) and (VII) above, respectively.

[1] Silicon-Containing Polymerizable Monomer (a)

Silicon-containing polymerizable monomer (a1) which can form hydrolyzable resin (i) is expressed in the general formula (I') above, where a and b each independently represent an integer from 2 to 5, m represents an integer from 0 to 50, and n represents an integer from 3 to 80. $R^1$ to $R^5$ each independently represent an alkyl group, an alkoxy group, a phenyl group, a substituted phenyl group, a phenoxy group, or a substituted phenoxy group, and $R^{31}$ represents a hydrogen atom or a methyl group. By employing silicon-containing polymerizable monomer (a1) as silicon-containing polymerizable monomer (a), hydrolyzable resin (i) which is an acrylic resin having the silicon-containing group expressed in the general formula (I) above in a side chain is obtained.

Here, m in the general formula (I') above (the general formula (I) above being also similar, to be understood similarly hereafter), which represents an average degree of polymerization of a polyether structure may be set to 0, however, it is preferably greater than 0 because recoatability on an old coating film tends to be good. In addition, preferably, m is not greater than 50 because water resistance of the coating film tends to be good and m is not greater than 30 because recoatability on an old coating film tends to be good. More preferably, m is within a range from 3 to 25 and further preferably within a range from 5 to 20.

Here, a in the general formula (I') above is preferably set to 2 or 3, and a monomer with a being set to 2 and a monomer with a being set to 3 may both be employed. Here, b is preferably set to 2 or 3.

Here, n in the general formula (I') above represents an average degree of polymerization of a silicon-containing structure, and it represents an integer in a range from 3 to 80. By setting n to 3 or greater, a further enhanced antifouling effect can be exhibited. In addition, by setting n to 80 or smaller, good compatibility with other polymerizable monomers is exhibited and solubility of obtained hydrolyzable resin (i) in a general organic solvent can be improved. Preferably, n is within a range from 5 to 50 and more preferably within a range from 8 to 40.

In the general formula (I') above, $R^1$ to $R^5$ are preferably an alkyl group having a carbon number from 1 to 18, more preferably a methyl group or an ethyl group, and further preferably a methyl group.

Specific examples of silicon-containing polymerizable monomer (a1) expressed in the general formula (I') above include, as a monomer with m being set to 0, "FM-0711", "FM-0721", and "FM-0725" (each of which is a trade name) manufactured by Chisso Corporation, "X-24-8201", "X-22-174DX", and "X-22-2426" (each of which is a trade name) manufactured by Shin-Etsu Chemical Co., Ltd., and the like. In addition, examples of a monomer with m being greater than 0 include "F2-254-04" and "F2-254-14" (each of which is a trade name) manufactured by Nippon Unicar Co., Ltd., and the like. Though products manufactured by Nippon Unicar Co., Ltd. are shown with their trade names as specific examples of silicon-containing polymerizable monomer (a1), silicone business that had been operated by Nippon Unicar Co., Ltd. was assigned to Dow Corning Toray Co., Ltd. in 2004 and corresponding products are currently available from the assignee. This is also the case with products manufactured by Nippon Unicar Co., Ltd. shown below.

Hydrolyzable resin (i) may include constitutional units derived from two or more types of silicon-containing polymerizable monomers (a1) as silicon-containing polymerizable monomer (a).

Silicon-containing polymerizable monomer (a2) which can form hydrolyzable resin (i) is expressed in the general formula (II') above, where c and d each independently represent an integer from 2 to 5 and p represents an integer from 0 to 50. $R^6$, $R^7$, and $R^8$ each independently represent an alkyl group, $R^a$, or $R^b$, and $R^{32}$ represents a hydrogen atom or a methyl group. $R^a$ and $R^b$ are as described above. By employing silicon-containing polymerizable monomer (a2) as silicon-containing polymerizable monomer (a), hydrolyzable resin (i) which is an acrylic resin having the silicon-containing group expressed in the general formula (II) above in a side chain is obtained.

Here, p in the general formula (II') above (the general formula (II) above being also similar, to be understood similarly hereafter), which represents an average degree of polymerization of a polyether structure may be set to 0, however, it is preferably greater than 0 because recoatability on an old coating film tends to be good. In addition, preferably, p is not greater than 50 because water resistance of the coating film tends to be good and p is not greater than 30 because recoatability on an old coating film tends to be good. More preferably, p is within a range from 3 to 25 and further preferably within a range from 5 to 20.

Here, c in the general formula (II') above is preferably set to 2 or 3, and a monomer with c being set to 2 and a monomer with c being set to 3 may both be employed. Here, d is preferably set to 2 or 3.

Here, x and y in the general formula (II') above represent an average degree of polymerization of a silicon-containing structure or a polyether structure introduced in a side chain, and they represent an integer in a range from 0 to 20 and an integer in a range from 1 to 20, respectively. By setting x and y not greater than 20, good compatibility with other polymerizable monomers is exhibited and solubility of obtained hydrolyzable resin (i) in a general organic solvent can be improved. Preferably, x and y are within a range not greater than 10 and more preferably within a range not greater than 5.

Examples of an alkyl group that can be selected for $R^6$ to $R^8$ and $R^{23}$ to $R^{29}$ in the general formula (II') above include a methyl group, an ethyl group, an n-propyl group, an n-butyl group, and the like. A methyl group or an ethyl group is preferred and a methyl group is more preferred.

Specific examples of silicon-containing polymerizable monomer (a2) expressed in the general formula (II') above include, as a monomer with p being set to 0, "TM-0701" (a trade name) manufactured by Chisso Corporation, "X-22-2404" (a trade name) manufactured by Shin-Etsu Chemical Co., Ltd., "F2-250-01" and "F2-302-01" (a trade name) manufactured by Nippon Unicar Co., Ltd., and the like. In addition, examples of a monomer with p being greater than 0 include "F2-302-04" (each of which above is a trade name) manufactured by Nippon Unicar Co., Ltd., and the like.

Hydrolyzable resin (i) may include constitutional units derived from two or more types of silicon-containing polymerizable monomers (a2) as silicon-containing polymerizable monomer (a).

Silicon-containing polymerizable monomer (a3) which can form hydrolyzable resin (i) is expressed in the general formula (III') above, where e, f, g, and h each independently represent an integer from 2 to 5, q and s each independently represent an integer from 0 to 50, and r represents an integer from 3 to 80. $R^9$ to $R^{12}$ each independently represent an alkyl group, an alkoxy group, a phenyl group, a substituted phenyl group, a phenoxy group, or a substituted phenoxy group, and $R^{33}$ and $R^{34}$ represent a hydrogen atom or a methyl group. By employing silicon-containing polymerizable monomer (a3) as silicon-containing polymerizable monomer (a), hydrolyzable resin (i) which is an acrylic resin having the silicon-containing group expressed in the general formula (III) above (this silicon-containing group being a cross-linking group cross-linking polymer main chains) is obtained.

Here, q and s in the general formula (III') above (the general formula (III) above being also similar, to be understood similarly hereafter), both of which represent an average degree of polymerization of a polyether structure may be set to 0, however, they are preferably greater than 0 because recoatability on an old coating film tends to be good. In addition, preferably, q and s are not greater than 50 because water resistance of the coating film tends to be good and q and s are not greater than 30 because recoatability on an old coating film tends to be good. More preferably, q and are within a range from 3 to 25 and further preferably within a range from 5 to 20.

Here, e and h in the general formula (III') above are preferably set to 2 or 3, and a monomer with e and h being set to 2 and a monomer with e and h being set to 3 may both be employed. Here, f and g are preferably set to 2 or 3.

Here, r in the general formula (III') above represents an average degree of polymerization of a silicon-containing structure and it represents an integer in a range from 3 to 80. By setting r not smaller than 3, a further enhanced antifouling effect can be expressed. By setting r not greater than 80, good compatibility with other polymerizable monomers is exhibited and solubility of obtained hydrolyzable resin (i) in a general organic solvent can be improved. Preferably, r is within a range from 5 to 50 and more preferably within a range from 8 to 40.

In the general formula (III') above, $R^9$ to $R^{12}$ are preferably an alkyl group having a carbon number from 1 to 18, more preferably a methyl group or an ethyl group, and further preferably a methyl group.

Specific examples of silicon-containing polymerizable monomer (a3) expressed in the general formula (III') above include, as a monomer with q and s being set to 0, "FM-7711", "FM-7721", and "FM-7725" (each of which is a trade name) manufactured by Chisso Corporation, "F2-311-02" (a trade name) manufactured by Nippon Unicar Co., Ltd., and the like. In addition, examples of a monomer with q and s being greater than 0 include "F2-354-04" (a trade name) manufactured by Nippon Unicar Co., Ltd., and the like.

Hydrolyzable resin (i) may include constitutional units derived from two or more types of silicon-containing polymerizable monomers (a3) as silicon-containing polymerizable monomer (a).

Silicon-containing polymerizable monomer (a4) which can form hydrolyzable resin (i) is expressed in the general formula (IV') above, where i, j, k, and l each independently represent an integer from 2 to 5, t and u each independently represent an integer from 0 to 50, and v and w each independently represent an integer from 0 to 20. $R^{13}$ to $R^{22}$ are identical or different and represent an alkyl group, and $R^{35}$ and $R^{36}$ represent a hydrogen atom or a methyl group. By employing silicon-containing polymerizable monomer (a4) as silicon-containing polymerizable monomer (a), hydrolyzable resin (i) which is an acrylic resin having the silicon-containing group expressed in the general formula (IV) above (this silicon-containing group being a cross-linking group cross-linking polymer main chains) is obtained.

Here, t and u in the general formula (IV') above (the general formula (IV) above being also similar, to be understood similarly hereafter), both of which represent an average degree of polymerization of a polyether structure may be set to 0, however, they are preferably greater than 0 because recoatability on an old coating film tends to be good. In addition, preferably, t and u are not greater than 50 because water resistance of the coating film tends to be good and t and u are not greater than 30 because recoatability on an old coating film tends to be good. More preferably, t and u are within a range from 3 to 25 and further preferably within a range from 5 to 20.

Here, i and l in the general formula (IV') above are preferably set to 2 or 3, and a monomer with i and l being 2 and a monomer with i and l being 3 may both be employed. Here, j and k are preferably set to 2 or 3.

Here, v and w in the general formula (IV') above represent an average degree of polymerization of a silicon-containing structure introduced in a side chain, and they represent an integer in a range from 0 to 20. By setting v and w not greater than 20, good compatibility with other polymerizable monomers is exhibited and solubility of obtained hydrolyzable resin (i) in a general organic solvent can be improved. Preferably, v and w are within a range not greater than 10 and more preferably within a range not greater than 5.

Examples of an alkyl group that can be selected for $R^{13}$ to $R^{22}$ in the general formula (IV') above include a methyl group, an ethyl group, an n-propyl group, an n-butyl group, and the like. A methyl group or an ethyl group is preferred and a methyl group is more preferred.

Specific examples of silicon-containing polymerizable monomer (a4) expressed in the general formula (IV') above include, as a monomer with t and u being set to 0, "F2-312-01" (a trade name) manufactured by Nippon Unicar Co., Ltd., and the like. In addition, examples of a monomer with t and u being greater than 0 include "F2-312-04" (a trade name) manufactured by Nippon Unicar Co., Ltd., and the like.

Hydrolyzable resin (i) may include constitutional units derived from two or more types of silicon-containing polymerizable monomers (a4) as silicon-containing polymerizable monomer (a).

In addition, hydrolyzable resin (i) may include constitutional units derived from two or more types of silicon-containing polymerizable monomers selected from silicon-containing polymerizable monomers (a1), (a2), (a3), and (a4). Among these, an embodiment in which a mono-terminal (meth)acrylic modified silicon-containing polymerizable monomer [silicon-containing polymerizable monomer(s) (a1) and/or (a2)] and a both-terminal (meth)acrylic modified silicon-containing polymerizable monomer [silicon-containing polymerizable monomer(s) (a3) and/or (a4)] are both used can be exemplified as one of preferred embodiments.

In all the constitutional units forming hydrolyzable resin (i), a content of the constitutional unit derived from silicon-containing polymerizable monomer (a) is preferably 1 to 60 mass %, more preferably 5 to 50 mass %, and further preferably 10 to 40 mass %. By setting the content to 1 mass % or higher, an antifouling effect tends to be exhibited also in a case where an antifouling agent is not contained separately, and by setting the content to 60 mass % or lower, a long-term antifouling property and adhesiveness with an underlying substrate tend to be in good balance.

[2] Metal-Atom-Containing Polymerizable Monomer (b)

Metal-atom-containing polymerizable monomer (b) is a monomer used for introducing a metal-atom-containing group containing divalent metal atom M into hydrolyzable resin (i). In a case not containing a metal-atom-containing group, hydrolyzability of an obtained resin is insufficient, which results in failure in obtaining a good self-polishing property of the coating film. It is thus difficult to obtain a coating film exhibiting a high antifouling property. In addition, in a case not containing a metal-atom-containing group, adhesiveness with an underlying substrate of a coating film and resistance to cracking tend to be poor. Examples of divalent metal atom M include Mg, Zn, Cu, and the like, and Zn or Cu is preferably employed.

Metal-atom-containing polymerizable monomer (b1) which can form hydrolyzable resin (i) is expressed in the general formula (VI') above, where $R^{37}$ represents a hydrogen atom or a methyl group, M represents a divalent metal atom, and $R^{30}$ represents an organic acid residue or an alcohol residue. By employing metal-atom-containing polymerizable monomer (b1) as metal-atom-containing polymerizable monomer (b), hydrolyzable resin (i) which is an acrylic resin having the metal-atom-containing group expressed in the general formula (VI) above is obtained.

Examples of an organic acid forming an organic acid residue in $R^{30}$ include such monobasic organic acids as acetic acid, monochloroacetic acid, monofluoroacetic acid, propionic acid, caproic acid, caprylic acid, 2-ethylhexanoic acid, capric acid, versatic acid, isostearic acid, palmitic acid, cresotic acid, oleic acid, elaidic acid, linoleic acid, linolenic acid, stearolic acid, ricinoleic acid, ricinoelaidic acid, brassidic acid, erucic acid, α-naphthoic acid, β-naphthoic acid, benzoic acid, 2,4,5-trichlorophenoxyacetic acid, 2,4-dichlorophenoxyacetic acid, quinoline carboxylic acid, nitrobenzoic acid, nitronaphthalene carboxylic acid, and pyrubic acid. Among these, use of an acid having an organic acid residue of an aliphatic acid type tends to allow a coating film free from cracks or peel-off to be maintained for a long period, which is preferred. In particular, zinc oleate(meth)acrylate or zinc versatate(meth)acrylate having high plasticity is preferably employed as metal-atom-containing polymerizable monomer (b1).

In addition, monobasic cyclic organic acids other than aromatic organic acids can be exemplified as other preferred organic acids. As a monobasic cyclic organic acid, for example, not only an organic acid having a cycloalkyl group such as naphthenic acid but also a resin acid such as a tricyclic resin acid, a salt thereof, and the like can be exemplified. As a tricyclic resin acid, for example, a monobasic acid having a diterpene-based hydrocarbon skeleton and the like can be exemplified, and examples thereof include a compound having an abietane, pimarane, isopimarane, or labdane skeleton. More specifically, examples include abietic acid, neoabietic acid, dehydroabietic acid, hydrogenated abietic acid, palustric acid, pimaric acid, isopimaric acid, levopimaric acid, dextropimaric acid, sandaracopimaric acid, and a salt thereof, and the like. Among these, abietic acid, hydrogenated abietic acid, and a salt thereof are preferred, because hydrolysis moderately occurs, which leads to an excellent long-term antifouling property and also excellent resistance to cracking of a coating film and availability.

The monobasic cyclic organic acid above does not have to highly be purified, and for example, turpentine, a resin acid of a pine, or the like can also be employed. Examples thereof can include rosin, hydrogenated rosin, disproportionated rosin, and the like, as well as naphthenic acid. The rosin herein refers to gum rosin, wood rosin, tall oil rosin, and the like. The rosin, the hydrogenated rosin, and the disproportionated rosin are preferred because they are inexpensive and readily available and excellent in handleability, and they exhibit a long-term antifouling property.

An acid value of the monobasic cyclic organic acid above is preferably not less than 100 mgKOH/g and not more than 220 mgKOH/g, more preferably not less than 120 mgKOH/g and not more than 190 mgKOH/g, and further preferably not less than 140 mgKOH/g and not more than 185 mgKOH/g. Use of a monobasic cyclic organic acid having an acid value within the range above as the monobasic cyclic organic acid forming $R^{30}$ will bring about a moderate rate of hydrolysis of hydrolyzable resin (i), and consequently a self-polishing property of the coating film can be maintained in a stable manner for a long period and hence an antifouling effect can be maintained for a longer period.

An organic acid residue of metal-atom-containing polymerizable monomer (b1) may be formed only of a single type of organic acid or two or more types of organic acids.

As a method of producing metal-atom-containing polymerizable monomer (b1) having an organic acid residue as $R^{30}$, for example, a method of causing reaction among an inorganic metal compound, a carboxyl-group-containing radical polymerizable monomer such as a (meth)acrylic acid, and a non-polymerizable organic acid (an organic acid forming the organic acid residue above) in an organic solvent containing an alcohol-based compound can be exemplified. In addition, a constitutional unit derived from metal-atom-containing polymerizable monomer (b1) can be formed also with a method of causing reaction among a resin obtained by polymerization of a monomer mixture including a carboxyl-group-containing radical polymerizable monomer such as a (meth)acrylic acid, a metal compound, and a non-polymerizable organic acid (an organic acid forming the organic acid residue above).

Metal-atom-containing polymerizable monomer (b2) which can form hydrolyzable resin (i) is expressed in the general formula (VIP) above, where $R^{38}$ and $R^{39}$ represent a hydrogen atom or a methyl group and M represents a divalent metal atom. By employing metal-atom-containing polymerizable monomer (b2) as metal-atom-containing polymerizable monomer (b), hydrolyzable resin (i) which is an acrylic resin having the metal-atom-containing group expressed in the general formula (VII) above (this metal-atom-containing group being a cross-linking group cross-linking polymer main chains) is obtained.

Specific examples of metal-atom-containing polymerizable monomer (b2) include magnesium acrylate [$(CH_2=CHCOO)_2Mg$], magnesium methacrylate [$(CH_2=C(CH_3)COO)_2Mg$], zinc acrylate [$(CH_2=CHCOO)_2Zn$], zinc methacrylate [$(CH_2=C(CH_3)COO)_2Zn$], copper acrylate [$(CH_2=CHCOO)_2Cu$], copper methacrylate [$(CH_2=C(CH_3)COO)_2Cu$], and the like. One type or two or more types of these can be selected and used as appropriate.

As a method of producing metal-atom-containing polymerizable monomer (b2), for example, a method of causing reaction between a polymerizable unsaturated organic acid such as a (meth)acrylic acid and a metal compound in an organic solvent containing an alcohol-based compound, in the presence of water, can be exemplified. In this case, a content of water in a reactant is preferably adjusted within a range from 0.01 to 30 mass %.

Hydrolyzable resin (i) may include both of a constitutional unit derived from metal-atom-containing polymerizable monomer (b1) and a constitutional unit derived from metal-atom-containing polymerizable monomer (b2). In a case where metal-atom-containing polymerizable monomer (b1) and metal-atom-containing polymerizable monomer (b2) are both used as monomers forming hydrolyzable resin (i), a ratio of content in hydrolyzable resin (i) between the constitutional unit derived from metal-atom-containing polymerizable monomer (b1) and the constitutional unit derived from metal-atom-containing polymerizable monomer (b2) is preferably in a range from 20/80 to 80/20 (a molar ratio) and more preferably in a range from 30/70 to 70/30 (a molar ratio). By adjusting the ratio of content within this range, even in a case where an antifouling agent is not contained or an amount of blend thereof is small, an antifouling coating film exhibiting a high antifouling property for a long period and excellent also in resistance to cracking and adhesiveness with an underlying substrate tends to be obtained.

In all the constitutional units forming hydrolyzable resin (i), a content of the constitutional unit derived from metalatom-containing polymerizable monomer (b) is preferably 5 to 30 mass % and more preferably 10 to 20 mass %. By setting the content to 5 mass % or higher, adhesiveness with an underlying substrate tends to be improved and a self-polishing property of a formed coating film tends to be maintained in a stable manner for a long period. By setting the content to 30 mass % or lower, an effect to improve balance between a long-term self-polishing property and resistance to cracking and adhesiveness with an underlying substrate after immersion in seawater tend to be noticeable, and a long-term self-polishing property tends to be maintained and coating film properties tend to be improved.

In hydrolyzable resin (i), a ratio of a content between the constitutional unit derived from silicon-containing polymerizable monomer (a) and the constitutional unit derived from metal-atom-containing polymerizable monomer (b) is within a range in a mass ratio preferably from 30/70 to 90/10 and more preferably from 45/55 to 85/15. By setting the ratio to 30/70 or higher, an antifouling effect tends to be exhibited even in a case where an antifouling agent is not contained separately. In a case where the ratio is lower than 30/70, flexibility of an obtained coating film may be impaired or a self-polishing property of the coating film may be too high. Further, by setting the ratio to 90/10 or lower, a long-term antifouling property and adhesiveness with an underlying substrate tends to be in good balance. In a case where the ratio exceeds 90/10, hydrolysis of an obtained coating film may be impaired and hence a self-polishing property of the coating film may be impaired.

[3] Other Monomer Components (d)

Hydrolyzable resin (i) may contain a constitutional unit derived from a monomer component (d) other than silicon-containing polymerizable monomer (a) and metal-atom-containing polymerizable monomer (b) above.

Other monomer components (d) are not particularly limited so long as they are unsaturated monomers that can be copolymerized with silicon-containing polymerizable monomer (a) and metal-atom-containing polymerizable monomer (b) above, and examples thereof include: a (meth)acrylic ester monomer such as methyl(meth)acrylate, ethyl(meth)acrylate, 2-methoxyethyl(meth)acrylate, 2-ethoxyethyl(meth)acrylate, phenoxyethyl(meth)acrylate, 2-(2-ethylhexaoxy)ethyl(meth)acrylate, 1-methyl-2-methoxyethyl(meth)acrylate, 3-methoxybutyl(meth)acrylate, 3-methyl-3-methoxybutyl(meth)acrylate, m-methoxyphenyl(meth)acrylate, p-methoxyphenyl(meth)acrylate, o-methoxyphenylethyl(meth)acrylate, m-methoxyphenylethyl(meth)acrylate, p-methoxyphenylethyl(meth)acrylate, n-propyl(meth)acrylate, i-propyl(meth)acrylate, n-butyl(meth)acrylate, i-butyl(meth)acrylate, t-butyl(meth)acrylate, 2-ethylhexyl(meth)acrylate, lauryl(meth)acrylate, stearyl(meth)acrylate, benzyl(meth)acrylate, phenyl(meth)acrylate, isobornyl(meth)acrylate, cyclohexyl(meth)acrylate, and glycidyl(meth)acrylate; a hydroxyl-group-containing monomer such as 2-hydroxyethyl(meth)acrylate, 2-hydroxypropyl(meth)acrylate, 3-hydroxypropyl(meth)acrylate, 2-hydroxybutyl(meth)acrylate, and 4-hydroxybutyl(meth)acrylate; an adduct of 2-hydroxyethyl(meth)acrylate with ethylene oxide, propylene oxide, γ-butyrolactone, ε-caprolactone, or the like; a dimer or a trimer of 2-hydroxyethyl(meth)acrylate, 2-hydroxypropyl(meth)acrylate, or the like; a monomer having a plurality of hydroxyl groups such as glycerol(meth)acrylate; a primary or secondary amino group containing vinyl monomer such as butylaminoethyl(meth)acrylate and (meth)acrylamide; a tertiary amino group containing vinyl monomer such as dimethylaminoethyl(meth)acrylate, diethylaminoethyl(meth)acrylate, dimethylaminopropyl(meth)acrylate, dimethylaminobutyl(meth)acrylate, dibutylaminoethyl(meth)acrylate, dimethylaminoethyl(meth)acrylamide, and dimethylaminopropyl(meth)acrylamide; a heterocyclic basic monomer such as vinylpyrrolidone, vinylpyridine, and vinylcarbazole; and a vinyl-based monomer such as styrene, vinyltoluene, α-methyl styrene, (meth)acrylonitrile, vinyl acetate, and vinyl propionate.

In all the constitutional units forming hydrolyzable resin (i), a content of the constitutional unit derived from other monomer components (d) above is preferably 0.1 to 89 mass %, more preferably 7 to 75 mass %, and further preferably 10 to 70 mass %. By setting the content to 0.1 mass % or higher, various characteristics of an obtained antifouling paint composition can be in good balance. By setting the content to 89 mass % or lower, good long-term hydrolyzability is provided to a formed coating film, an excellent antifouling property can be exhibited even in a case where an antifouling agent is not used, and balance thereof with adhesiveness of the coating film to an underlying substrate tends to be good.

Though a method of producing hydrolyzable resin (i) above is not particularly limited, the hydrolyzable resin can be produced, for example, by causing a monomer mixture in which the monomers above are mixed to react for 5 to 14 hours at a reaction temperature from 60 to 180° C. in the presence of a radical initiator. Examples of a radical initiator include 2,2-azobisisobutyronitrile, 2,2-azobis(2,4-dimethylvaleronitrile), 2,2-azobis(2-methylbutyronitrile), benzoyl peroxide, cumene hydroperoxide, lauryl peroxide, di-t-butylperoxide, t-butylperoxy-2-ethylhexanoate, and the like. Not only solution polymerization performed in an organic solvent but also emulsion polymerization, suspension polymerization, or the like can be adopted as a polymerization method, however, solution polymerization using such a general organic solvent as toluene, xylene, methyl isobutyl ketone, and n-butyl acetate is advantageous from a point of view of productivity and performance of hydrolyzable resin (i).

In a case where metal-atom-containing polymerizable monomer (b2) is used, a chain transfer agent is preferably used in order to achieve a high-solid antifouling paint, improved productivity, and suppressed generation of cullet during polymerization. From a point of view of compatibility with metal-atom-containing polymerizable monomer (b), a chain transfer agent other than mercaptan is preferred as a chain transfer agent, and a styrene dimer or the like is preferred.

Although being different depending on a polymerization condition, a weight-average molecular weight of hydrolyzable resin (i) is normally within a range from 1000 to 3000000, more preferably within a range from 3000 to 100000, and further preferably within a range from 5000 to 50000. When a weight-average molecular weight is equal to or more than 1000, an antifouling property tends to be exhibited when a coating film is formed. When a weight-average molecular weight is equal to or less than 3000000, hydrolyzable resin (i) tends to uniformly be dispersed in a paint composition. It is noted that a weight-average molecular weight herein refers to a weight-average molecular weight in terms of polystyrene measured with gel permeation chromatography (GPC).

The fact that hydrolyzable resin (i) is a resin containing one or more types of silicon-containing groups expressed in the general formulae (I) to (IV) above (or the fact that it is a resin containing a constitutional unit derived from one or more types of silicon-containing polymerizable monomers (a1) to (a4)) can be confirmed, for example, by using $^1$H-NMR, ICP emission spectroscopy, or the like. The fact that hydrolyzable resin (i) is a resin containing one or more types of metal-atom-containing groups expressed in the general formulae (VI) to (VII) above (the fact that it is a resin containing a constitutional unit derived from one or more types of metal-atom-containing polymerizable monomers (b1) to (b2)) can be confirmed, for example, with atomic absorption spectroscopy or the like.

[Hydrolyzable Resin (ii)]

Hydrolyzable resin (ii) that can be contained in a colored antifouling paint has at least one type of silicon-containing group selected from the group consisting of the groups expressed in the general formulae (I), (II), (III), and (IV) above and the triorganosilyloxy carbonyl group expressed in the general formula (V) above. Hydrolyzable resin (ii) having such a specific silicon-containing group and a triorganosilyloxy carbonyl group shows such a property that it is gradually hydrolyzed in water (in particular, in seawater) due to hydrolyzability of a triorganosilyloxy carbonyl group. Therefore, an antifouling coating film formed from a colored antifouling paint containing hydrolyzable resin (ii) as a vehicle has its surface self-polished by being immersed in water and thus renewability of the surface of the coating film is obtained. Therefore, an organism is less likely to adhere and the antifouling coating film exhibits excellent antifouling performance until it is completely consumed even in a case of not containing an antifouling agent, together with an antifouling effect as a result of hydrolysis of a triorganosilyloxy carbonyl group and an antifouling effect exhibited by the silicon-containing group. Further, the antifouling coating film formed from the colored antifouling paint containing hydrolyzable resin (ii) is excellent in resistance to cracking.

Details of the silicon-containing groups expressed in the general formulae (I), (II), (III), and (IV) above are as described in connection with hydrolyzable resin (i).

In the general formula (V) above, $R^{40}$, $R^{41}$, and $R^{42}$ are identical or different and represent a hydrocarbon residue having a carbon number from 1 to 20. Hydrolyzable resin (ii) may have two or more types of triorganosilyloxy carbonyl groups expressed in the general formula (V) above. Specific examples of a hydrocarbon residue having a carbon number from 1 to 20 include a linear-chain or branched alkyl group having a carbon number not more than 20 such as a methyl group, an ethyl group, an n-propyl group, an isopropyl group, an n-butyl group, an isobutyl group, a sec-butyl group, a tert-butyl group, a pentyl group, a hexyl group, a heptyl group, an octyl group, a nonyl group, a decyl group, an undecyl group, a dodecyl group, a tridecyl group, and a tetradecyl group, a cyclic alkyl group such as a cyclohexyl group and a substituted cyclohexyl group, an aryl group, a substituted aryl group, and the like. Examples of the substituted aryl group include an aryl group substituted with halogen, an alkyl group having a carbon number up to around 18, an acyl group, a nitro group, an amino group, or the like, and the like. Among these, since a coating film exhibiting a stable polishing rate (polishing speed) can be obtained and antifouling performance can be maintained in a stable manner for a long period, the triorganosilyloxy carbonyl group expressed in the general formula (V) above preferably includes an isopropyl group as a hydrocarbon residue, and more preferably each of $R^{40}$, $R^{41}$ and $R^{42}$ is an isopropyl group.

In addition, since a coating film of which self-polishing property can be maintained in a stable manner for a long period, which is thus excellent in long-term antifouling property and excellent in resistance to cracking and adhesiveness with an underlying substrate, tends to be formed, hydrolyzable resin (ii) preferably further has at least one type of a metal-atom-containing group selected from the group consisting of the groups expressed in the general formulae (VI) and (VII) above. In the general formulae (VI) and (VII) above, M represents a divalent metal atom and $R^{30}$ represents an organic acid residue or an alcohol residue. Hydrolyzable resin (ii) may have both of the general formulae (VI) and (VII) above. Examples of divalent metal atom M include Mg, Zn, Cu, and the like, and preferably Zn or Cu is employed.

Though hydrolyzable resin (ii) above is not particularly limited so long as it has the silicon-containing group and the triorganosilyloxy carbonyl group above, an acrylic resin including a constitutional unit derived from at least one type of silicon-containing polymerizable monomer (a) selected from the group consisting of monomer (a1) expressed in the general formula (I') above, monomer (a2) expressed in the general formula (II') above, monomer (a3) expressed in the general formula (III') above, and monomer (a4) expressed in the general formula (IV') above and a constitutional unit derived from triorganosilyl(meth)acrylate (c) expressed in the general formula (V') above can suitably be employed. Details of monomers (a1) to (a4) are as described in connection with hydrolyzable resin (i), Triorganosilyl(meth)acrylate (c) expressed in the general formula (V') above is a polymerizable monomer having the triorganosilyloxy carbonyl group expressed in the general formula (V) above.

Triorganosilyl(meth)acrylate (c) expressed in the general formula (V') above is a monomer used for introducing the triorganosilyloxy carbonyl group expressed in the general formula (V) above into hydrolyzable resin (ii). As the triorganosilyloxy carbonyl group is introduced in addition to the silicon-containing group above, a good self-polishing property of a coating film can be obtained and a coating film excellent in long-term antifouling property can be obtained. $R^{40}$, $R^{41}$, and $R^{42}$ in the general formula (V') above represent the same meaning as $R^{40}$, $R^{41}$, and $R^{42}$ in the general formula (V) above.

In all the constitutional units forming hydrolyzable resin (ii), a total content of the constitutional units derived from silicon-containing polymerizable monomer (a) above and triorganosilyl(meth)acrylate (c) is preferably 5 to 90 mass % and more preferably 15 to 80 mass %. By setting the content to 5 mass % or higher, good hydrolyzability of the resin tends to be ensured, and by setting the content to 90 mass % or lower, sufficient hardness of a coating film tends to be ensured.

In addition, a ratio of a content in hydrolyzable resin (ii) between the constitutional unit derived from silicon-containing polymerizable monomer (a) above and the constitutional unit derived from triorganosilyl(meth)acrylate (b) is preferably within a range from 20/80 to 80/20 (a mass ratio) and more preferably within a range from 30/70 to 70/30 (a mass ratio).

Since a self-polishing property of a coating film can be maintained in a stable manner for a long period and the coating film further excellent in long-term antifouling property and excellent in resistance to cracking and adhesiveness with an underlying substrate thus tends to be formed, hydrolyzable resin (ii) preferably further includes a constitutional unit derived from at least one type of metal-atom-containing polymerizable monomer (b) selected from the group consisting of monomer (b1) expressed in the general formula (VI') above and monomer (b2) expressed in (VII'). Monomer (b1) expressed in the general formula (VP) above and monomer (b2) expressed in (VII') are metal-atom-containing polymerizable monomers having the metal-atom-containing groups expressed in the general formulae (VI) and (VII) above, respectively. Details of monomers (b1) and (b2) are as described in connection with hydrolyzable resin (i), Hydrolyzable resin (ii) may include both of the constitutional unit derived from metal-atom-containing polymerizable monomer (b1) and the constitutional unit derived from metal-atom-containing polymerizable monomer (b2).

In all the constitutional units forming hydrolyzable resin (ii), a content of the constitutional unit derived from metal-atom-containing polymerizable monomer (b) is preferably 10 to 60 mass % and more preferably 15 to 50 mass %. By setting the content to 10 mass % or higher, good hydrolyzability of the resin tends to be ensured, and by setting the content to 60 mass % or lower, good flexibility of the coating film tends to be ensured.

In addition, a ratio of content in hydrolyzable resin (ii) between the total content of the constitutional unit derived from silicon-containing polymerizable monomer (a) and triorganosilyl(meth)acrylate (c) above and the constitutional unit derived from metal-atom-containing polymerizable monomer (b) is preferably within a range from 10/90 to 90/10 (a mass ratio).

Hydrolyzable resin (ii) may include a constitutional unit derived from monomer component (d) other than silicon-containing polymerizable monomer (a), triorganosilyl(meth) acrylate (c), and metal-atom-containing polymerizable monomer (b) above, as in hydrolyzable resin (i). Details of other monomer components (d) are as described in connection with hydrolyzable resin (i).

Hydrolyzable resin (ii) can be produced with a method similar to the method shown in connection with hydrolyzable resin (i).

A content of the hydrolyzable resin (the total content of hydrolyzable resins (i) and (ii)) is preferably 30 to 97 mass % in a solid content contained in the colored antifouling paint (hereinafter referred to as a paint solid content). When the content is less than 30 mass %, adhesiveness of a coating film to an underlying substrate tends to lower and an antifouling effect does not tend to sufficiently be exhibited. When the content exceeds 97 mass %, resistance to cracking of the coating film tends to lower.

(B) Color Pigment

Various conventionally known color pigments can be used as a color pigment to be contained in the colored antifouling paint, and a colored antifouling paint with various color tones can be realized depending on selection of a color pigment (a colored antifouling paint can be various in color). The colored antifouling paint used in the present invention can be free from an antifouling agent or an amount of addition thereof can significantly be reduced. In addition, since transparency of the hydrolyzable resin is high, a sharp color tone derived from the color pigment is provided substantially as it is. As described above, color difference between the colored antifouling paint and a surface of an object to be coated can thus be made great and a film thickness determination function is improved.

A wider variation of colors of the colored antifouling paint increases a degree of freedom in color of the surface of the object to be coated to which the method according to the present invention is applicable. Depending on a color tone of the colored antifouling paint, a color difference $\Delta E3$ between the colored antifouling paint and the surface of the object to be coated does not become so great for a certain particular object to be coated, and the colored antifouling paint may not be suitable for the method according to the present invention. Even in such a case, this colored antifouling paint is applicable to other objects to be coated having a surface color sufficiently great in color difference $\Delta E3$ between the colored antifouling paint and the surface of the object to be coated. In other words, a type of the color pigment to be added to the colored antifouling paint (a color tone of the colored antifouling paint) can be selected in accordance with a surface color of the object to be coated. As described above, since a color of the colored antifouling paint used in the present invention can be various, a colored antifouling paint sufficiently great in color difference $\Delta E3$ from the surface of the object to be coated can be prepared, whichever color the surface of the object to be coated may substantially have.

Specific examples of the color pigments include titanium oxide, zirconium oxide, basic lead sulfate, tin oxide, carbon black, white lead, graphite, zinc sulfide, zinc oxide, chromium oxide, nickel titanium yellow, chromium titanium yellow, yellow iron oxide, red iron oxide, black iron oxide, azo-based red and yellow pigments, chrome yellow, phthalocyanine green, phthalocyanine blue, ultramarine blue, quinacridone, and the like. These color pigments may be used alone or in combination of two or more types.

A content of the color pigment can be, for example, not less than 0.3 mass % in the paint solid content. Though an upper limit of the content of the color pigment is not particularly limited, it is set, for example, to 30 mass % or lower.

(C) Antifouling Agent

The antifouling coating film obtained with the colored antifouling paint above exhibits good antifouling performance owing to an antifouling effect based on hydrolyzable resin (i) and/or hydrolyzable resin (ii) above. In order to further enhance antifouling performance or further enhance long-term sustainment of an antifouling property, an antifouling agent may be optionally blended in the colored antifouling paint. An antifouling agent is not particularly limited, and a known antifouling agent can be used. Examples thereof include an inorganic compound, an organic compound containing a metal, an organic compound not containing a metal, and the like.

Specific examples of the antifouling agents above include: zinc oxide; cuprous oxide; manganese ethylene bisdithiocarbamate; zinc dimethyldithiocarbamate; 2-methylthio-4-t-butylamino-6-cyclopropylamino-s-triazine; 2,4,5,6-tetrachloroisophthalonitrile; N,N-dimethyldichlorophenyl urea; zinc ethylene bisdithiocarbamate; copper rhodanide (cuprous thiocyanate); 4,5-dichloro-2-n-octyl-4-isothiazoline-3-one (4,5-dichloro-2-n-octyl-3(2H)isothiazolone); N-(fluorodichloromethylthio)phthalimide; N,N'-dimethyl-N'-phenyl-(N-fluorodichloromethylthio)sulfamide; such a metallic salt as 2-pyridinethiol-1-oxide zinc salt (zinc pyrithione) and copper salt (copper pyrithione); tetramethylthiuram disulfide; 2,4,6-trichlorophenyl maleimide; 2,3,5,6-tetrachloro-4-(methylsulfonyl)pyridine; 3-iodo-2-propylbutyl carbamate; diiodo methyl-p-trisulfone; phenyl(bispyridyl)bismuth dichloride; 2-(4-thiazolyl)-benzimidazole; triphenylboron pyridine salt; stearylamine-triphenylboron; laurylamine-triphenylboron; bisdimethyldithiocarbamoyl zinc ethylenebisdithiocarbamate; 1,1-dichloro-N-[(dimethylamino) sulfonyl]-1-fluoro-N-phenylmethanesulfenamide; 1,1-dichloro-N-[(dimethylamino)sulfonyl]-1-fluoro-N-(4-methyphenyl)methanesulfenamide; N'-(3,4-dichlorophenyl)-N,N-dimethylurea; N'-tert-butyl-N-cyclopropyl-6-(methylthio)-1,3,5-triazine-2,4-diamine; and 4-bromo-2-(4-chlorophenyl)-5-(trifluoromethyl)-1H-pyrrole-3-carbonitrile, and the like. These antifouling agents may be used alone or in combination of two or more types.

A content of the antifouling agent is preferably not more than 10 mass % and more preferably not more than 8 mass % in the paint solid content. When the content of the antifouling agent exceeds 10 mass %, such defects as cracks or peel-off may occur in the antifouling coating film. As described above, in the colored antifouling paint used in the present invention, hydrolyzable resins (i) and (ii) themselves have good antifouling performance based on their own hydrolyzability and the silicon-containing group, and an amount of blending a separate antifouling agent can be reduced or the colored antifouling paint can be free from a separate antifouling agent. Thus, a colored antifouling paint having further improved color sharpness, color variation, and film thickness determination function can be realized.

(D) Thermoplastic Resin and/or Plasticizer

The colored antifouling paint above may contain a thermoplastic resin and/or a plasticizer. By containing a thermoplastic resin and/or a plasticizer, resistance to cracking of a coating film can be improved. In addition, since a polishing rate (a polishing speed) of the coating film can be controlled to a moderate speed, the coating film is advantageous also in terms of a long-term antifouling property. In particular, in a case where hydrolyzable resin (i) is employed as a main component of the hydrolyzable resin, a thermoplastic resin and/or a plasticizer are (is) preferably used together. For example, in a case where an object to be coated is a marine vessel or the like, the antifouling coating film is repeatedly exposed to a cycle of immersion in water (such as seawater) for a long period and landing after immersion in water for a certain period, and therefore the antifouling coating film is required to have flexibility with which it can withstand such a condition. Thus, resistance to cracking is an important characteristic required of the coating film.

Examples of the thermoplastic resins above include: chlorinated paraffin; chlorinated polyolefin such as chlorinated rubber, chlorinated polyethylene, and chlorinated polypropylene; polyvinyl ether; polypropylene sebacate; partially hydrogenated terphenyl; polyvinyl acetate; poly(meth) acrylic alkyl esters such as a methyl-(meth)acrylate-based copolymer, an ethyl-(meth)acrylate-based copolymer, a propyl-(meth)acrylate-based copolymer, a butyl-(meth)acrylate-based copolymer, and a cyclohexyl-(meth)acrylate-based copolymer; polyether polyol; an alkyd resin; a polyester resin; vinyl-chloride-based resins such as a vinyl chloride-vinyl acetate copolymer, a vinyl chloride-vinyl propionate copolymer, a vinyl chloride-isobutyl vinyl ether copolymer, a vinyl chloride-isopropyl vinyl ether copolymer, and a vinyl chloride-ethyl vinyl ether copolymer; a silicone oil; a wax; Vaseline; liquid paraffin; rosin, hydrogenated rosin, naphthenic acid, an aliphatic acid, and a divalent metal salt thereof; and the like. These thermoplastic resins may be used alone or in combination of two or more types.

Among the above, chlorinated paraffin, polyvinyl ether, polyether polyol, rosin, and a vinyl chloride-isobutyl vinyl ether copolymer are preferred, and in particular, chlorinated paraffin, polyvinyl ether, rosin, and a vinyl chloride-isobutyl vinyl ether copolymer are more preferably employed because they are suitable for adjustment of plasticity of a coating film and an amount of consumption of the coating film.

Examples of the plasticizers include: phthalate-ester-based plasticizers such as dioctyl phthalate (DOP), dimethyl phthalate, dicyclohexyl phthalate, and di-isodecyl phthalate (DIDP); an aliphatic-dibasic-acid-ester-based plasticizer such as isobutyl adipate and dibutyl sebacate; glycol-ester-based plasticizers such as diethylene glycol dibenzoate and pentaerythritol alkyl ester; phosphoric-ester-based plasticizers such as tricresyl phosphate, triaryl phosphate, and trichloroethyl phosphate; epoxy-based plasticizers such as epoxy soybean oil and octyl epoxy stearate; organic-tin-based plasticizers such as dioctyltin laurate and dibutyltin laurate; trioctyl trimellitate, triacethylene, and the like. These plasticizers may be used alone or in combination of two or more types.

Among the above, phthalate-ester-based plasticizers such as dioctyl phthalate (DOP), dimethyl phthalate, dicyclohexyl phthalate, and di-isodecyl phthalate (DIDP), and phosphoric-ester-based plasticizers such as tricresyl phosphate, triaryl phosphate, and trichloroethyl phosphate are preferably employed because they are particularly excellent in compatibility with the hydrolyzable resin above and the thermoplastic resin above and are able to homogenously improve resistance to cracking over the entire coating film.

The colored antifouling paint above may contain only a thermoplastic resin, may contain only a plasticizer, or may contain both of a thermoplastic resin and a plasticizer. Use of a thermoplastic resin and a plasticizer together is preferred because a coating film further excellent in strength and plasticity can be obtained.

Though a content of the thermoplastic resin and the plasticizer is not particularly restricted, the content can be set, for example, to 0 to 100 parts by mass with respect to 100 parts by mass of the hydrolyzable resin above, respectively, and the content is preferably set to 5 to 50 parts by mass, respectively.

In addition, the total content of the thermoplastic resin and the plasticizer is preferably within a range from 3 to 100 parts by mass and more preferably from 5 to 50 parts by mass with respect to 100 parts by mass of the hydrolyzable resin above. When the total content of the thermoplastic resin and the plasticizer is less than 3 parts by mass with respect to 100 parts by mass of the hydrolyzable resin, an effect of improvement in resistance to cracking resulting from addition of the thermoplastic resin and/or the plasticizer does not tend to be seen. When the total content of the thermoplastic resin and the plasticizer is extremely small or they are not contained, a moderate polishing rate (polishing speed) may not be obtained and a long-term antifouling property may not be provided. When the total content of the thermoplastic resin and the plasticizer exceeds 100 parts by mass with respect to 100 parts by mass of the hydrolyzable resin, adhesiveness of a coating film to an underlying substrate tends to lower and an antifouling property tends to lower.

(E) Other Additives

The colored antifouling paint may contain other additives such as an extender pigment, a solvent, a water binder, an anti-sagging agent, an anti-floating agent, an anti-settling agent, a defoaming agent, a coating film consumption control agent, a UV absorber, a surface control agent, a viscosity control agent, a leveling agent, a pigment dispersant, and an antifouling agent elution control agent. A content of these other additives is preferably set to such an extent that a sharp color tone of the color pigment or the color pigment's performance of hiding an underlying substrate is not interfered and a film thickness determination function of the colored antifouling paint is not lowered.

Examples of the extender pigments above include barium sulfate, talc, clay, chalk, silica white, alumina white, bentonite, calcium carbonate, magnesium carbonate, silica, silicate, aluminum oxide hydrate, calcium sulfate, and the like. These extender pigments may be used alone or in combination of two or more types.

Examples of the solvents include: hydrocarbons such as toluene, xylene, ethylbenzene, cyclopentane, octane, heptane, cyclohexane, and white spirit; ethers such as dioxane, tetrahydrofuran, ethyleneglycol monomethyl ether, ethyleneglycol monoethyl ether, ethyleneglycol monobutyl ether, ethyleneglycol dibutyl ether, diethyleneglycol monomethyl ether, and diethyleneglycol monoethyl ether; esters such as butyl acetate, propyl acetate, benzyl acetate, ethyleneglycol monomethyl ether acetate, and ethyleneglycol monoethyl ether acetate; ketones such as ethyl isobutyl ketone and methyl isobutyl ketone; alcohols such as n-butanol and propyl alcohol; and the like. These solvents may be used alone or in combination of two or more types.

It is noted that the colored antifouling paint above may contain other vehicle components than hydrolyzable resin (i), (ii) above and that a content thereof is preferably minimized.

The colored antifouling paint can be prepared, for example, by adding the color pigment and the antifouling agent, the thermoplastic resin and/or the plasticizer, and optionally other additives to the hydrolyzable resin above or a resin composition containing the same and then mixing the mixture by using such a mixer as a ball mill, a pebble mill, a roll mill, a sand-grinding mill, a high-speed disperser.

<Film Thickness Determination Function of Colored Antifouling Paint>

The colored antifouling paint employed in the present invention is an antifouling paint excellent in film thickness determination function, which satisfies at least conditions (a) and (b) below and preferably further satisfies a condition (d) below:

(a) A coating film formed from the colored antifouling paint having a target dry film thickness T completely hides a surface of an object to be coated;

(b) Color difference $\Delta E1$ between a coating film formed from the colored antifouling paint having the target dry film thickness T and a coating film formed from the colored antifouling paint having a dry film thickness of 0.8 T is not lower than 2.0; and (d) Color difference $\Delta E2$ between a coating film formed from the colored antifouling paint having the target dry film thickness T and a coating film formed from the colored antifouling paint having a dry film thickness of 1.2 T is less than 1.

Color differences $\Delta E1$ and $\Delta E2$ as well as $\Delta E3$ which will be described later can be measured with a generally employed method, by using such a color difference meter (a colorimeter) as a tristimulus colorimeter SM color meter (model number SM-T45 manufactured by Suga Test Instruments Co., Ltd., JIS Z8722). Color differences $\Delta E1$, $\Delta E2$, and $\Delta E3$ are each indicated by an absolute value.

The condition (a) above defines an ability for a coating film formed from the colored antifouling paint to hide a surface of an object to be coated (the coating film herein refers to a dry coating film, however, a wet coating film and a dry coating film are substantially the same in ability to hide an underlying substrate). As the surface of the object to be coated is coated with the colored antifouling paint and as a thickness of the coating film increases, a degree of "see-through" of the surface of the object to be coated becomes lower. It is determined that the coating film formed from the colored antifouling paint completely hides the surface of the object to be coated when a color tone of the surface of the object to be coated disappears and the color tone of a coated surface becomes the same as the color tone of the coating film formed from the colored antifouling paint. The colored antifouling paint employed in the present invention can achieve such complete hiding of the surface of the object to be coated when a dry coating film not smaller than the target dry film thickness T is formed.

The condition (b) above defines color difference $\Delta E1$ between the dry coating film formed from the colored antifouling paint having the target dry film thickness T and the dry coating film having the dry film thickness of 0.8 T. The coating film having the dry coating film thickness of 0.8 T is a coating film immediately before painting is completed. Therefore, with great color difference $\Delta E1$ being not smaller than 2.0, dependence on a film thickness, of a color tone of a coating film just before painting is completed (from immediately before the target dry film thickness T (0.8 T) to the target dry film thickness T) becomes great, and therefore a dry coating film having the target dry film thickness T can extremely accurately be formed and even small shortage in film thickness can be avoided. Color difference $\Delta E1$ is preferably not smaller than 2.5. It is noted that too great color difference $\Delta E1$ is likely to cause mottled color due to even a small difference in film thickness, and hence color difference $\Delta E1$ is preferably not greater than 10 and more preferably not greater than 5. Color difference $\Delta E1$ "not smaller than 2.0" and further "not smaller than 2.5" was realized by using hydrolyzable resin(s) (i) and/or (ii) as the hydrolyzable resin and it could not be achieved with a conventional hydrolyzable resin.

It is noted that the target dry film thickness T can be selected as appropriate in consideration of an antifouling property or the like required of an object to be coated, and it is not particularly limited. For example, the target dry film thickness T can be approximately not smaller than 30 μm and not greater than 300 μm with a dry film thickness of one coat (one layer of an antifouling coating film formed by applying the method according to the present invention).

The condition (d) above defines color difference $\Delta E2$ between the dry coating film formed from the colored antifouling paint having the target dry film thickness T and a dry coating film having the dry film thickness of 1.2 T. The coating film having the dry coating film thickness of 1.2 T is a coating film immediately after painting was completed. When color difference $\Delta E2$ is equal to or greater than 1, color difference between the coating film having the target dry film thickness T and the coating film having a thickness exceeding the target dry film thickness T is great, which is likely to cause mottled color. Color difference $\Delta E2$ is preferably not greater than 0.5 and further preferably not greater than 0.4.

Color difference $\Delta E3$ between the colored antifouling paint itself and the surface of an object to be coated is preferably greater than 0 and more preferably not smaller than 5. As color difference $\Delta E3$ is greater, how a color difference from the object to be coated changes can readily visually be checked as the thickness of the coating film being applied is closer to the target film thickness. Namely, when color difference $\Delta E3$ is too small, it becomes difficult to check whether or not the coating film has completely hidden the surface of the object to be coated and a coating film having the target dry film thickness T is less likely to be obtained. According to the present invention, since hydrolyzable resin(s) (i) and/or (ii) are (is) employed as a vehicle, a colored antifouling paint great in color difference $\Delta E3$ can readily be obtained.

The colored antifouling paint satisfying the conditions above can be obtained by selecting a type of the color pigment (a color tone) and adjusting a content thereof, on the premise that hydrolyzable resin(s) (i) and/or (ii) are (is) employed as a vehicle. The target dry film thickness T of the colored antifouling paint can be adjusted in accordance with a content of the color pigment. Namely, basically, by decreasing a content of the color pigment, the target dry film thickness T of the colored antifouling paint can be increased. In other words, since the target dry film thickness T is determined by characteristics of a coating film such as antifouling performance, resistance to cracking, and the like required of the coating film, a type of an object to be coated, and the like, a content of the color pigment is adjusted in accordance with the prescribed target dry film thickness T.

Alternatively, the colored antifouling paint employed in the present invention may be prepared by mixing two or more types of colored antifouling paints different in the target dry film thickness T (different in content of the color pigment) (the colored antifouling paints are according to the present invention and satisfy the conditions (a) to (c) above and preferably further satisfy (d)). With such a preparation method, a colored antifouling paint having a target dry film thickness different from a target dry film thickness of a mixed colored antifouling paints can readily be obtained. With this method, the target dry film thickness T of an obtained colored antifouling paint can be adjusted based on a mixing ratio of the colored antifouling paints to be mixed.

<Method of Forming Antifouling Coating Film>

According to the method of the present invention, the surface of the object to be coated is coated with the colored antifouling paint above while change in color difference between the coating film being applied and the surface of the object to be coated is observed. "Observing change in color difference between the coating film being applied and the surface of the object to be coated" typically refers to observation of whether "see-through" of the surface of the object to be coated takes place in the coated surface, that is, to which degree the coating film being applied (wet coating film) hides the surface of the object to be coated, and in the present invention, coating is carried out until the color tone of the coated surface becomes the same as the color tone of the coating film formed from the colored antifouling paint, that is, until the coating film formed from the colored antifouling paint completely hides the surface of the object to be coated. Since an ability for the wet coating film to hide an underlying substrate is substantially the same as that for the dry coating film, a thickness of the wet coating film at the time of complete hiding is comparable to a film thickness corresponding to the target dry film thickness. Here, since the colored antifouling paint employed in the present invention satisfies the condition (b) above, the color difference between the coating film immediately before painting is completed and the film thickness of the wet coating film corresponding to the target dry coating film is great and hence the dry coating film having the target dry film thickness can extremely accurately be formed. Whether the coating film formed from the colored antifouling paint completely hides the surface of the object to be coated or not can readily visually be checked.

According to the method of forming the antifouling coating film of the present invention as shown above, a uniform antifouling coating film having a prescribed dry film thickness can be formed more accurately than in the conventional method.

The antifouling coating film can be formed by coating the surface of the object to be coated with the colored antifouling paint above with an ordinary method and thereafter volatilizing and removing a solvent at room temperature or under heating as necessary. A coating method is not particularly limited, and conventionally known methods such as immersion, spraying, brush painting, roller painting, electrostatic painting, electropainting, and the like are exemplified.

The object to be coated is not particularly limited, and examples thereof include various structures, in particular underwater structures, made, for example, of steel materials such as a non-treated steel material, a blasted steel material, an acid-treated steel material, a zinc-plated steel material, and a stainless steel material, nonferrous metal materials such as an aluminum (alloy) material and a copper (alloy) material, concrete, plastic, and the like. These steel materials and non-ferrous metal materials may include a weld line. Specific examples of the object to be coated include an underwater structure such as marine vessels, harbor facilities, an intake structure such as a power plant, a pipe such as an aqueduct for cooling, a bridge, a buoyage, industrial water facilities, and a sea bottom base.

A surface of an object to be coated, which is to be coated with the colored antifouling paint, may be pre-treated as necessary or may have an undercoat coating film formed from an anti-corrosive paint, other antifouling paints, a binder paint for improving adhesiveness of a coating film formed from the colored antifouling paint, or the like. A paint forming the undercoat coating film may be an old coating film that has been used. In this case, the method according to the present invention may be applied for repair of the old coating film. Other antifouling paints above may be a colored antifouling paint according to the present invention different in color from the colored antifouling paint for coating, in addition to the conventionally known antifouling paints. In addition, the antifouling paint forming the undercoat coating film may have a color tone the same as that of the colored antifouling paint so long as the color tone of the undercoat coating film creates a sufficiently great color difference (a color difference corresponding to $\Delta E3$ above) from the colored antifouling paint formed thereon. In a case where an undercoat coating film is formed on the surface of the object to be coated, the "surface of the object to be coated" in the condition (a) above means the surface of the undercoat coating film.

EXAMPLES

Though the present invention will be described hereinafter in further detail with reference to Examples and Comparative Examples, the present invention is not limited thereto.

[1] Preparation of Metal-Atom-Containing Polymerizable Monomer (b)

Producing Example M1

Preparation of Metal-Atom-Containing Polymerizable Monomer Mixture M1

In a four-neck flask including a cooler, a thermometer, a dropping funnel, and a stirrer, 85.4 parts by mass of PGM (propyleneglycol methyl ether) and 40.7 parts by mass of zinc oxide were loaded, and a temperature thereof was raised to 75° C. while they were stirred. Then, a mixture composed of 43.1 parts by mass of methacrylic acid, 36.1 parts by mass of acrylic acid, and 5 parts by mass of water was dropped at a constant velocity in 3 hours from the dropping funnel. After further stirring for 2 hours, 36 parts by mass of PGM were added to thereby obtain a transparent metal-atom-containing polymerizable monomer mixture M1. A solid content was 44.8 mass %. This metal-atom-containing polymerizable monomer mixture M1 contains as metal-atom-containing polymerizable monomer (b), zinc di(meth)acrylate which is monomer (b2).

Producing Example M2

Preparation of Metal-Atom-Containing Polymerizable Monomer Mixture M2

In a four-neck flask including a cooler, a thermometer, a dropping funnel, and a stirrer, 72.4 parts by mass of PGM and 40.7 parts by mass of zinc oxide were loaded, and a temperature thereof was raised to 75° C. while they were stirred. Then, a mixture composed of 30.1 parts by mass of methacrylic acid, 25.2 parts by mass of acrylic acid, and 51.6 parts by mass of versatic acid was dropped at a constant velocity in 3 hours from the dropping funnel. After further stirring for 2 hours, 11 parts by mass of PGM were added to thereby obtain a transparent metal-atom-containing polymerizable monomer mixture M2. A solid content was 59.6 mass %. This metal-atom-containing polymerizable monomer mixture M2 contains as metal-atom-containing polymerizable monomer (b), zinc(meth)acrylate which is monomer (b1) expressed in the general formula (VP) above ($R^{30}$ being a versatic acid residue) and zinc di(meth)acrylate which is monomer (b2).

(Producing Example M3: Preparation of Metal-Atom-Containing Polymerizable Monomer Mixture M3)

In a four-neck flask including a cooler, a thermometer, a dropping funnel, and a stirrer, 60 parts by mass of xylene, 13 parts by mass of PGM, and 40.7 parts by mass of zinc oxide were loaded, and a temperature thereof was raised to 75° C. while they were stirred. Then, a mixture composed of 32.3 parts by mass of methacrylic acid, 27 parts by mass of acrylic acid, 37.7 parts by mass of oleic acid, 2.3 parts by mass of acetic acid, and 5.8 parts by mass of propionic acid was dropped at a constant velocity in 3 hours from the dropping funnel. After further stirring for 2 hours, 77 parts by mass of xylene and 46 parts by mass of PGM were added to thereby obtain a transparent metal-atom-containing polymerizable monomer mixture M3. A solid content was 39.6 mass %. This metal-atom-containing polymerizable monomer mixture M3 contains as metal-atom-containing polymerizable monomer (b), zinc(meth)acrylate which is monomer (b1) expressed in the general formula (VI') above ($R^{30}$ being one or more types of an oleic acid residue, an acetic acid residue, and a propionic acid residue) and zinc di(meth)acrylate which is monomer (b2).

[2] Preparation of Hydrolyzable Resin (i)

(Producing Example S1: Preparation of Hydrolyzable Resin Composition S1)

In a four-neck flask including a cooler, a thermometer, a dropping funnel, and a stirrer, 15 parts by mass of PGM, 65 parts by mass of xylene and 4 parts by mass of ethyl acrylate were loaded, and a temperature thereof was raised to 100° C. while they were stirred. Then, a mixture composed of 32.3 parts by mass of methyl methacrylate, 43.9 parts by mass of ethyl acrylate, 10 parts by mass of "FM-0721" (manufactured by Chisso Corporation), 21.7 parts by mass of metal-atom-containing polymerizable monomer mixture M1 in Producing Example M1 above, 10 parts by mass of xylene, 1.2 parts by mass of the chain transfer agent (α-methylstyrene dimer), 2.5 parts by mass of azobisisobutyronitrile (AIBN), and 3 parts by mass of azobismethylbutyronitrile (AMBN) was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 10.1 parts by mass of xylene were added to thereby obtain a hydrolyzable resin composition S1.

Obtained hydrolyzable resin composition S1 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S1 was 6800 in terms of polystyrene. In addition, the hydrolyzable resin isolated by reprecipitation using methanol from obtained hydrolyzable resin composition S1 was taken into a platinum crucible, to which sulfuric acid was added, and the mixture was placed in a pressure decomposition container for heating. After sulfuric acid was volatilized, the hydrolyzable resin was completely incinerated. This incinerated substance was let stand to cool and then fused with alkali. The resulting product was analyzed with an ICP emission spectroscopic apparatus ("SPS5100" manufactured by Seiko Instruments Inc.), and then Si atoms were detected. In addition, the hydrolyzable resin was analyzed with an atomic absorption spectrophotometer ("AA6300" manufactured by Shimadzu Corporation) and a signal derived from Zn atoms was detected.

Producing Example S2

Preparation of Hydrolyzable Resin Composition S2

In a four-neck flask including a cooler, a thermometer, a dropping funnel, and a stirrer, 15 parts by mass of PGM, 65 parts by mass of xylene, and 4 parts by mass of ethyl acrylate were loaded, and a temperature thereof was raised to 100° C. while they were stirred. Then, a mixture composed of 32.3 parts by mass of methyl methacrylate, 13.9 parts by mass of ethyl acrylate, 40 parts by mass of "FM-0711" (manufactured by Chisso Corporation), 21.7 parts by mass of metal-atom-containing polymerizable monomer mixture M1 in Producing Example M1 above, 10 parts by mass of xylene, 1.2 parts by mass of the chain transfer agent (α-methylstyrene dimer), 2.5 parts by mass of AIBN, and 0.8 part by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 10.1 parts by mass of xylene were added to thereby obtain a hydrolyzable resin composition S2.

Obtained hydrolyzable resin composition S2 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S2 was 8800 in terms of polystyrene.

Producing Example S3

Preparation of Hydrolyzable Resin Composition S3

In a four-neck flask including a cooler, a thermometer, a dropping funnel, and a stirrer, 15 parts by mass of PGM and 61 parts by mass of xylene were loaded, and a temperature thereof was raised to 100° C. while they were stirred. Then, a mixture composed of 18 parts by mass of methyl methacrylate, 25 parts by mass of ethyl acrylate, 40 parts by mass of "X-24-8201" (manufactured by Shin-Etsu Chemical Co., Ltd.), 28.4 parts by mass of metal-atom-containing polymerizable monomer mixture M2 in Producing Example M2 above, 20 parts by mass of PGM, 2.5 parts by mass of AIBN, and 1 part by mass of AMBN was dropped at a constant velocity in 4 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 4.6 parts by mass of xylene were added to thereby obtain hydrolyzable resin composition S3.

Obtained hydrolyzable resin composition S3 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S3 was 8200 in terms of polystyrene.

Producing Example S4

Preparation of Hydrolyzable Resin Composition S4

In a four-neck flask including a cooler, a thermometer, a dropping funnel, and a stirrer, 35 parts by mass of PGM and 41 parts by mass of xylene were loaded, and a temperature thereof was raised to 100° C. while they were stirred. Then, a mixture composed of 18 parts by mass of methyl methacrylate, 15 parts by mass of ethyl acrylate, 50 parts by mass of "X-24-8201" (manufactured by Shin-Etsu Chemical Co., Ltd.), 42.5 parts by mass of metal-atom-containing polymerizable monomer mixture M3 in Producing Example M3 above, 5 parts by mass of PGM, 2.5 parts by mass of AIBN, and 1 part by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 5.5 parts by mass of xylene were added to thereby obtain a hydrolyzable resin composition S4.

Obtained hydrolyzable resin composition S4 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S4 was 7200 in terms of polystyrene.

Producing Example S5

Preparation of Hydrolyzable Resin Composition S5

In a four-neck flask including a cooler, a thermometer, a dropping funnel, and a stirrer, 15 parts by mass of PGM, 59 parts by mass of xylene, and 4 parts by mass of ethyl acrylate were loaded, and a temperature thereof was raised to 100° C. while they were stirred. Then, a mixture composed of 26.4 parts by mass of methyl methacrylate, 25.5 parts by mass of ethyl acrylate, 30 parts by mass of a silicon-containing monomer A, 31.3 parts by mass of metal-atom-containing polymerizable monomer mixture M1 in Producing Example M1 above, 10 parts by mass of xylene, 1.5 parts by mass of the chain transfer agent (α-methylstyrene dimer), 2.5 parts by mass of AIBN, and 4 parts by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 10.8 parts by mass of xylene were added to thereby obtain a hydrolyzable resin composition S5.

Obtained hydrolyzable resin composition S5 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S5 was 6400 in terms of polystyrene.

Producing Example S6

Preparation of Hydrolyzable Resin Composition S6

In a four-neck flask including a cooler, a thermometer, a dropping funnel, and a stirrer, 15 parts by mass of PGM, 59 parts by mass of xylene, and 4 parts by mass of ethyl acrylate were loaded, and a temperature thereof was raised to 100° C. while they were stirred. Then, a mixture composed of 21.4 parts by mass of methyl methacrylate, 25.5 parts by mass of ethyl acrylate, 5 parts by mass of styrene, 30 parts by mass of a silicon-containing monomer B, 31.3 parts by mass of metal-atom-containing polymerizable monomer mixture M1 in Producing Example M1 above, 10 parts by mass of xylene, 1.5 parts by mass of the chain transfer agent (α-methylstyrene dimer), 2.5 parts by mass of AIBN, and 2.5 parts by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 10.8 parts by mass of xylene were added to thereby obtain a hydrolyzable resin composition S6.

Obtained hydrolyzable resin composition S6 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S6 was 6900 in terms of polystyrene.

Producing Example S7

Preparation of Hydrolyzable Resin Composition S7

In a four-neck flask including a cooler, a thermometer, a dropping funnel, and a stirrer, 15 parts by mass of PGM, 59 parts by mass of xylene, and 4 parts by mass of ethyl acrylate were loaded, and a temperature thereof was raised to 100° C. while they were stirred. Then, a mixture composed of 26.4 parts by mass of methyl methacrylate, 14.5 parts by mass of ethyl acrylate, 5 parts by mass of 2-methoxyethyl acrylate, 20 parts by mass of "FM-0711" (manufactured by Chisso Corporation), 20 parts by mass of "TM-0701" (manufactured by Chisso Corporation), 31.3 parts by mass of metal-atom-containing polymerizable monomer mixture M1 in Producing Example M1 above, 10 parts by mass of xylene, 1.5 parts by mass of the chain transfer agent α-methylstyrene dimer), 2.5 parts by mass of AIBN, and 2.5 parts by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 10.8 parts by mass of xylene were added to thereby obtain a hydrolyzable resin composition S7.

Obtained hydrolyzable resin composition S7 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S7 was 7000 in terms of polystyrene.

Producing Example S8

Preparation of Hydrolyzable Resin Composition S8

In a four-neck flask including a cooler, a thermometer, a dropping funnel, and a stirrer, 15 parts by mass of PGM and 61 parts by mass of xylene were loaded, and a temperature thereof was raised to 100° C. while they were stirred. Then, a mixture composed of 18 parts by mass of methyl methacrylate, 35 parts by mass of ethyl acrylate, 30 parts by mass of a silicon-containing monomer C, 28.4 parts by mass of metal-atom-containing polymerizable monomer mixture M2 in Producing Example M2 above, 20 parts by mass of PGM, 2.5 parts by mass of AIBN, and 2 parts by mass of AMBN was dropped at a constant velocity in 4 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 4.6 parts by mass of xylene were added to thereby obtain a hydrolyzable resin composition S8.

Obtained hydrolyzable resin composition S8 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S8 was 7700 in terms of polystyrene.

Producing Example S9

Preparation of Hydrolyzable Resin Composition S9

In a four-neck flask including a cooler, a thermometer, a dropping funnel, and a stirrer, 15 parts by mass of PGM, 59 parts by mass of xylene, and 4 parts by mass of ethyl acrylate were loaded, and a temperature thereof was raised to 100° C. while they were stirred. Then, a mixture composed of 26.4 parts by mass of methyl methacrylate, 35.5 parts by mass of ethyl acrylate, 20 parts by mass of a silicon-containing monomer D, 31.3 parts by mass of metal-atom-containing polymerizable monomer mixture M1 in Producing Example M1 above, 10 parts by mass of xylene, 1.5 parts by mass of the chain transfer agent (α-methylstyrene dimer), 2.5 parts by mass of AIBN, and 5.5 parts by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 10.8 parts by mass of xylene were added to thereby obtain a hydrolyzable resin composition S9.

Obtained hydrolyzable resin composition S9 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S9 was 6000 in terms of polystyrene.

Producing Example S10

Preparation of Hydrolyzable Resin Composition S10

In a four-neck flask including a cooler, a thermometer, a dropping funnel, and a stirrer, 15 parts by mass of PGM, 65 parts by mass of xylene, and 4 parts by mass of ethyl acrylate were loaded, and a temperature thereof was raised to 100° C. while they were stirred. Then, a mixture composed of 32.3 parts by mass of methyl methacrylate, 43.9 parts by mass of ethyl acrylate, 10 parts by mass of "FM-7711" (manufactured by Chisso Corporation), 21.7 parts by mass of metal-atom-containing polymerizable monomer mixture M1 in Producing Example M1 above, 10 parts by mass of xylene, 2 parts by mass of the chain transfer agent (α-methylstyrene dimer), 2.5 parts by mass of AIBN, and 7.5 parts by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 10.1 parts by mass of xylene were added to thereby obtain a hydrolyzable resin composition S10.

Obtained hydrolyzable resin composition S10 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S10 was 5400 in terms of polystyrene. In addition, the hydrolyzable resin isolated by reprecipitation using methanol from obtained hydrolyzable resin composition S10 was taken into a platinum crucible, to which sulfuric acid was added, and the mixture was placed in a pressure decomposition container for heating. After sulfuric acid was volatilized, the hydrolyzable resin was completely incinerated. This incinerated substance was let stand to cool and then fused with alkali. The resulting product was analyzed with an ICP emission spectroscopic apparatus ("SPS5100" manufactured by Seiko Instruments Inc.), and then Si atoms were detected. In addition, the hydrolyzable resin was analyzed with an atomic absorption spectrophotometer ("AA6300" manufactured by Shimadzu Corporation) and a signal derived from Zn atoms was detected.

Producing Example S11

Preparation of Hydrolyzable Resin Composition S11

In a four-neck flask including a cooler, a thermometer, a dropping funnel, and a stirrer, 15 parts by mass of PGM, 65 parts by mass of xylene, and 4 parts by mass of ethyl acrylate were loaded, and a temperature thereof was raised to 100° C. while they were stirred. Then, a mixture composed of 32.3 parts by mass of methyl methacrylate, 33.9 parts by mass of ethyl acrylate, 20 parts by mass of "FM-7721" (manufactured by Chisso Corporation), 21.7 parts by mass of metal-atom-containing polymerizable monomer mixture M1 in Producing Example M1 above, 10 parts by mass of xylene, 1.5 parts by mass of the chain transfer agent (α-methylstyrene dimer), 2.5 parts by mass of AIBN, and 5 parts by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 10.1 parts by mass of xylene were added to thereby obtain a hydrolyzable resin composition S11.

Obtained hydrolyzable resin composition S11 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S11 was 6200 in terms of polystyrene.

Producing Example S12

Preparation of Hydrolyzable Resin Composition S12

In a four-neck flask including a cooler, a thermometer, a dropping funnel, and a stirrer, 15 parts by mass of PGM, 59 parts by mass of xylene, and 4 parts by mass of ethyl acrylate were loaded, and a temperature thereof was raised to 100° C. while they were stirred. Then, a mixture composed of 26.4 parts by mass of methyl methacrylate, 40.5 parts by mass of ethyl acrylate, 15 parts by mass of a silicon-containing monomer E, 31.3 parts by mass of metal-atom-containing polymerizable monomer mixture M1 in Producing Example M1 above, 10 parts by mass of xylene, 2 parts by mass of the chain transfer agent (α-methylstyrene dimer), 2.5 parts by mass of AIBN, and 8 parts by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 10.8 parts by mass of xylene were added to thereby obtain a hydrolyzable resin composition S12.

Obtained hydrolyzable resin composition S12 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S12 was 5600 in terms of polystyrene.

Producing Example S13

Preparation of Hydrolyzable Resin Composition S13

In a four-neck flask including a cooler, a thermometer, a dropping funnel, and a stirrer, 15 parts by mass of PGM, 59 parts by mass of xylene, and 4 parts by mass of ethyl acrylate were loaded, and a temperature thereof was raised to 100° C. while they were stirred. Then, a mixture composed of 26.4 parts by mass of methyl methacrylate, 35.5 parts by mass of ethyl acrylate, 20 parts by mass of a silicon-containing monomer F, 31.3 parts by mass of metal-atom-containing polymerizable monomer mixture M1 in Producing Example M1 above, 10 parts by mass of xylene, 1.5 parts by mass of the chain transfer agent (α-methylstyrene dimer), 2.5 parts by mass of AIBN, and 7.5 parts by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 10.8 parts by mass of xylene were added to thereby obtain a hydrolyzable resin composition S13.

Obtained hydrolyzable resin composition S13 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S13 was 5500 in terms of polystyrene.

Producing Example S14

Preparation of Hydrolyzable Resin Composition S14

In a four-neck flask including a cooler, a thermometer, a dropping funnel, and a stirrer, 15 parts by mass of PGM, 65 parts by mass of xylene, and 4 parts by mass of ethyl acrylate were loaded, and a temperature thereof was raised to 100° C. while they were stirred. Then, a mixture composed of 32.3 parts by mass of methyl methacrylate, 13.9 parts by mass of ethyl acrylate, 5 parts by mass of "FM-7711" (manufactured by Chisso Corporation), 35 parts by mass of "FM-0711" (manufactured by Chisso Corporation), 21.7 parts by mass of metal-atom-containing polymerizable monomer mixture M1 in Producing Example M1 above, 10 parts by mass of xylene, 1.2 parts by mass of the chain transfer agent (α-methylstyrene dimer), 2.5 parts by mass of AIBN, and 4 parts by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 10.1 parts by mass of xylene were added to thereby obtain a hydrolyzable resin composition S14.

Obtained hydrolyzable resin composition S14 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S14 was 9000 in terms of polystyrene.

Producing Example S15

Preparation of Hydrolyzable Resin Composition S15

In a four-neck flask including a cooler, a thermometer, a dropping funnel, and a stirrer, 35 parts by mass of PGM and 31 parts by mass of xylene were loaded, and a temperature thereof was raised to 100° C. while they were stirred. Then, a mixture composed of 18 parts by mass of methyl methacrylate, 25 parts by mass of ethyl acrylate, 10 parts by mass of "FM-7721" (manufactured by Chisso Corporation), 30 parts by mass of "X-24-8201" (manufactured by Shin-Etsu Chemical Co., Ltd.), 28.4 parts by mass of metal-atom-containing polymerizable monomer mixture M2 in Producing Example M2 above, 30 parts by mass of xylene, 2.5 parts by mass of AIBN, and 2.5 parts by mass of AMBN was dropped at a constant velocity in 4 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 4.6 parts by mass of xylene were added to thereby obtain a hydrolyzable resin composition S15.

Obtained hydrolyzable resin composition S15 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S15 was 7200 in terms of polystyrene.

Producing Example S16

Preparation of Hydrolyzable Resin Composition S16

In a four-neck flask including a cooler, a thermometer, a dropping funnel, and a stirrer, 40 parts by mass of PGM and 31 parts by mass of xylene were loaded, and a temperature thereof was raised to 100° C. while they were stirred. Then, a mixture composed of 18 parts by mass of methyl methacrylate, 15 parts by mass of ethyl acrylate, 10 parts by mass of "FM-7711" (manufactured by Chisso Corporation), 10 parts by mass of "FM-7721" (manufactured by Chisso Corporation), 30 parts by mass of "FM-0711" (manufactured by Chisso Corporation), 42.5 parts by mass of metal-atom-containing polymerizable monomer mixture M3 in Producing Example M3 above, 10 parts by mass of xylene, 2.5 parts by mass of AIBN, and 4.5 parts by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 5.5 parts by mass of xylene were added to thereby obtain a hydrolyzable resin composition S16.

Obtained hydrolyzable resin composition S16 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S16 was 6400 in terms of polystyrene.

Producing Example S17

Preparation of Hydrolyzable Resin Composition S17

In a four-neck flask including a cooler, a thermometer, a dropping funnel, and a stirrer, 15 parts by mass of PGM, 59 parts by mass of xylene, and 4 parts by mass of ethyl acrylate were loaded, and a temperature thereof was raised to 100° C. while they were stirred. Then, a mixture composed of 26.4 parts by mass of methyl methacrylate, 15.5 parts by mass of ethyl acrylate, 2 parts by mass of a silicon-containing monomer G, 38 parts by mass of silicon-containing monomer D, 31.3 parts by mass of metal-atom-containing polymerizable monomer mixture M1 in Producing Example M1 above, 10 parts by mass of xylene, 1.2 parts by mass of the chain transfer agent (α-methylstyrene dimer), 2.5 parts by mass of AIBN, and 5.5 parts by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 10.8 parts by mass of xylene were added to thereby obtain a hydrolyzable resin composition S17.

Obtained hydrolyzable resin composition S17 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S17 was 5600 in terms of polystyrene.

Producing Example S18

Preparation of Hydrolyzable Resin Composition S18

In a four-neck flask including a cooler, a thermometer, a dropping funnel, and a stirrer, 35 parts by mass of PGM and 31 parts by mass of xylene were loaded, and a temperature thereof was raised to 100° C. while they were stirred. Then, a mixture composed of 18 parts by mass of methyl methacrylate, 45 parts by mass of ethyl acrylate, 10 parts by mass of silicon-containing monomer G, 10 parts by mass of "TM-0701" (manufactured by Chisso Corporation), 28.4 parts by mass of metal-atom-containing polymerizable monomer mixture M2 in Producing Example M2 above, 30 parts by mass of xylene, 2.5 parts by mass of AIBN, and 5 parts by mass of AMBN was dropped at a constant velocity in 4 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 4.6 parts by mass of xylene were added to thereby obtain a hydrolyzable resin composition S18.

Obtained hydrolyzable resin composition S18 was analyzed with GPC ("HLC-8220GPC" manufactured by Tosoh Corporation, eluant: dimethylformamide). Then, a value for a weight-average molecular weight of the hydrolyzable resin contained in hydrolyzable resin composition S18 was 6000 in terms of polystyrene.

Tables 1 and 2 summarize a charging amount of each raw material used for preparation of hydrolyzable resin compositions S1 to S18 above (parts by mass), Gardner viscosity (measured at 25° C. with the use of a Gardner bubble viscometer) and a solid content (mass %) of hydrolyzable resin compositions S1 to S18, as well as a weight-average molecular weight of the hydrolyzable resins contained in the compositions.

TABLE 1

|  |  |  |  | Producing Example |  |  |  |  |  |  |  |  |
|---|---|---|---|---|---|---|---|---|---|---|---|---|
|  |  |  |  | S1 | S2 | S3 | S4 | S5 | S6 | S7 | S8 | S9 |
| Charging Amount (Parts by Mass) | (a) | (a1) | FM-0711 |  | 40 |  |  |  |  | 20 |  |  |
|  |  |  | FM-0721 | 10 |  |  |  |  |  |  |  |  |
|  |  |  | X-24-8201 |  |  | 40 | 50 |  |  |  |  |  |
|  |  |  | Silicon-Containing Monomer A |  |  |  |  | 30 |  |  |  |  |
|  |  |  | Silicon-Containing Monomer B |  |  |  |  |  | 30 |  |  |  |
|  |  | (a2) | TM-0701 |  |  |  |  |  |  | 20 |  |  |
|  |  |  | Silicon-Containing Monomer C |  |  |  |  |  |  |  | 30 |  |
|  |  |  | Silicon-Containing Monomer D |  |  |  |  |  |  |  |  | 20 |
|  | (b) Metal-Atom-Containing Monomer Mixture | M1 |  | 21.7 | 21.7 |  |  | 31.3 | 31.3 | 31.3 |  | 31.3 |
|  |  | M2 |  |  |  | 28.4 |  |  |  |  | 28.4 |  |
|  |  | M3 |  |  |  |  | 42.5 |  |  |  |  |  |
|  | (d) | MMA |  | 32.3 | 32.3 | 18 | 18 | 26.4 | 21.4 | 26.4 | 18 | 26.4 |
|  |  | EA |  | 43.9 | 17.9 | 25 | 15 | 29.5 | 29.5 | 18.5 | 35 | 39.5 |
|  |  | 2-MTA |  |  |  |  |  |  |  | 5 |  |  |
|  |  | ST |  |  |  |  |  | 5 |  |  |  |  |
|  | Initiator | AIBN |  | 2.5 | 2.5 | 2.5 | 2.5 | 2.5 | 2.5 | 2.5 | 2.5 | 2.5 |
|  |  | AMBN |  | 3 | 0.8 | 1 | 1 | 4 | 2.5 | 2.5 | 2 | 5.5 |
|  | Chain Transfer Agent | Nofmer MSD |  | 1.2 | 1.2 |  |  | 1.5 | 1.5 | 1.5 |  | 1.5 |
| Gardner Viscosity |  |  |  | −U | +U | +U | +R | −W | −T | −V | +T | +W |
| Solid Content (Mass %) |  |  |  | 45.7 | 45.1 | 45.2 | 45.0 | 45.8 | 45.3 | 45.6 | 45.3 | 45.6 |
| Weight-Average Molecular Weight |  |  |  | 6800 | 8800 | 8200 | 7200 | 6400 | 6900 | 7000 | 7700 | 6000 |

TABLE 2

|  |  |  |  | Producing Example |  |  |  |  |  |  |  |  |
|---|---|---|---|---|---|---|---|---|---|---|---|---|
|  |  |  |  | S10 | S11 | S12 | S13 | S14 | S15 | S16 | S17 | S18 |
| Charging Amount | (a) | (a1) | FM-0711 |  |  |  |  |  | 35 |  | 30 |  |
|  |  |  | X-24-8201 |  |  |  |  | 30 |  |  |  |  |

TABLE 2-continued

| | | | S10 | S11 | S12 | S13 | S14 | S15 | S16 | S17 | S18 |
|---|---|---|---|---|---|---|---|---|---|---|---|
| (Parts by Mass) | (a2) | TM-0701 | | | | | | | | | 10 |
| | | Silicon-Containing Monomer D | | | | | | | | 38 | |
| | (a3) | FM-7711 | 10 | | | | 5 | | 10 | | |
| | | FM-7721 | | 20 | | | | | 10 | 10 | |
| | | Silicon-Containing Monomer E | | | 15 | | | | | | |
| | (a4) | Silicon-Containing Monomer F | | | | | 20 | | | | |
| | | Silicon-Containing Monomer G | | | | | | | | 2 | 10 |
| (b) Metal-Atom-Containing Monomer Mixture | | M1 | 21.7 | 21.7 | 31.3 | 31.3 | 21.7 | | | 31.3 | |
| | | M2 | | | | | | 28.4 | | | 28.4 |
| | | M3 | | | | | | | 42.5 | | |
| (d) | | MMA | 32.3 | 32.3 | 26.4 | 26.4 | 32.3 | 18 | 18 | 26.4 | 18 |
| | | EA | 47.9 | 37.9 | 44.5 | 39.5 | 17.9 | 25 | 15 | 19.5 | 45 |
| Initiator | | AIBN | 2.5 | 2.5 | 2.5 | 2.5 | 2.5 | 2.5 | 2.5 | 2.5 | 2.5 |
| | | AMBN | 7.5 | 5 | 8 | 7.5 | 4 | 2.5 | 4.5 | 5.5 | 5 |
| Chain Transfer Agent | | Nofmer MSD | 2 | 1.5 | 2 | 1.5 | 1.2 | | | 1.2 | |
| Gardner Viscosity | | | +W | +U | +R | −W | +V | −V | −T | −T | +W |
| Solid Content (Mass %) | | | 46.2 | 46.1 | 46.4 | 45.8 | 45.6 | 45.4 | 45.6 | 45.6 | 45.6 |
| Weight-Average Molecular Weight | | | 5400 | 6200 | 5600 | 5500 | 9000 | 7200 | 6400 | 5600 | 6000 |

A trade name and abbreviation shown in Tables 1 and 2 are as follows.

(1) FM-0711 (a trade name, a product of Chisso Corporation): a silicon-containing polymerizable monomer having m=0, b=3, n=10, and $R^1$ to $R^5$ and $R^{31}$ each being a methyl group in the general formula (I') above (2) FM-0721 (a trade name, a product of Chisso Corporation): a silicon-containing polymerizable monomer having m=0, b=3, n=65, and $R^1$ to $R^5$ and $R^{31}$ each being a methyl group in the general formula (I') above (3) X-24-8201 (a trade name, a product of Shin-Etsu Chemical Co., Ltd.): a silicon-containing polymerizable monomer having m=0, b=3, n=25, and $R^1$ to $R^5$ and $R^{31}$ each being a methyl group in the general formula (I') above (4) Silicon-containing monomer A: a silicon-containing polymerizable monomer having m=10, b=3, n=10, and $R^1$ to $R^5$ and $R^{31}$ each being a methyl group in the general formula (I') above, which is a 1:1 (molar ratio) mixture of a monomer with a being set to 2 and a monomer with a being set to 3 (this monomer was commercially available from Nippon Unicar Co., Ltd. under a trade name "F2-254-04")

(5) Silicon-containing monomer B: a silicon-containing polymerizable monomer having m=4, b=3, n=10, and $R^1$ to $R^5$ and $R^{31}$ each being a methyl group in the general formula (I') above, which is a 1:1 (molar ratio) mixture of a monomer with a being set to 2 and a monomer with a being set to 3 (this monomer was commercially available from Nippon Unicar Co., Ltd. under a trade name "F2-254-14")

(6) TM-0701 (a trade name, a product of Chisso Corporation): a silicon-containing polymerizable monomer having p=0, d=3, and $R^6$ to $R^8$ and $R^{32}$ each being a methyl group in the general formula (II') above (7) Silicon-containing monomer C: a silicon-containing polymerizable monomer having p=0, d=3, $R^6$ to $R^7$ and $R^{32}$ each being a methyl group, and $R^8$ being $R^a$ (x=3, $R^{23}$ to $R^{27}$ each being a methyl group) in the general formula (II') above (this monomer was commercially available from Nippon Unicar Co., Ltd. under a trade name "F2-302-01")

(8) Silicon-containing monomer D: a silicon-containing polymerizable monomer having p=10, d=3, $R^6$ to $R^7$ and $R^{32}$ each being a methyl group, and $R^8$ being $R^a$ (x=3, $R^{23}$ to $R^{27}$ each being a methyl group) in the general formula (II') above, which is a 1:1 (molar ratio) mixture of a monomer with c being set to 2 and a monomer with c being set to 3 (this monomer was commercially available from Nippon Unicar Co., Ltd. under a trade name "F2-302-04")

(9) FM-7711 (a trade name, a product of Chisso Corporation): a silicon-containing polymerizable monomer having q and s=0, f and g=3, r=10, and $R^9$ to $R^{12}$, $R^{33}$, and $R^{34}$ each being a methyl group in the general formula (III') above

(10) FM-7721 (a trade name, a product of Chisso Corporation): a silicon-containing polymerizable monomer having q and s=0, f and g=3, r=65, and $R^9$ to $R^{12}$, $R^{33}$, and $R^{34}$ each being a methyl group in the general formula (III') above

(11) Silicon-containing monomer E: a silicon-containing polymerizable monomer having q and s=10, f and g=3, r=10, and $R^9$ to $R^{12}$, $R^{33}$, and $R^{34}$ each being a methyl group in the general formula (III') above, which is a 1:1 (molar ratio) mixture of a monomer with e and h being set to 2 and a monomer with e and h being set to 3 (this monomer was commercially available from Nippon Unicar Co., Ltd. under a trade name "F2-354-04")

(12) Silicon-containing monomer F: a silicon-containing polymerizable monomer having t and u=0, j and k=3, v and w=3, and $R^{13}$ to $R^{22}$, $R^{35}$, and $R^{36}$ each being a methyl group in the general formula (IV') above (this monomer was commercially available from Nippon Unicar Co., Ltd. under a trade name "F2-312-01")

(13) Silicon-containing monomer G: a silicon-containing polymerizable monomer having t and u=10, j and k=3, v and w=3, and $R^{13}$ to $R^{22}$, $R^{35}$, and $R^{36}$ each being a methyl group in the general formula (IV') above, which is a 1:1 (molar ratio) mixture of a monomer with i and l being set to 2 and a monomer with i and l being set to 3 (this monomer was commercially available from Nippon Unicar Co., Ltd. under a trade name "F2-312-04")

(14) MMA: methyl methacrylate
(15) EA: ethyl acrylate
(16) 2-MTA: 2-methoxyethyl acrylate
(17) ST: styrene
(18) AIBN: azobisisobutyronitrile
(19) AMBN: azobismethylbutyronitrile

[3] Preparation of Hydrolyzable Resin (ii)

Producing Example S19

Preparation of Hydrolyzable Resin Composition S19

In a four-neck flask including a stirrer, a cooler, a temperature control device, a nitrogen introduction pipe, and a dropping funnel, 70 parts by mass of xylene were added and kept at 100° C. In this solution, a mixture solution composed of a monomer in accordance with a formulation (parts by mass) in Table 3 and 2 parts by mass of t-butylperoxy-2-ethylhexanoate was dropped at a constant velocity for 3 hours. After dropping ended, the temperature of the mixture solution was kept for 30 minutes. Thereafter, a mixture solution composed of 30 parts by mass of xylene and 0.2 part by mass of t-butylperoxy-2-ethylhexanoate was dropped at a constant velocity for 30 minutes. After dropping ended, the temperature of the mixture solution was kept for 1.5 hours. A varnish A was thus obtained. A solid content in obtained varnish A was 50.1 mass % and viscosity was 27 poises. In addition, a number average molecular weight (GPC, in terms of polystyrene, to be understood similarly hereafter) of the hydrolyzable resin contained in varnish A was 15000. In Examples below, this varnish A was employed as it is as a hydrolyzable resin composition S19.

Producing Example S20

Preparation of Hydrolyzable Resin Composition S20

In a reaction vessel as in Producing Example S19 above, 80 parts by mass of xylol were added and kept at 100° C. In this solution, a mixture solution composed of a monomer in accordance with a formulation (parts by mass) in Table 3 and 1 part by mass of t-butylperoxy-2-ethylhexanoate was dropped at a constant velocity for 3 hours. After dropping ended, the temperature of the mixture solution was kept for 30 minutes. Thereafter, a mixture solution composed of 20 parts by mass of xylene and 0.2 part by mass of t-butylperoxy-2-ethylhexanoate was dropped at a constant velocity for 30 minutes. After dropping ended, the temperature of the mixture solution was kept for 1.5 hours. A varnish B was thus obtained. A solid content in obtained varnish B was 49.7 mass % and viscosity was 15 poises. In addition, a number average molecular weight of the hydrolyzable resin contained in varnish B was 10000. In Examples below, this varnish B was employed as it is as a hydrolyzable resin composition S20.

Producing Example S21

Preparation of Hydrolyzable Resin Composition S21

In a reaction vessel as in Producing Example S19 above, 64 parts by mass of xylol and 16 parts by mass of n-butanol were added and kept at 100° C. In this solution, a mixture solution composed of a monomer in accordance with a formulation (parts by mass) in Table 3 and 2 parts by mass of t-butylperoxy-2-ethylhexanoate was dropped at a constant velocity for 3 hours. After dropping ended, the temperature of the mixture solution was kept for 30 minutes. Thereafter, a mixture solution composed of 16 parts by mass of xylene, 4 parts by mass of n-butanol, and 0.2 part by mass of t-butylperoxy-2-ethylhexanoate was dropped at a constant velocity for 30 minutes. After dropping ended, the temperature of the mixture solution was kept for 1.5 hours. A varnish C was thus obtained. A solid content in obtained varnish C was 51.2 mass % and viscosity was 10 poises. In addition, a number average molecular weight of the resin contained in varnish C was 10000 and an acid value was 70 mgKOH/g.

Then, in a similar reaction vessel, 100 parts by mass of varnish C, 12.9 parts by mass of copper acetate, 21.9 parts by mass of hydrogenated rosin (Hypale CH, acid value of 160 mgKOH/g, manufactured by Arakawa Chemical Industries, Ltd.), and 60 parts by mass of xylene were added, a temperature of the mixture was raised to a reflux temperature, and reaction was continued for 18 hours while a distilled mixture solution of acetic acid, water, and a solvent was removed and xylol in the same amount was replenished. An end point of reaction was determined by quantifying an amount of acetic acid in the distilled solvent. After the reaction solution was cooled, n-butanol and xylene were added to thereby obtain a hydrolyzable resin composition S21 having a solid content of 50.6 mass %.

Producing Example S22

Preparation of Hydrolyzable Resin Composition S22

In a reaction vessel as in Producing Example S19 above, 40 parts by mass of xylol and 20 parts by mass of n-butanol were added and kept at 105° C. In this solution, a mixture solution composed of a monomer in accordance with a formulation (parts by mass) in Table 3 and 1 part by mass of t-butylperoxy-2-ethylhexanoate was dropped at a constant velocity for 3 hours. After dropping ended, the temperature of the mixture solution was kept for 30 minutes. Thereafter, a mixture solution composed of 30 parts by mass of xylene, 10 parts by mass of n-butanol, and 0.2 part by mass of t-butylperoxy-2-ethylhexanoate was dropped at a constant velocity for 30 minutes. After dropping ended, the temperature of the mixture solution was kept for 1 hour. A varnish D was thus obtained. A solid content in obtained varnish D was 50.5 mass % and viscosity was 7 poises. In addition, a number average molecular weight of the resin contained in varnish D was 8000 and an acid value was 70 mgKOH/g.

Then, reaction was caused as in Producing Example S21 above except that in a similar reaction vessel, 100 parts by mass of varnish D, 12.9 parts by mass of copper acetate, 21.9 parts by mass of WW rosin (WW rosin, acid value of 160 mgKOH/g, manufactured by Arakawa Chemical Industries, Ltd.), and 60 parts by mass of xylene were added. Then, a hydrolyzable resin composition S22 having a solid content of 52.5 mass % was obtained.

Producing Example S23

Preparation of Hydrolyzable Resin Composition S23

In a reaction vessel as in Producing Example S19 above, 70 parts by mass of xylol and 20 parts by mass of n-butanol were added and kept at 110° C. In this solution, a mixture solution composed of a monomer in accordance with a formulation (parts by mass) in Table 3 and 2 parts by mass of t-butylperoxy-2-ethylhexanoate was dropped at a constant velocity for 3 hours. After dropping ended, the temperature of the mixture solution was kept for 1 hour. Thereafter, 10 parts by mass of xylol were added to thereby obtain a varnish E. A solid content in obtained varnish E was 49.8 mass % and viscosity was 6 poises. In addition, a number average molecular weight of the resin contained in varnish E was 8000 and an acid value was 30 mgKOH/g.

Then, in a similar reaction vessel, 100 parts by mass of varnish E, 5.9 parts by mass of zinc acetate, 7.5 parts by mass of naphthenic acid (NA-200, acid value of 200 mgKOH/g, manufactured by Daiwa Yushi Kogyo), and 60 parts by mass of xylene were added, a temperature of the mixture was raised to a reflux temperature, and reaction was continued for 18 hours while a distilled mixture solution of acetic acid, water, and a solvent was removed and a xylol/n-butanol mixture solution in the same amount was replenished. An end point of reaction was determined by quantifying an amount of acetic acid in the distilled solvent. After the reaction solution was cooled, n-butanol and xylene were added to thereby obtain a hydrolyzable resin composition S23 having a solid content of 53.8 mass %.

Producing Example S24

Preparation of Hydrolyzable Resin Composition S24

In a reaction vessel as in Producing Example S19 above, 40 parts by mass of xylol and 40 parts by mass of n-butanol were added and kept at 110° C. In this solution, a mixture solution composed of a monomer in accordance with a formulation (parts by mass) in Table 3 and 2 parts by mass of t-butylperoxy-2-ethylhexanoate was dropped at a constant velocity for 3 hours. After dropping ended, the temperature of the mixture solution was kept for 1 hour. Thereafter, a mixture solution composed of 10 parts by mass of xylene, 10 parts by mass of n-butanol, and 0.2 part by mass of t-butylperoxy-2-ethylhexanoate was dropped at a constant velocity for 30 minutes. After dropping ended, the temperature of the mixture solution was kept for 1 hour. A varnish F was thus obtained. A solid content in obtained varnish F was 50.0 mass and viscosity was 11 poises. In addition, a number average molecular weight of the resin contained in varnish F was 8000 and an acid value was 130 mgKOH/g.

Then, reaction was caused as in Producing Example S23 above except that in a similar reaction vessel, 100 parts by mass of varnish F, 23.1 parts by mass of zinc acetate, 39.4 parts by mass of naphthenic acid (NA-165, acid value of 165 mgKOH/g, manufactured by Daiwa Yushi Kogyo), and 60 parts by mass of xylene were added. Then, a hydrolyzable resin composition S24 having a solid content of 47.3 mass % was obtained.

Producing Example S25

Preparation of Hydrolyzable Resin Composition S25

In a reaction vessel as in Producing Example S19 above, 70 parts by mass of xylol and 30 parts by mass of n-butanol were added and kept at 105° C. In this solution, a mixture solution composed of a monomer in accordance with a formulation (parts by mass) in Table 3 and 2 parts by mass of azobisisobutyronitrile was dropped at a constant velocity for 3 hours. After dropping ended, the temperature of the mixture solution was kept for 1 hour. A varnish G was thus obtained. A solid content in obtained varnish G was 50.0 mass % and viscosity was 18 poises. In addition, a number average molecular weight of the resin contained in varnish G was 15000 and an acid value was 50 mgKOH/g.

Then, reaction was caused as in Producing Example S21 above except that in a similar reaction vessel, 100 parts by mass of varnish G, 9.3 parts by mass of copper acetate, 12.5 parts by mass of naphthenic acid (NA-200, acid value of 200 mgKOH/g, manufactured by Daiwa Yushi Kogyo), and 60 parts by mass of xylene were added. Then, a hydrolyzable resin composition S25 having a solid content of 51.8 mass % was obtained.

Producing Example S26

Preparation of Hydrolyzable Resin Composition S26

In a reaction vessel as in Producing Example S19 above, 90 parts by mass of xylol were added and kept at 105° C. In this solution, a mixture solution composed of a monomer in accordance with a formulation (parts by mass) in Table 3 and 3 parts by mass of t-butylperoxy-2-ethylhexanoate was dropped at a constant velocity for 3 hours. After dropping ended, the temperature of the mixture solution was kept for 30 minutes. Thereafter, a mixture solution composed of 10 parts by mass of xylene, 10 parts by mass of n-butanol, and 0.2 part by mass of t-butylperoxy-2-ethylhexanoate was dropped at a constant velocity for 30 minutes. After dropping ended, the temperature of the mixture solution was kept for 1.5 hours. A varnish H was thus obtained. A solid content in obtained varnish H was 50.8 mass % and viscosity was 10 poises. In addition, a number average molecular weight of the resin contained in varnish H was 12000 and an acid value was 30 mgKOH/g.

Then, reaction was caused as in Producing Example S21 above except that in a similar reaction vessel, 100 parts by mass of varnish H, 5.6 parts by mass of copper acetate, 9.4 parts by mass of hydrogenated rosin (Hypale CH, acid value of 160 mgKOH/g, manufactured by Arakawa Chemical Industries, Ltd.), and 60 parts by mass of xylene were added, and a hydrolyzable resin composition S26 having a solid content of 55.1 mass % was obtained.

Producing Example S27

Preparation of Hydrolyzable Resin Composition S27

In a reaction vessel as in Producing Example S19 above, 64 parts by mass of xylol and 16 parts by mass of n-butanol were added and kept at 115° C. In this solution, a mixture solution composed of a monomer in accordance with a formulation (parts by mass) in Table 3 and 2 parts by mass of t-butylperoxy-2-ethylhexanoate was dropped at a constant velocity for 3 hours. After dropping ended, the temperature of the mixture solution was kept for 1 hour. Thereafter, a mixture solution composed of 16 parts by mass of xylene, 4 parts by mass of n-butanol, and 0.2 part by mass of t-butylperoxy-2-ethylhexanoate was dropped at a constant velocity for 30 minutes. After dropping ended, the temperature of the mixture solution was kept for 1 hour. A varnish I was thus obtained. A solid content in obtained varnish I was 49.5 mass % and viscosity was 12 poises. In addition, a number average molecular weight of the resin contained in varnish I was 10000 and an acid value was 110 mgKOH/g.

Then, reaction was caused as in Producing Example S23 above except that in a similar reaction vessel, 100 parts by mass of varnish I, 21.5 parts by mass of zinc acetate, 33.3 parts by mass of naphthenic acid (NA-165, acid value of 165 mgKOH/g, manufactured by Daiwa Yushi Kogyo), and 60 parts by mass of xylene were added, and a hydrolyzable resin composition S27 having a solid content of 45.6 mass % was obtained.

Table 3 summarizes an amount of use of a monomer used for preparation of varnishes A to I (a charging amount), and a solid content and viscosity of the varnishes.

TABLE 3

| | | | | S19 | S20 | S21 | S22 | S23 | S24 | S25 | S26 | S27 |
|---|---|---|---|---|---|---|---|---|---|---|---|---|
| | | | | | | | | Varnish | | | | |
| | | | | A | B | C | D | E | F | G | H | I |
| Charging Amount (Parts by Mass) | (a) | (a1) | FM-0711 | 30.0 | | | 20.0 | 20.0 | | 10.0 | | |
| | | | FM-0721 | | | 20.0 | | | | 10.0 | | 10.0 |
| | | | X-22-174DX | | 20.0 | | | 10.0 | | | | |
| | | (a2) | TM-0701 | | | | | | 10.0 | | | |
| | | | X-22-2404 | | | | | | | | 15.0 | |
| | | (a3) | FM-7711 | 5.0 | | | | | | | | |
| | | | FM-7721 | | | | | | | | 10.0 | |
| | | | X-22-164A | | | | | | | | | 5.0 |
| | | | X-22-164C | | | | | | | 10.0 | | |
| | | (a4) | Silicon-Containing Monomer H | | | | 5.0 | | | | | |
| | | | AA | | | 9.0 | 9.0 | 3.9 | 16.7 | 6.4 | 3.9 | 14.2 |
| | (c) | | TIPSA | 20.0 | 45.0 | 20.0 | 20.0 | 45.0 | 5.0 | 30.0 | 45.0 | 10.0 |
| | (d) | | MMA | 45.0 | 20.0 | 10.0 | 25.0 | 21.1 | 13.3 | 8.6 | 26.1 | 23.5 |
| | | | EA | | | 15.0 | 16.0 | | | 40.0 | 10.0 | 22.3 |
| | | | EHMA | | | | | | | 10.0 | | |
| | | | CHMA | | | 15.0 | 6.0 | | | | | |
| | | | M90G | | | 10.0 | 15.0 | | 15.0 | 5.0 | | 15.0 |
| Viscosity (poise) | | | | 27 | 15 | 10 | 7 | 6 | 11 | 18 | 10 | 12 |
| Solid Content (Mass %) | | | | 50.1 | 49.7 | 51.2 | 50.5 | 49.8 | 50.0 | 50.0 | 50.8 | 49.5 |
| | | | | A | B | C | D | E | F | G | H | I |
| Varnish | | | | 100 | 100 | 100 | 100 | 100 | 100 | 100 | 100 | 100 |
| Charging Amount (Parts by Mass) | | | Copper Acetate | | | 12.9 | 12.9 | | | 9.3 | 5.6 | |
| | | | Zinc Acetate | | | | | 5.9 | 23.1 | | | 21.5 |
| | | | Hydrogenated Rosin | | | 21.9 | | | | | 9.4 | |
| | | | WW Rosin | | | | 21.9 | | | | | |
| | | | Naphthenic Acid | | | | | 7.5 | 39.4 | 12.5 | | 33.3 |
| Solid Content (Mass %) | | | | 50.1 | 49.7 | 50.6 | 52.5 | 53.8 | 47.3 | 51.8 | 55.1 | 45.6 |

A trade name and abbreviation shown in Table 3 are as follows (a trade name and abbreviation other than those shown below are as in Tables 1 and 2).

(1) X-22-174DX (a trade name, a product of Shin-Etsu Chemical Co., Ltd.): a silicon-containing polymerizable monomer having m=0, b=3, $R^1$ to $R^4$ and $R^{31}$ each being a methyl group, and $R^5$ being a methyl group or an n-butyl group in the general formula (I') above (a functional group equivalent of 4600 g/mol)

(2) X-22-2404 (a trade name, a product of Shin-Etsu Chemical Co., Ltd.): a silicon-containing polymerizable monomer having p=0, d=3, and $R^6$ to $R^8$ and $R^{32}$ each being a methyl group in the general formula (II') above (a functional group equivalent of 420 g/mol)

(3) X-22-164A (a trade name, a product of Shin-Etsu Chemical Co., Ltd.): a silicon-containing polymerizable monomer having q and s=0, f and g=3, and $R^9$ to $R^{12}$, $R^{33}$, and $R^{34}$ each being a methyl group in the general formula (III') above (a functional group equivalent of 860 g/mol)

(4) X-22-164C (a trade name, a product of Shin-Etsu Chemical Co., Ltd.): a silicon-containing polymerizable monomer having q and s=0, f and g=3, and $R^9$ to $R^{12}$, $R^{33}$, and $R^{34}$ each being a methyl group in the general formula (In above (a functional group equivalent of 2370 g/mol)

(5) A silicon-containing monomer H: a silicon-containing polymerizable monomer having t and u=0, j and k=3, v and w=3, and $R^{13}$ to $R^{22}$, $R^{35}$, and $R^{36}$ each being a methyl group in the general formula (IV') above (this monomer was commercially available from Nippon Unicar Co., Ltd. under a trade name "F2-312-01")

(6) AA: acrylic acid (7) TIPSA: triisopropylsilyl acrylate (8) EHMA: 2-ethylhexyl methacrylate (9) CHMA: cyclohexyl methacrylate

(10) M-90G: methoxypolyethyleneglycol methacrylate (NK ester M-90G, manufactured by Shin-Nakamura Chemical Co., Ltd.)

[4] Preparation of Resin Composition for Comparison

Producing Example T1

Preparation of Resin Composition T1

In a four-neck flask including a cooler, a thermometer, a dropping funnel, and a stirrer, 15 parts by mass of PGM and 70 parts by mass of xylene were loaded, and a temperature thereof was raised to 110° C. while they were stirred. Then, a mixture composed of 42.1 parts by mass of methyl methacylate, 17.9 parts by mass of ethyl acrylate, 10 parts by mass of "FM-7711" (manufactured by Chisso Corporation), 30 parts by mass of "FM-0711" (manufactured by Chisso Corporation), 10 parts by mass of xylene, 11.9 parts by mass of PGM, 3 parts by mass of the chain transfer agent α-methylstyrene dimer), 2.5 parts by mass of AIBN, and 7 parts by mass of AMBN was dropped at a constant velocity in 6 hours from the dropping funnel. After dropping ended, 0.5 part by mass of t-butyl peroctoate and 10 parts by mass of xylene were dropped in 30 minutes followed by further stirring for 1 hour and 30 minutes. Thereafter, 5.1 parts by mass of xylene were added to thereby obtain a resin composition T1. A solid content in resin composition T1 was 45.5 mass % and Gardner viscosity was +E.

Obtained resin composition T1 was analyzed with GPC ("HLC-8220GPC" manufactured by Tosoh Corporation, eluant: dimethylformamide). Then, a value for a weight-average molecular weight of the resin contained in resin composition T1 was 8600 in terms of polystyrene.

Producing Example T2

Preparation of Resin Composition T2

In a four-neck flask including a stirrer, a cooler, a temperature control device, a nitrogen introduction pipe, and a dropping funnel, 64 parts by mass of xylene and 16 parts by mass of n-butanol were added, and a temperature thereof was kept at 100° C. In this solution, a mixture solution composed of 58.3 parts by mass of ethyl acrylate (EA), 15 parts by mass of cyclohexyl methacrylate (CHMA), 10 parts by mass of methoxypolyethyleneglycol methacrylate (M-90G), 16.7 parts by mass of acrylic acid (AA), and 2 parts by mass of t-butylperoxy-2-ethylhexanoate ("Kayaester O" manufactured by Kayaku Akzo Co., Ltd.) was dropped at a constant velocity in 3 hours. After dropping ended, the temperature thereof was kept for 30 minutes. Thereafter, a mixture solution composed of 16 parts by mass of xylene, 4 parts by mass of n-butanol, and 0.2 part by mass of t-butylperoxy-2-ethylhexanoate ("Kayaester 0" manufactured by Kayaku Akzo Co., Ltd.) was dropped for 30 minutes. After dropping ended, the temperature thereof was kept for 1 hour and 30 minutes, to thereby obtain a resin varnish. A solid content in the obtained resin varnish was 49.8 mass % and an acid value of the resin in the resin varnish was 130.

Then, in a similar reaction vessel, 100 parts by mass of the resin varnish above, 25.4 parts by mass of zinc acetate, 39.2 parts by mass of naphthenic acid (NA-165, acid value of 165 mgKOH/g, manufactured by Daiwa Yushi Kogyo), and 110 parts by mass of xylene were added, and the mixture was heated to 130° C. to thereby remove acetic acid together with the solvent. Thus, a resin composition T2 having a solid content of 41.5 mass % and Gardner viscosity W-X was obtained.

Obtained resin composition T2 was analyzed with GPC ("HLC-8220GPC" manufactured by Tosoh Corporation, eluant: dimethylformamide). Then, a value for a weight-average molecular weight of the resin contained in resin composition T2 was 8000 in terms of polystyrene.

Producing Example T3

Preparation of Resin Composition T3

In a four-neck flask including a stirrer, a cooler, a temperature control device, a nitrogen introduction pipe, and a dropping funnel, 64 parts by mass of xylene and 16 parts by mass of n-butanol were added, and a temperature thereof was kept at 115° C. In this solution, a mixture solution composed of 11.17 parts by mass of methyl methacrylate (MMA), 16.3 parts by mass of ethyl acrylate (EA), 15 parts by mass of cyclohexyl methacrylate (CHMA), 15 parts by mass of cyclohexyl acrylate (CHA), 30 parts by mass of methoxypolyethyleneglycol methacrylate (M-90G), 10.27 parts by mass of acrylic acid (AA), 12.26 parts by mass of methacrylic acid (MAA), and 3 parts by mass of t-butylperoxy-2-ethylhexanoate ("Kayaester 0" manufactured by Kayaku Akzo Co., Ltd.) was dropped at a constant velocity for 3 hours. After dropping ended, the temperature thereof was kept for 30 minutes. Thereafter, a mixture solution composed of 16 parts by mass of xylene, 4 parts by mass of n-butanol, and 0.2 part by mass of t-butylperoxy-2-ethylhexanoate ("Kayaester 0" manufactured by Kayaku Akzo Co., Ltd.) was dropped at a constant velocity for 30 minutes. After dropping ended, the temperature thereof was kept for 1 hour and 30 minutes, to thereby obtain a resin varnish. A solid content in the obtained resin varnish was 49.7 mass % and an acid value of the resin in the resin varnish was 160.

Then, reaction was caused as in Producing Example T2 above except that in a similar reaction vessel, 100 parts by mass of the resin varnish above, 29.6 parts by mass of copper acetate, and 14.5 parts by mass of pivalic acid (acid value: 550 mgKOH/g) were added. Thus, a resin composition T3 having a solid content of 45.2 mass % and Gardner viscosity Z2-Z3 was obtained.

Obtained resin composition T3 was analyzed with GPC ("HLC-8220GPC" manufactured by Tosoh Corporation, eluant: dimethylformamide). Then, a value for a weight-average molecular weight of the resin contained in resin composition T3 was 6500 in terms of polystyrene.

Producing Example T4

Preparation of Resin Composition T4

In a reaction vessel as in Producing Example S19 above, 80 parts by mass of xylol were added and kept at 100° C. In this solution, a mixture solution composed of 65.0 parts by mass of triisopropylsilyl acrylate (TIPSA), 35.0 parts by mass of methyl methacrylate (MMA), and 2 parts by mass of t-butylperoxy-2-ethylhexanoate was dropped at a constant velocity for 3 hours. After dropping ended, the temperature of the mixture solution was kept for 1 hour. Thereafter, a mixture solution composed of 20 parts by mass of xylene and 0.2 part by mass of t-butylperoxy-2-ethylhexanoate was dropped at a constant velocity for 30 minutes. After dropping ended, the temperature of the mixture solution was kept for 1.5 hours. A resin composition T4 was thus obtained. A solid content in obtained resin composition T4 was 50.0 mass % and viscosity was 8 poises. In addition, a number average molecular weight of the resin contained in resin composition T4 was 10000.

Producing Example T5

Preparation of Resin Composition T5

In a reaction vessel as in Producing Example S19 above, 64 parts by mass of xylol and 16 parts by mass of n-butanol were added and kept at 115° C. In this solution, a mixture solution composed of 40.0 parts by mass of triisopropylsilyl acrylate (TIPSA), 9.0 parts by mass of acrylic acid (AA), 26.0 parts by mass of ethyl acrylate (EA), 15.0 parts by mass of cyclohexyl methacrylate (CHMA), 10.0 parts by mass of methoxypolyethyleneglycol methacrylate (M-90G), and 2 parts by mass of t-butylperoxy-2-ethylhexanoate was dropped at a constant velocity for 3 hours. After dropping ended, the temperature of the mixture solution was kept for 30 minutes. Thereafter, a mixture solution composed of 16 parts by mass of xylene, 4 parts by mass of n-butanol, and 0.2 part by mass of t-butylperoxy-2-ethylhexanoate was dropped at a constant velocity for 30 minutes. After dropping ended, the temperature of the mixture solution was kept for 1 hour. A resin varnish was thus obtained. A solid content in the obtained resin varnish was 49.7 mass % and viscosity was 5 poises. In addition, a number average molecular weight of the resin contained in this resin varnish was 6000 and an acid value was 70 mgKOH/g.

Then, reaction was caused as in Producing Example S21 above except that in a similar reaction vessel, 100 parts by mass of the resin varnish above, 12.9 parts by mass of copper acetate, 21.9 parts by mass of hydrogenated rosin (Hypale CH, acid value of 160 mgKOH/g, manufactured by Arakawa Chemical Industries, Ltd.), and 60 parts by mass of xylene were added, and a resin composition T5 having a solid content of 51.3 mass % was obtained.

[5] Evaluation of Hiding Performance of Hydrolyzable Resin Compositions S1 to S27 and Resin Compositions T1 to T5

Obtained hydrolyzable resin compositions S1 to S27 or resin compositions T1 to T5 were applied with an applicator onto a plate for measuring a contrast ratio in conformity with JIS K 5600-4-1 4.1.2, of 120 mm wide x 120 mm high x 0.3 mm thick so that a dry film thickness of a coating film is 150 µm, and left for one day and night in a room for drying, to thereby obtain a test plate having an antifouling coating film. Hiding performance of a coating film was visually evaluated in accordance with the following criteria, for the obtained test plates:

A Completely seen through; a boundary between white and black on the plate for measuring a contrast ratio can readily be identified;

B Slightly seen through; a boundary between white and black on the plate for measuring a contrast ratio can be identified to some degree; and C Completely hidden; a boundary between white and black on the plate for measuring a contrast ratio cannot be identified.

As a result of the hiding performance evaluation test above, it was confirmed that coating films formed from hydrolyzable resin compositions S1 to S27 and resin compositions T1 to T5 were each high in transparency and the resin itself did not have a hiding performance.

Examples 1 to 13

Comparative Examples 1 to 2

[6] Preparation of Colored Antifouling Paint

By mixing each formulated component with a high-speed disperser in accordance with a formulation (parts by mass) in Table 4, colored antifouling paints (paints 1 to 15) were prepared. It is noted that paint 3 according to Example 3 was prepared by mixing paints 1 and 2 at a blending ratio shown in Table 4.

TABLE 4

|  |  | Example | | | | | | | | |
|---|---|---|---|---|---|---|---|---|---|---|
|  |  | 1 | 2 | 3 | 4 | 5 | 6 | 7 | 8 | 9 |
| Paint No. |  | 1 | 2 | 3 | 4 | 5 | 6 | 7 | 8 | 9 |
| Hydrolyzable | S2 | 93.85 | 94.16 |  |  |  |  |  |  |  |
| Resin | S4 |  |  |  |  |  |  | 82.22 |  |  |
| Composition | S7 |  |  |  |  |  |  |  |  |  |
| or Resin | S13 |  |  |  |  |  |  |  | 80.94 |  |
| Composition | S16 |  |  |  |  |  |  |  |  | 91.97 |
|  | S19 |  |  |  | 90.41 |  |  |  |  |  |
|  | S20 |  |  |  |  |  |  |  |  |  |
|  | S21 |  |  |  |  |  | 93.72 |  |  |  |
|  | S23 |  |  |  |  | 93.25 |  |  |  |  |
|  | S25 |  |  |  |  |  |  |  |  |  |
|  | S27 |  |  |  |  |  |  |  |  |  |
|  | T4 |  |  |  |  |  |  |  |  |  |
|  | T5 |  |  |  |  |  |  |  |  |  |
| Cuprous Oxide |  |  |  |  |  | 1.20 |  |  |  |  |
| Antifouling Agent 1 |  |  |  |  |  |  |  |  |  | 0.75 |
| Antifouling Agent 2 |  |  |  |  |  |  |  |  |  |  |
| Antifouling Agent 3 |  |  |  |  |  |  |  |  | 3.54 |  |
| Antifouling Agent 4 |  |  |  |  |  |  |  | 4.85 |  |  |
| Antifouling Agent 5 |  |  |  |  | 3.69 |  |  | 2.21 |  | 2.17 |
| Titanium Oxide |  | 0.25 | 0.16 |  | 0.31 | 0.17 |  | 0.68 | 0.20 | 0.10 |
| Azo-Based Yellow Pigment |  |  |  |  |  |  |  |  |  |  |
| Azo-Based Red Pigment |  | 0.71 | 0.48 |  | 0.60 | 0.23 | 0.45 | 0.51 |  |  |
| Phthalocyanine Blue |  |  |  |  |  |  |  |  | 0.82 | 0.51 |
| Carbon Black |  |  |  |  |  |  |  |  |  |  |
| Thermoplastic Resin 1 |  | 2.37 | 2.37 |  |  |  |  |  |  |  |
| Thermoplastic Resin 2 |  |  |  |  |  |  |  | 7.06 |  |  |
| Thermoplastic Resin 3 |  |  |  |  | 2.28 |  |  |  |  |  |
| Thermoplastic Resin 4 |  |  |  |  |  |  |  |  |  | 1.28 |
| Plasticizer 1 |  |  |  |  |  |  | 3.02 |  |  |  |
| Plasticizer 2 |  |  |  |  |  |  |  |  |  |  |
| Plasticizer 3 |  |  |  |  |  | 2.35 |  |  |  |  |
| Plasticizer 4 |  |  |  |  |  |  |  |  | 11.29 |  |
| Barium Sulfate |  |  |  |  |  |  |  |  |  |  |
| Anti-Settling Agent |  | 2.82 | 2.83 |  | 2.72 | 2.80 | 2.82 | 2.47 | 3.21 | 3.21 |
| Xylene |  |  |  |  |  |  |  |  |  |  |
| Paint 1 |  |  |  | 28.57 |  |  |  |  |  |  |
| Paint 2 |  |  |  | 71.43 |  |  |  |  |  |  |
| Total |  | 100.00 | 100.00 | 100.00 | 100.00 | 100.00 | 100.00 | 100.00 | 100.00 | 100.00 |
| Color Tone of Paint |  |  |  | Red |  |  |  | Pink | Blue | |
| L*/a*/b* of Coating Film |  |  | 35/63/18 |  | 34/63/17 | 13/5/−1 | 11/6/5 | 40/60/13 | 17/15/−55 | 18/12/−52 |
| Target Dry Film Thickness T (µm) |  | 50 | 150 | 125 | 125 | 125 | 125 | 125 | 125 | 125 |

TABLE 4-continued

|  |  | Example | | | | Comparative Example | |
| --- | --- | --- | --- | --- | --- | --- | --- |
|  |  | 10 | 11 | 12 | 13 | 1 | 2 |
| Paint No. |  | 10 | 11 | 12 | 13 | 14 | 15 |
| Hydrolyzable Resin | S2 |  |  |  |  |  |  |
| Composition or Resin | S4 |  |  |  |  |  |  |
| Composition | S7 |  |  | 80.60 |  |  |  |
|  | S13 |  |  |  |  |  |  |
|  | S16 |  |  |  |  |  |  |
|  | S19 |  |  |  |  |  |  |
|  | S20 |  | 92.37 |  |  |  |  |
|  | S21 |  |  |  |  |  |  |
|  | S23 |  |  |  |  |  |  |
|  | S25 | 91.85 |  |  |  |  |  |
|  | S27 |  |  |  | 82.62 |  |  |
|  | T4 |  |  |  |  | 52.25 |  |
|  | T5 |  |  |  |  |  | 34.34 |
| Cuprous Oxide |  |  |  |  |  | 6.27 | 35.35 |
| Antifouling Agent 1 |  |  |  | 0.72 |  |  |  |
| Antifouling Agent 2 |  | 0.93 |  |  |  |  | 4.04 |
| Antifouling Agent 3 |  |  |  |  |  | 6.88 |  |
| Antifouling Agent 4 |  |  |  | 10.84 |  |  |  |
| Antifouling Agent 5 |  |  |  |  |  |  |  |
| Titanium Oxide |  | 0.30 |  | 0.78 | 10.10 |  | 2.02 |
| Azo-Based Yellow Pigment |  |  | 0.89 |  |  |  |  |
| Azo-Based Red Pigment |  | 0.03 |  |  |  | 0.64 | 3.03 |
| Phthalocyanine Blue |  | 0.49 |  |  |  |  |  |
| Carbon Black |  |  |  | 0.09 |  |  |  |
| Thermoplastic Resin 1 |  |  |  |  |  |  | 5.05 |
| Thermoplastic Resin 2 |  |  |  | 2.16 |  |  |  |
| Thermoplastic Resin 3 |  |  |  |  | 3.55 |  | 3.03 |
| Thermoplastic Resin 4 |  |  |  |  |  |  |  |
| Plasticizer 1 |  |  |  |  |  | 4.01 |  |
| Plasticizer 2 |  | 2.96 |  | 2.16 |  |  |  |
| Plasticizer 3 |  |  |  |  |  |  |  |
| Plasticizer 4 |  |  | 3.27 |  |  |  |  |
| Barium Sulfate |  |  |  |  |  | 5.31 |  |
| Anti-Settling Agent |  | 3.45 | 3.47 | 3.37 | 3.01 | 3.13 | 3.03 |
| Xylene |  |  |  |  |  | 21.51 | 10.10 |
| Paint 1 |  |  |  |  |  |  |  |
| Paint 2 |  |  |  |  |  |  |  |
| Total |  | 100.00 | 100.00 | 100.00 | 100.00 | 100.00 | 100.00 |
| Color Tone of Paint |  | Blue | Yellow | Gray | White | Red |  |
| $L^*/a^*/b^*$ of Coating Film |  | 17/0/−26 | 80/1/51 | 34/0/−3 | 97/0/1 | 33/23/10 | 32/49/16 |
| Target Dry Film Thickness T (μm) |  | 125 | 125 | 125 | 125 | 125 | 125 |

Unit: Parts by Mass
Details of each component shown in Table 4 are as follows.
(1) Cuprous oxide: "NC-301" manufactured by NC Tech
(2) Antifouling agent 1: ZPT (zinc pyrithione) ("Zinc OMADINE" manufactured by Arch Chemicals)
(3) Antifouling agent 2: CuPT (copper pyrithione) ("Copper OMADINE" manufactured by Arch Chemicals)
(4) Antifouling agent 3: 1,1-dichloro-N-[(dimethylamino)sulfonyl]-1-fluoro-N-(4-methylphenyl)methanesulfenamide ("Preventol A5S" manufactured by Lanxess)
(5) Antifouling agent 4: 4,5-dichloro-2-n-octyl-4-isothiazoline-3-one(4,5-dichloro-2-n octyl-3(2H)isothiazolone) ("SeaNine 211" manufactured by Rohm and Haas Company)
(6) Antifouling agent 5: 4-bromo-2-(4-chlorophenyl)-5-(trifluoromethyl)-1H-pyrrole-3-carbonitrile ("ECONEA" manufactured by Janssen PMP)
(7) Titanium oxide: "TI-PURE R-900" manufactured by Du Pont Kabushiki Kaisha
(8) Azo-based yellow pigment: "Seika Fast Yellow 2054C" manufactured by Dainichiseika Color & Chemicals Mfg. Co., Ltd.
(9) Azo-based red pigment: "FUJI FAST RED 2305A" manufactured by Fuji Pigment Co., Ltd.
(10) Phthalocyanine blue: "CYANINE BLUE G-105" manufactured by Sanyo Color Works, Ltd.
(11) Carbon Black: "SUNBLACK X15" manufactured by Asahi Carbon Co., Ltd.
(12) Thermoplastic resin 1: Chlorinated paraffin ("Toyoparax A50" manufactured by Tosoh Corporation)
(13) Thermoplastic resin 2: Polyvinyl ether ("Lutonal A25" manufactured by BASF JAPAN)
(14) Thermoplastic resin 3: Rosin ("WW Rosin" manufactured by Arakawa Chemical Industries, Ltd.)
(15) Thermoplastic resin 4: Vinyl chloride-isobutyl vinyl ether copolymer ("Laroflex MP25" manufactured by BASF JAPAN)
(16) Plasticizer 1: DOP (dioctyl phthalate) ("DOP" manufactured by Mitsubishi Gas Chemical Company, Inc.)
(17) Plasticizer 2: DIDP (diisodecyl phthalate) ("DIDP" manufactured by Chisso Corporation)
(18) Plasticizer 3: TCP (tricresyl phosphate) ("TCP" manufactured by Daihachi Chemical Industry Co., Ltd.)
(19) Plasticizer 4: Triaryl phosphate ("Rheophos 65" manufactured by Ajinomoto Co., Inc.)
(20) Barium sulfate: "Barite Powder FBA" manufactured by Naigai Talc. Co., Ltd.
(21) Anti-settling agent: "Disparlon A600-20X" manufactured by Kusumoto Chemicals, Ltd.

[7] Formation of Antifouling Coating Film Using Paints 1 to 15 and Evaluation of Film Thickness Determination Function of Paints 1 to 15

Any of paints a to 1 serving as an undercoat paint was applied to a blast plate, to which a rustproof paint had been applied in advance, until a surface of the blast plate was completely hidden, and the blast plate was left for 2 days and nights for drying. A test plate having an undercoat coating film was thus obtained. Details of undercoat paints a to 1 are as follows (with a color tone in accordance with the $L^*/a^*/b^*$ color system of each undercoat paint being shown in paren theses). Tables 5 to 8 show a color tone of a surface of the undercoat coating film of the test plate.

(a) Paint a: Antifouling paint "Ecoflex SPC250 HyB Cherry V" manufactured by Nippon Paint Marine Coatings Co., Ltd. (L*/a*/b*=31/23/8)

(b) Paint b: Antifouling paint "Ecoloflex SPC200 Red Brown" manufactured by Nippon Paint Marine Coatings Co., Ltd. (L*/a*/b*=32/17/6)

(c) Paint c: Antifouling paint "Unagi Toryo Ichiban Azayaka Tokujou Red A" manufactured by Nippon Paint Marine Coatings Co., Ltd. (L*/a*/b*=36/50/13)

(d) Paint d: Anti-corrosive paint "Uniprime 100 Red Oxide" manufactured by Nippon Paint Marine Coatings Co., Ltd. (L*/a*/b*=27/27/15)

(e) Paint e: Antifouling paint "Ecoloflex SPC150 HyB Brown" manufactured by Nippon Paint Marine Coatings Co., Ltd. (L*/a*/b*=33/21/10)

(f) Paint f: Anti-corrosive paint "Nippon R-Marine A/C Light Brown" manufactured by Nippon Paint Marine Coatings Co., Ltd. (L*/a*/b*=54/6/4)

(g) Paint g: Antifouling paint "Hisol 100 Blue A" manufactured by Nippon Paint Marine Coatings Co., Ltd. (L*/a*/b*=31/7/−43)

(h) Paint h: Antifouling paint "Ecoloflex SPC Beatle Black" manufactured by Nippon Paint Marine Coatings Co., Ltd. (L*/a*/b*=21/0/−1)

(i) Paint i: Anti-corrosive paint "Nippon V-Marine A/C TF Silver" manufactured by Nippon Paint Marine Coatings Co., Ltd. (L*/a*/b*=58/−1/−1)

(j) Paint j: Anti-corrosive paint "NOA A/C II Gray" manufactured by Nippon Paint Marine Coatings Co., Ltd. (L*/a*/b*=60/−1/0)

(k) Paint k: Anti-corrosive paint "NOA 10F Buff 250" manufactured by Nippon Paint Marine Coatings Co., Ltd. (L*/a*/b*=60/1/31)

(l) Paint l: Anti-corrosive paint "Nippon E-Marine Primer Galva White" manufactured by Nippon Paint Marine Coatings Co., Ltd. (L*/a*/b*=87/−1/3)

Then, the surface of the undercoat coating film on the obtained test plate having the undercoat coating film was painted with airless spraying, with a colored antifouling paint (any of paints 1 to 15) serving as a topcoat paint obtained in each of Examples and Comparative Examples, and the test plate was left in a room for 2 days and nights for drying. The antifouling coating films each having the dry film thickness shown in Tables 5 to 8 were thus formed. Each film thickness of the dry coating film of the topcoat paint was 25, 40, 50, and 60 μm in Example 1, 25, 50, 75, 100, 125, 150, and 180 μm in Example 2, and 25, 50, 75, 100, 125, and 150 μm in Examples 3 to 13 and Comparative Examples 1 to 2. The dry film thickness was measured with "MiniTest 3100" (manufactured by ElektroPhysik).

With regard to the obtained topcoat antifouling coating film having each dry film thickness, a color difference ΔE between the topcoat antifouling coating film having each dry film thickness and the topcoat antifouling coating film having a target dry film thickness T of each paint (the target dry film thickness T of each paint being as shown in Table 4 and Tables 5 to 8) was obtained by measurement with a tristimulus colorimeter SM color meter (model number SM-T45 manufactured by Suga Test Instruments Co., Ltd., JIS 28722) in conformity with JIS K 5600-4-5 and by calculation in conformity with JIS K 5600-4-6. In addition, an ability for the topcoat antifouling coating film having each dry film thickness to hide an underlying substrate (an ability for the topcoat antifouling coating film to hide the undercoat coating film) was visually observed and evaluated based on the criteria below. Tables 5 to 8 also show the results.

A: Entirely seen through
B: Very noticeably seen through
C: Noticeably seen through
D: Substantially hidden, but slightly seen through
E: Completely hidden It is noted that ΔE at dry film thickness of 0 μm in Tables 5 to 8 indicates color difference ΔE3 between each paint and the surface of the undercoat coating film. In addition, "color tone of coating film" in the field of the undercoat paint represents a color tone of the surface of the undercoat coating film, not the color tone of the undercoat paint itself.

TABLE 5

|  |  | Example 1 |
|---|---|---|
| Topcoat Paint | Paint No. | Paint 1 |
|  | Color Tone of Coating film | Red |
|  | Target Dry Film Thickness | 50 μm |
| Undercoat Paint | Paint No. | Paint c |
|  | Color Tone of Coating film | Red |

|  | Dry Film Thickness | ΔE | Hiding Ability |
|---|---|---|---|
| Color Difference ΔE from Topcoat Antifouling Coating Film Having Target Dry Film Thickness | 0 μm | 14.0 | — |
|  | 25 μm | 6.2 | B |
|  | 40 μm | 2.4 | C |
|  | 50 μm | 0.0 | E |
|  | 60 μm | 0.2 | E |

TABLE 6

|  |  | Example 2 |
|---|---|---|
| Topcoat Paint | Paint No. | Paint 2 |
|  | Color Tone of Coating film | Red |
|  | Target Dry Film Thickness | 150 μm |
| Undercoat Paint | Paint No. | Paint j |
|  | Color Tone of Coating film | Gray |

|  | Dry Film Thickness | ΔE | Hiding Ability |
|---|---|---|---|
| Color Difference ΔE from Topcoat Antifouling Coating Film Having Target Dry Film Thickness | 0 μm | 71.0 | — |
|  | 25 μm | 35.0 | A |
|  | 50 μm | 17.0 | A |
|  | 75 μm | 8.3 | B |
|  | 100 μm | 4.1 | B |
|  | 125 μm | 2.1 | C |
|  | 150 μm | 0.0 | E |
|  | 180 μm | 0.2 | E |

TABLE 7

|  |  | Example 3 | Example 4 | Example 5 | Example 6 | Example 7 | Example 8 |
|---|---|---|---|---|---|---|---|
| Topcoat Paint | Paint No. | Paint 3 | Paint 4 | Paint 5 | Paint 6 | Paint 7 | Paint 8 |
|  | Color Tone of Coating Film | Red | Red | Red | Red | Pink | Blue |
|  | Target Dry Film Thickness | 125 μm | 125 μm | 125 μm | 125 μm | 125 μm | 125 μm |

TABLE 7-continued

| Undercoat Paint | Paint No.<br>Color Tone of<br>Coating Film | | Paint k<br>Buff | | Paint d<br>Red Oxide | | Paint f<br>Brown | | Paint c<br>Red | | Paint i<br>Silver | | Paint h<br>Black | |
|---|---|---|---|---|---|---|---|---|---|---|---|---|---|---|
| | | Dry Film<br>Thickness | ΔE | Hiding<br>Ability | ΔE | Hiding<br>Ability | ΔE | Hiding<br>Ability | ΔE | Hiding<br>Ability | ΔE | Hiding<br>Ability | ΔE | Hiding<br>Ability |
| Color Difference | | 0 μm | 71.0 | — | 36.0 | — | 42.0 | — | 51.0 | — | 67.0 | — | 56.0 | — |
| ΔE from Topcoat | | 25 μm | 34.0 | A | 21.0 | A | 25.0 | A | 28.0 | A | 30.1 | A | 28.7 | A |
| Antifouling Coating | | 50 μm | 16.5 | A | 11.0 | A | 13.0 | A | 14.5 | A | 15.0 | A | 14.4 | A |
| Film Having Target | | 75 μm | 7.4 | B | 5.1 | B | 6.1 | B | 6.5 | B | 6.9 | B | 6.7 | B |
| Dry Film Thickness | | 100 μm | 2.7 | C | 2.3 | C | 2.4 | C | 2.5 | C | 2.4 | C | 2.4 | C |
| | | 125 μm | 0.0 | E | 0.0 | E | 0.0 | E | 0.0 | E | 0.0 | E | 0.0 | E |
| | | 150 μm | 0.2 | E | 0.2 | E | 0.3 | E | 0.4 | E | 0.3 | E | 0.4 | E |

| | | | Example 9 | | Example 10 | | Example 11 | | Example 12 | | Example 13 | |
|---|---|---|---|---|---|---|---|---|---|---|---|---|
| Topcoat Paint | Paint No.<br>Color Tone of<br>Coating Film | | Paint 9<br>Blue | | Paint 10<br>Blue | | Paint 11<br>Yellow | | Paint 12<br>Gray | | Paint 13<br>White | |
| | Target Dry Film<br>Thickness | | 125 μm | | 125 μm | | 125 μm | | 125 μm | | 125 μm | |
| Undercoat Paint | Paint No.<br>Color Tone of<br>Coating Film | | Paint e<br>Brown | | Paint b<br>Red | | Paint a<br>Brown | | Paint l<br>White | | Paint g<br>Blue | |
| | | Dry Film<br>Thickness | ΔE | Hiding<br>Ability | ΔE | Hiding<br>Ability | ΔE | Hiding<br>Ability | ΔE | Hiding<br>Ability | ΔE | Hiding<br>Ability |
| Color Difference | | 0 μm | 64.0 | — | 39.0 | — | 69.0 | — | 54.0 | — | 80.0 | — |
| ΔE from Topcoat | | 25 μm | 29.4 | A | 23.0 | A | 32.2 | A | 26.7 | A | 36.0 | A |
| Antifouling Coating | | 50 μm | 14.4 | A | 12.4 | A | 15.7 | A | 13.2 | A | 17.4 | A |
| Film Having Target | | 75 μm | 6.6 | B | 5.7 | B | 7.2 | B | 6.2 | B | 8.1 | B |
| Dry Film Thickness | | 100 μm | 2.3 | C | 2.2 | C | 2.6 | C | 2.3 | C | 2.5 | C |
| | | 125 μm | 0.0 | E | 0.0 | E | 0.0 | E | 0.0 | E | 0.0 | E |
| | | 150 μm | 0.3 | E | 0.4 | E | 0.3 | E | 0.4 | E | 0.4 | E |

TABLE 8

| | | | Comparative<br>Example 1 | | Comparative<br>Example 2 | |
|---|---|---|---|---|---|---|
| Topcoat Paint | Paint No.<br>Color Tone of<br>Coating Film | | Paint 14<br>Red | | Paint 15<br>Red | |
| | Target Dry Film<br>Thickness | | 125 μm | | 125 μm | |
| Undercoat Paint | Paint No.<br>Color Tone of<br>Coating Film | | Paint i<br>Silver | | Paint b<br>Red | |
| | | Dry Film<br>Thickness | ΔE | Hiding<br>Ability | ΔE | Hiding<br>Ability |
| Color Difference | | 0 μm | 36.0 | — | 35.0 | — |
| ΔE from Topcoat | | 25 μm | 14.0 | A | 0.7 | E |
| Antifouling Coating | | 50 μm | 5.0 | B | 0.4 | E |
| Film Having Target | | 75 μm | 2.5 | C | 0.2 | E |
| Dry Film Thickness | | 100 μm | 1.3 | D | 0.1 | E |
| | | 125 μm | 0.0 | E | 0.0 | E |
| | | 150 μm | 0.3 | E | 0.1 | E |

Figure 2:
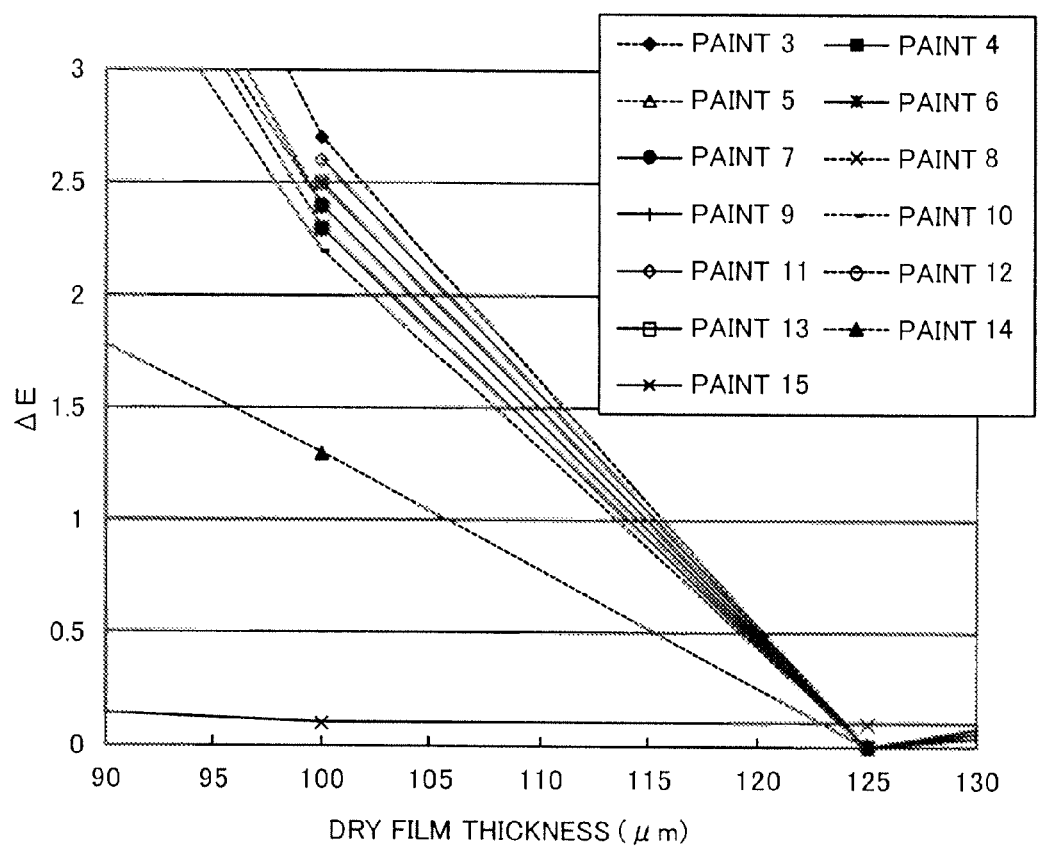
FIG. 2 is a diagram showing a part of FIG. 1 (in the vicinity of a target dry film thickness of 125 μm) in an enlarged view.

Table 9 summarizes ΔE1 of the colored antifouling paints (paints 1 to 15) in Examples 1 to 13 and Comparative Examples 1 to 2 (a color difference between the coating film formed from the colored antifouling paint having the target dry film thickness T and the coating film formed from the colored antifouling paint having the dry film thickness of 0.8 T), ΔE2 thereof (a color difference between the coating film formed from the colored antifouling paint having the target dry film thickness T and the coating film formed from the colored antifouling paint having the dry film thickness of 1.2 T), and color difference ΔE3 thereof (a color difference between the colored antifouling paint and the undercoat coating film) calculated based on the results shown in Tables 5 to 8 above. In addition, FIG. 1 shows a graph of relation between the dry film thickness and ΔE (a color difference between the topcoat antifouling coating film having each dry film thickness and the topcoat antifouling coating film having the target dry film thickness) of paints 3 to 15 shown in Tables 7 and 8, and FIG. 2 is a diagram showing a part of FIG. 1 (in the vicinity of the target dry film thickness of 125 μm) in an enlarged view.

TABLE 9

| | Paint No. | ΔE1 | ΔE2 | ΔE3 |
|---|---|---|---|---|
| Example 1 | Paint 1 | 2.4 | 0.2 | 14.0 |
| Example 2 | Paint 2 | 2.1 | 0.2 | 71.0 |
| Example 3 | Paint 3 | 2.7 | 0.2 | 71.0 |
| Example 4 | Paint 4 | 2.3 | 0.2 | 36.0 |
| Example 5 | Paint 5 | 2.4 | 0.3 | 42.0 |
| Example 6 | Paint 6 | 2.5 | 0.4 | 51.0 |
| Example 7 | Paint 7 | 2.4 | 0.3 | 67.0 |
| Example 8 | Paint 8 | 2.4 | 0.4 | 56.0 |
| Example 9 | Paint 9 | 2.3 | 0.3 | 64.0 |
| Example 10 | Paint 10 | 2.2 | 0.4 | 39.0 |
| Example 11 | Paint 11 | 2.6 | 0.3 | 69.0 |
| Example 12 | Paint 12 | 2.3 | 0.4 | 54.0 |
| Example 13 | Paint 13 | 2.5 | 0.4 | 80.0 |
| Comparative Example 1 | Paint 14 | 1.3 | 0.3 | 36.0 |
| Comparative Example 2 | Paint 15 | 0.1 | 0.1 | 35.0 |

As shown above, it can be seen that paints 1 to 13 according to Examples 1 to 13 are the colored antifouling paints excellent in film thickness determination function satisfying conditions (a) to (b) and (d) above. In particular, since ΔE1 is as great as 2.0 or more, dependence on a film thickness, of the color tone of the coating film just before painting is completed is great, and hence change in hiding performance just before painting is completed can easily visually be determined. According to the method of forming an antifouling coating film of the present invention employing such a colored antifouling paint excellent in film thickness determination function, a dry coating film having a target dry film thickness can extremely accurately be formed and even small shortage in film thickness can be avoided. On the other hand, paint 14 according to Comparative Example 1 has ΔE1 as small as 1.3, and therefore it is more difficult than paints 1 to 13 to visually determine change in hiding performance just before painting is completed. Paint 15 according to Comparative Example 2 hardly has the film thickness determination function.

Reference Examples 1 to 59 and Comparative Reference Examples 1 to 7

Antifouling paints were prepared by using hydrolyzable resin (i) obtained in Producing Examples S1 to S27 above [hydrolyzable resin compositions S1 to S18] or (ii) [hydrolyzable resin compositions S19 to S27] or resin compositions T1 to 15 obtained in Producing Examples T1 to T5 and other components shown in Tables 10 to 13 in accordance with a formulation (parts by mass) in Tables 10 to 13 and mixing the components with a high-speed disperser.

TABLE 10

| | | Reference Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Hydrolyzable Resin Composition or Resin Composition | S1 | 84.0 | | | | | | | | | | |
| | S2 | | 80.0 | | | | | | | | | 63.0 |
| | S3 | | | 88.5 | | | | | | | | |
| | S4 | | | | 73.5 | | | | | | | |
| | S5 | | | | | 70.0 | | | | | | |
| | S6 | | | | | | 88.0 | | | | 76.5 | |
| | S7 | | | | | | | 70.0 | | | | |
| | S8 | | | | | | | | 85.0 | | | |
| | S9 | | | | | | | | | 82.3 | | |
| Cuprous Oxide | | | | | | | | | | | | |
| Antifouling Agent 1 | | | | | | | | | | | | |
| Antifouling Agent 2 | | | | | | | | | | | | |
| Antifouling Agent 3 | | | | | | | | | | | | |
| Antifouling Agent 4 | | | | | | | | | | | | |
| Antifouling Agent 5 | | | | | | | | | | | | |
| Titanium Oxide | | | | | | | | | | | | |
| Yellow Iron Oxide | | | | | | | | | | | | |
| Azo-Based Red Pigment | | | | | | | | | | | | |
| Phthalocyanine Blue | | | | | | | | | | | | |
| Thermoplastic Resin 1 | | | | | | 16.5 | 20.0 | | | | | |
| Thermoplastic Resin 2 | | | 10.0 | | | | | | 20.0 | | | 15.0 |
| Thermoplastic Resin 3 | | 6.0 | | | | | | | | | | 12.0 |
| Thermoplastic Resin 4 | | | | | | | | 2.0 | | | | |
| Plasticizer 1 | | | | | | | | | | 5.0 | | |
| Plasticizer 2 | | | | | | | | | | | 13.5 | |
| Plasticizer 3 | | | | | | | | | | | 7.7 | |
| Plasticizer 4 | | | | 1.5 | | | | | | | | |
| Barium Sulfate | | | | | | | | | | | | |
| Anti-Settling Agent | | | | | | | | | | | | |
| Xylene | | 10.0 | 10.0 | 10.0 | 10.0 | 10.0 | 10.0 | 10.0 | 10.0 | 10.0 | 10.0 | 10.0 |
| Total | | 100.0 | 100.0 | 100.0 | 100.0 | 100.0 | 100.0 | 100.0 | 100.0 | 100.0 | 100.0 | 100.0 |
| Total Amount (Parts by Mass) of Thermoplastic Resin and Plasticizer with Respect to 100 Parts by Mass of Resin (Solid Content) | | 15.6 | 27.7 | 3.7 | 49.9 | 62.4 | 5.0 | 62.7 | 13.0 | 20.5 | 39.0 | 95.2 |

| | | Reference Example | | | | | | | |
|---|---|---|---|---|---|---|---|---|---|
| | | 12 | 13 | 14 | 15 | 16 | 17 | 18 | 19 |
| Hydrolyzable Resin Composition or Resin Composition | S1 | | | | | 68.0 | | | |
| | S2 | | | | | | | | |
| | S3 | | | | 55.0 | | | | |
| | S4 | 65.0 | | | | | 61.0 | | |
| | S5 | | | 76.5 | | | | | |
| | S6 | | | | | | | 62.0 | |
| | S7 | | 78.1 | | | | | | 68.0 |
| | S8 | | | | | | | | |
| | S9 | | | | | | | | |
| Cuprous Oxide | | | | | | 3.0 | | | |
| Antifouling Agent 1 | | | | | | | 2.0 | | 3.0 |
| Antifouling Agent 2 | | | | | | | | 2.0 | |
| Antifouling Agent 3 | | | | | | | 2.0 | | |
| Antifouling Agent 4 | | | | | 4.5 | | | 2.0 | |
| Antifouling Agent 5 | | | | 2.0 | | | | | 2.0 |
| Titanium Oxide | | | | | 2.0 | 2.0 | 2.0 | 2.0 | 2.0 |
| Yellow Iron Oxide | | | | | 1.0 | | | | |
| Azo-Based Red Pigment | | | | | 14.0 | 3.0 | | 4.0 | |

TABLE 10-continued

| | | | | | | | | |
|---|---|---|---|---|---|---|---|---|
| Phthalocyanine Blue | | | | | | | 4.0 | 4.0 |
| Thermoplastic Resin 1 | | 5.3 | | 10.0 | | | | 4.0 |
| Thermoplastic Resin 2 | | | | | 10.0 | | | |
| Thermoplastic Resin 3 | 14.0 | | | | | | 8.0 | |
| Thermoplastic Resin 4 | | | 5.0 | | | | | 11.0 |
| Plasticizer 1 | | | | 12.0 | | | | |
| Plasticizer 2 | | 4.6 | | | | | | 5.0 |
| Plasticizer 3 | | | 4.0 | | | | 8.0 | |
| Plasticizer 4 | 11.0 | | | | | | | |
| Barium Sulfate | | | | | | | 3.0 | |
| Anti-Settling Agent | | | | 2.0 | 2.0 | 2.0 | 2.0 | 2.0 |
| Xylene | 10.0 | 10.0 | 10.0 | 4.0 | 12.0 | 11.0 | 12.0 | 10.0 |
| Total | 100.0 | 100.0 | 100.0 | 100.0 | 100.0 | 100.0 | 100.0 | 100.0 |
| Total Amount (Parts by Mass) of Thermoplastic Resin and Plasticizer with Respect to 100 Parts by Mass of Resin (Solid Content) | 85.5 | 27.8 | 25.7 | 88.5 | 32.2 | 58.3 | 39.2 | 29.0 |

Unit: Parts by Mass

TABLE 11

| | | Reference Example | | | | | | | | | | |
|---|---|---|---|---|---|---|---|---|---|---|---|---|
| | | 20 | 21 | 22 | 23 | 24 | 25 | 26 | 27 | 28 | 29 | 30 |
| Hydrolyzable Resin Composition or Resin Composition | S10 | 85.0 | | | | | | | | | 84.0 | |
| | S11 | | 70.0 | | | | | | | | | 63.0 |
| | S12 | | | 70.0 | | | | | | | | |
| | S13 | | | | 88.0 | | | | | | | |
| | S14 | | | | | 80.0 | | | | | | |
| | S15 | | | | | | 82.3 | | | | | |
| | S16 | | | | | | | 73.5 | | | | |
| | S17 | | | | | | | | 76.5 | | | |
| | S18 | | | | | | | | | 88.5 | | |
| Cuprous Oxide | | | | | | | | | | | | |
| Antifouling Agent 1 | | | | | | | | | | | | |
| Antifouling Agent 2 | | | | | | | | | | | | |
| Antifouling Agent 3 | | | | | | | | | | | | |
| Antifouling Agent 4 | | | | | | | | | | | | |
| Antifouling Agent 5 | | | | | | | | | | | | |
| Titanium Oxide | | | | | | | | | | | | |
| Yellow Iron Oxide | | | | | | | | | | | | |
| Azo-Based Red Pigment | | | | | | | | | | | | |
| Phthalocyanine Blue | | | | | | | | | | | | |
| Thermoplastic Resin 1 | | | | 20.0 | | | | 16.5 | | | | |
| Thermoplastic Resin 2 | | | 20.0 | | | 10.0 | | | | | | 15.0 |
| Thermoplastic Resin 3 | | | | | | | | | | | 6.0 | 12.0 |
| Thermoplastic Resin 4 | | | | | 2.0 | | | | | | | |
| Plasticizer 1 | | 5.0 | | | | | | | | | | |
| Plasticizer 2 | | | | | | | | | 13.5 | | | |
| Plasticizer 3 | | | | | | | 7.7 | | | | | |
| Plasticizer 4 | | | | | | | | | | 1.5 | | |
| Barium Sulfate | | | | | | | | | | | | |
| Anti-Settling Agent | | | | | | | | | | | | |
| Xylene | | 10.0 | 10.0 | 10.0 | 10.0 | 10.0 | 10.0 | 10.0 | 10.0 | 10.0 | 10.0 | 10.0 |
| Total | | 100.0 | 100.0 | 100.0 | 100.0 | 100.0 | 100.0 | 100.0 | 100.0 | 100.0 | 100.0 | 100.0 |
| Total Amount (Parts by Mass) of Thermoplastic Resin and Plasticizer with Respect to 100 Parts by Mass of Resin (Solid Content) | | 12.7 | 62.0 | 61.6 | 5.0 | 27.4 | 20.6 | 49.2 | 38.7 | 3.7 | 15.5 | 92.8 |

| | | Reference Example | | | | | | | |
|---|---|---|---|---|---|---|---|---|---|
| | | 31 | 32 | 33 | 34 | 35 | 36 | 37 | 38 |
| Hydrolyzable Resin Composition or Resin | S10 | | | | | | 61.0 | | |
| | S11 | | | | | 68.0 | | | |
| | S12 | | | | | | | 62.0 | |
| | S13 | | | | 55.0 | | | | |

TABLE 11-continued

| Composition | | | | | | | | | |
|---|---|---|---|---|---|---|---|---|---|
| | S14 | | 78.1 | | | | | | 68.0 |
| | S15 | 65.0 | | | | | | | |
| | S16 | | | 76.5 | | | | | |
| | S17 | | | | | | | | |
| | S18 | | | | | | | | |
| Cuprous Oxide | | | | | | 3.0 | | | |
| Antifouling Agent 1 | | | | | | | 2.0 | | 3.0 |
| Antifouling Agent 2 | | | | | | | | 2.0 | |
| Antifouling Agent 3 | | | | | | | 2.0 | | |
| Antifouling Agent 4 | | | | 4.5 | | | | 2.0 | |
| Antifouling Agent 5 | | | 2.0 | | | | | | 2.0 |
| Titanium Oxide | | | | | 2.0 | 2.0 | 2.0 | 2.0 | 2.0 |
| Yellow Iron Oxide | | | | | 1.0 | | | | |
| Azo-Based Red Pigment | | | | | 14.0 | 3.0 | | 4.0 | |
| Phthalocyanine Blue | | | | | | | 4.0 | | 4.0 |
| Thermoplastic Resin 1 | | | 5.3 | | 10.0 | | | | 4.0 |
| Thermoplastic Resin 2 | | | | | | 10.0 | | | |
| Thermoplastic Resin 3 | | 14.0 | | | | | 8.0 | | |
| Thermoplastic Resin 4 | | | | 5.0 | | | | | |
| Plasticizer 1 | | | | | 12.0 | | | 11.0 | |
| Plasticizer 2 | | | 4.6 | | | | | | 5.0 |
| Plasticizer 3 | | | | 4.0 | | | 8.0 | | |
| Plasticizer 4 | | 11.0 | | | | | | | |
| Barium Sulfate | | | | | | | | 3.0 | |
| Anti-Settling Agent | | | | | 2.0 | 2.0 | 2.0 | 2.0 | 2.0 |
| Xylene | | 10.0 | 10.0 | 10.0 | 4.0 | 12.0 | 11.0 | 12.0 | 10.0 |
| Total | | 100.0 | 100.0 | 100.0 | 100.0 | 100.0 | 100.0 | 100.0 | 100.0 |
| Total Amount (Parts by Mass) of Thermoplastic Resin and Plasticizer with Respect to 100 Parts by Mass of Resin (Solid Content) | | 84.7 | 27.8 | 25.8 | 87.3 | 31.9 | 56.8 | 38.2 | 29.0 |

Unit: Parts by Mass

TABLE 12

| | | Reference Example | | | | | | | | | | | |
|---|---|---|---|---|---|---|---|---|---|---|---|---|---|
| | | 39 | 40 | 41 | 42 | 43 | 44 | 45 | 46 | 47 | 48 | 49 | 50 |
| Hydrolyzable Resin Composition or Resin Composition | S19 | 84.0 | | | | | | | | | | | |
| | S20 | | 76.5 | | | | | | | | | | |
| | S21 | | | 95.0 | | | | | | | | | |
| | S22 | | | | 88.5 | | | | | | | | |
| | S23 | | | | | 88.0 | | | | | | | |
| | S24 | | | | | | 82.3 | 95.0 | | | | | |
| | S25 | | | | | | | | 70.0 | | | | |
| | S26 | | | | | | | | | 70.0 | | | |
| | S27 | | | | | | | | | | 85.0 | | 80.0 |
| | | | | | | | | | | | | 73.5 | |
| Cuprous Oxide | | | | | | | | | | | | | |
| Antifouling Agent 1 | | | | | | | | | | | | | |
| Antifouling Agent 2 | | | | | | | | | | | | | |
| Antifouling Agent 3 | | | | | | | | | | | | | |
| Antifouling Agent 4 | | | | | | | | | | | | | |
| Antifouling Agent 5 | | | | | | | | | | | | | |
| Titanium Oxide | | | | | | | | | | | | | |
| Yellow Iron Oxide | | | | | | | | | | | | | |
| Azo-Based Red Pigment | | | | | | | | | | | | | |
| Phthalocyanine Blue | | | | | | | | | | | | | |
| Thermoplastic Resin 1 | | | | | | | | | 20.0 | | | 16.5 | |
| Thermoplastic Resin 2 | | | | | | | | | | 20.0 | | | 10.0 |
| Thermoplastic Resin 3 | | 6.0 | | | | | | | | | | | |
| Thermoplastic Resin 4 | | | | | 2.0 | | | | | | | | |
| Plasticizer 1 | | | | | | | | | | | 5.0 | | |
| Plasticizer 2 | | | 13.5 | | | | | | | | | | |
| Plasticizer 3 | | | | | | 7.7 | | | | | | | |

TABLE 12-continued

| | | | | | | | | | | | | |
|---|---|---|---|---|---|---|---|---|---|---|---|---|
| Plasticizer 4 | | | | | | | | | | | | |
| Barium Sulfate | | | 1.5 | | | | | | | | | |
| Anti-Settling Agent | | | | | | | | | | | | |
| Xylene | 10.0 | 10.0 | 5.0 | 10.0 | 10.0 | 10.0 | 5.0 | 10.0 | 10.0 | 10.0 | 10.0 | 10.0 |
| Total | 100.0 | 100.0 | 100.0 | 100.0 | 100.0 | 100.0 | 100.0 | 100.0 | 100.0 | 100.0 | 100.0 | 100.0 |
| Total Amount (Parts by Mass) of Thermoplastic Resin and Plasticizer with Respect to 100 Parts by Mass of Resin (Solid Content) | 14.3 | 35.5 | 0 | 3.3 | 4.3 | 17.4 | 0 | 60.4 | 55.2 | 10.7 | 49.2 | 22.7 |

| | | Reference Example | | | | | | | | |
|---|---|---|---|---|---|---|---|---|---|---|
| | | 51 | 52 | 53 | 54 | 55 | 56 | 57 | 58 | 59 |
| Hydrolyzable Resin Composition or Resin Composition | S19 | | | | | | | | | 68.0 |
| | S20 | | | | | | 68.0 | | | |
| | S21 | | | 78.1 | | | | | | |
| | S22 | 59.5 | | | | | | | | |
| | S23 | | | | 76.5 | | | | | |
| | S24 | | | | | 55.0 | | | | |
| | S25 | | 65.0 | | | | | | | |
| | S26 | | | | | | | 61.0 | | |
| | S27 | | | | | | | | 62.0 | |
| Cuprous Oxide | | | | | | | 3.0 | | | |
| Antifouling Agent 1 | | | | | | | | 2.0 | | 3.0 |
| Antifouling Agent 2 | | | | | | | | | 2.0 | |
| Antifouling Agent 3 | | | | | | | | 2.0 | | |
| Antifouling Agent 4 | | | | | 4.5 | | | 2.0 | | |
| Antifouling Agent 5 | | | | 2.0 | | | | | | 2.0 |
| Titanium Oxide | | | | | | 2.0 | 2.0 | 2.0 | 2.0 | 2.0 |
| Yellow Iron Oxide | | | | | | 1.0 | | | | |
| Azo-Based Red Pigment | | | | | | 14.0 | 3.0 | | 4.0 | |
| Phthalocyanine Blue | | | | | | | | 4.0 | | 4.0 |
| Thermoplastic Resin 1 | | | | 5.3 | | 10.0 | | | | 4.0 |
| Thermoplastic Resin 2 | | 15.0 | | | | | | | | |
| Thermoplastic Resin 3 | | 15.5 | 14.0 | | | | | 8.0 | | |
| Thermoplastic Resin 4 | | | | | 5.0 | | | | 11.0 | |
| Plasticizer 1 | | | | | | 12.0 | | | | |
| Plasticizer 2 | | | 4.6 | | | | | | | 5.0 |
| Plasticizer 3 | | | | | 4.0 | | 10.0 | 8.0 | | |
| Plasticizer 4 | | | 11.0 | | | | | | | |
| Barium Sulfate | | | | | | | | | 3.0 | |
| Anti-Settling Agent | | | | | | 2.0 | 2.0 | 2.0 | 2.0 | 2.0 |
| Xylene | | 10.0 | 10.0 | 10.0 | 10.0 | 4.0 | 12.0 | 11.0 | 12.0 | 10.0 |
| Total | | 100.0 | 100.0 | 100.0 | 100.0 | 100.0 | 100.0 | 100.0 | 100.0 | 100.0 |
| Total Amount (Parts by Mass) of Thermoplastic Resin and Plasticizer with Respect to 100 Parts by Mass of Resin (Solid Content) | | 97.6 | 74.3 | 25.1 | 21.9 | 84.6 | 29.6 | 47.6 | 38.9 | 26.4 |

Unit: Parts by Mass

TABLE 13

| | | Comparative Reference Example | | | | | | |
|---|---|---|---|---|---|---|---|---|
| | | 1 | 2 | 3 | 4 | 5 | 6 | 7 |
| Hydrolyzable Resin Composition or Resin Composition | T1 | 90.0 | | | | | | |
| | T2 | | 62.0 | | | | | |
| | T3 | | | 57.0 | | | | |
| | T4 | | | | 85.0 | | 72.0 | |
| | T5 | | | | | 55.0 | | 69.0 |
| Cuprous Oxide | | | | 5.0 | | | 3.0 | |
| Zinc White | | | 4.0 | | | | | |
| Antifouling Agent 1 | | | 2.0 | | | | | |
| Antifouling Agent 2 | | | | 2.0 | | | 2.0 | 2.0 |
| Antifouling Agent 3 | | | 2.0 | | | | | 2.0 |
| Antifouling Agent 4 | | | | 2.0 | | | | |
| Antifouling Agent 5 | | | | | | | | |
| Titanium Oxide | | | | 3.0 | | | 2.0 | |
| Azo-Based Red Pigment | | | | 2.0 | | | | |

TABLE 13-continued

| | Comparative Reference Example | | | | | | |
|---|---|---|---|---|---|---|---|
| | 1 | 2 | 3 | 4 | 5 | 6 | 7 |
| Phthalocyanine Blue | 2.0 | | | | | | 1.0 |
| Red Iron Oxide | 4.0 | 5.0 | | | | 6.0 | 3.0 |
| Thermoplastic Resin 1 | 5.0 | 5.0 | | | 15.0 | | 5.0 |
| Thermoplastic Resin 2 | | | | | | | |
| Thermoplastic Resin 3 | 3.0 | 3.0 | | | | | 3.0 |
| Thermoplastic Resin 4 | | | | | | | |
| Plasticizer 1 | | | | | 5.0 | | |
| Plasticizer 2 | | | | | | 20.0 | |

TABLE 13-continued

| | Comparative Reference Example | | | | | | |
|---|---|---|---|---|---|---|---|
| | 1 | 2 | 3 | 4 | 5 | 6 | 7 |
| Plasticizer 3 | | | | | | | |
| Plasticizer 4 | | 3.0 | 3.0 | 5.0 | | | |
| Barium Sulfate | | | | | | | |
| Anti-Settling Agent | | 2.0 | 2.0 | | | 2.0 | 2.0 |
| Xylene | 10.0 | 11.0 | 11.0 | 10.0 | 10.0 | 10.0 | 11.0 |
| Total | 100.0 | 100.0 | 100.0 | 100.0 | 100.0 | 100.0 | 100.0 |
| Total Amount (Parts by Mass) of Thermoplastic Resin and Plasticizer with Respect to 100 Parts by Mass of Resin (Solid Content) | 0 | 23 | 25 | 11.8 | 124.0 | 13.9 | 22.6 |

Unit: Parts by Mass

Details of each component shown in Tables 10 to 13 are as follows (a trade name and abbreviation other than those shown below are as in Table 4).

(1) Zinc white: "Zinc Oxide Type 2" manufactured by Sakai Chemical Industry Co., Ltd.

A long-term antifouling property, adhesiveness with an underlying substrate, resistance to cracking, and a polishing property of the antifouling coating film formed from each obtained antifouling paint above were evaluated in accordance with the evaluation method below. Tables 14 to 17 show evaluation results.

(1) Long-Term Antifouling Property

The obtained antifouling paint was applied to a blast plate, to which a rustproof paint had been applied in advance so that a dry film thickness of a coating film is 300 μm, and the blast plate was left in a room for 2 days and nights for drying. The test plate having the antifouling coating film was thus obtained. The obtained test plate was subjected to an organism adhesion test by using an experimental raft installed in Marine Research Laboratory of Nippon Paint Marine Coatings Co., Ltd. in Tamano, Okayama Prefecture and an antifouling property was evaluated. The number of months in the table shows a period during which the raft was immersed. In addition, a numeric value in the table shows a ratio (%) occupied by an area of adhesion of organisms in an area of the coating film (determination by visual inspection), and a ratio not higher than 15% was determined as pass.

(2) Adhesiveness with Underlying Substrate (Cross-Cut Adhesion Test)

A test plate A obtained by applying the obtained antifouling paint to a blast plate, to which a rustproof paint had been applied in advance so that a dry film thickness of a coating film is 150 μm and leaving the blast plate in a room for 2 days and night for drying, and a test plate B obtained by preparing a substrate obtained by immersing test plate A in sterilized and filtered seawater for three months and thereafter leaving the test plate in a room for 1 day and night for drying, applying to the surface of the coating film on the substrate the antifouling paint the same as that used for formation of the coating film so that a dry film thickness of a coating film is 150 μm, and leaving the substrate in a room for 2 days and nights for drying were used to conduct a cross-cut adhesion test in conformity with JIS K 5600.5.6 (a grid interval of 2 mm and the number of grids of 25). A numeric value in the table represents the results of the test as a score defined under the criteria below.

Evaluation score 10: Each cut is thin, opposing sides of the cut are smooth, and there is no peel-off at each intersection of cuts and at each corner of a square.

Evaluation score 8: There is slight peel-off at an intersection of cuts, there is no peel-off at each corner of a square, and an area of a missing portion is within 5% of the total area of a square.

Evaluation score 6: There is peel-off on opposing sides of a cut and at an intersection of the cuts, and an area of a missing portion occupies 5 to 15% of the total area of a square.

Evaluation score 4: There is peel-off across a great width due to a cut and an area of a missing portion occupies 15 to 35% of the total area of a square.

Evaluation score 2: A width of peel-off due to a cut is greater than in the case of evaluation score 4 and an area of a missing portion occupies 35 to 65% of the total area of a square.

Evaluation score 0: An area of peel-off occupies 65% or more of the total area of a square.

(3) Resistance to Cracking (a) Resistance to Cracking Against Immersion in Seawater (Evaluation of State of Coating Film After Immersion in Seawater)

A state of the coating film on the test plate after 6 months of a raft immersion period in the long-term antifouling property test above was observed visually and with rubbing, and then evaluated. A coating film in which no crack was observed was evaluated as A and a coating film in which a crack was observed was evaluated as B.

(b) Resistance to Cracking Against Repeated Drying and Wetting (Dry and Wet Alternating Test)

A test plate having the antifouling coating film was obtained by applying the obtained antifouling paint to a blast plate, to which a rustproof paint had been applied in advance so that a dry film thickness of a coating film is 300 μm and leaving the blast plate in a room for 2 days and nights for drying. The obtained test plate was immersed for 1 week in seawater at 40° C. followed by drying in a room for 1 week, and a dry and wet alternating test with this procedure being defined as 1 cycle was conducted 20 cycles at the maximum. If a crack is generated in the coating film during the test, the test was terminated at the time point of generation of a crack and the number of cycles at that time point is shown in the table. A plate having no crack after 20 cycles was evaluated as A.

(4) Polishing Property (Coating Film Consumption Amount (Polishing Speed) Test)

A test place having the antifouling coating film was obtained by applying the obtained antifouling paint to a blast plate, to which a rustproof paint had been applied in advance so that a dry film thickness of a coating film is 300 μm and leaving the blast plate in a room for 2 days and nights for drying. This test plate was bonded to a side surface of a cylinder having a diameter of 750 mm and a length of 1200 mm, the cylinder was continuously turned for 24 months at a peripheral speed of 15 knots in seawater, and an amount of consumption of the coating film on the test plate (a total amount of decrease in thickness of the coating film [μm]) was measured every three months.

TABLE 14

| | | Reference Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Long-Term Anti- | 3 Months | 0 | 0 | 0 | 0 | 0 | 0 | 0 | 0 | 0 | 0 | 0 |
| fouling Property | 6 Months | 0 | 0 | 0 | 0 | 0 | 0 | 0 | 0 | 0 | 0 | 0 |

TABLE 14-continued

| | | | | | | | | | | | | |
|---|---|---|---|---|---|---|---|---|---|---|---|---|
| [Organism Adhesion Area (%)] | 12 Months | 5 | 0 | 0 | 0 | 0 | 0 | 0 | 0 | 0 | 0 | 0 |
| | 18 Months | 10 | 0 | 5 | 5 | 0 | 0 | 0 | 5 | 0 | 0 | 0 |
| | 24 Months | 15 | 10 | 10 | 10 | 10 | 10 | 10 | 10 | 10 | 10 | 10 |
| Adhesiveness with Underlying Substrate (Cross-Cut Adhesion Test) | Test Plate A | 10 | 10 | 10 | 10 | 10 | 10 | 10 | 10 | 10 | 10 | 10 |
| | Test Plate B | 10 | 10 | 10 | 10 | 10 | 10 | 10 | 10 | 10 | 10 | 10 |
| Resistance to Cracking | Immersion in Seawater | A | A | A | A | A | A | A | A | A | A | A |
| | Repeated Drying and Wetting | A | A | A | A | A | A | A | A | A | A | A |
| Polishing Property [Amount of Consumption of Coating Film (μm)] | 3 Months | 13 | 15 | 14 | 31 | 35 | 17 | 27 | 42 | 51 | 19 | 19 |
| | 6 Months | 33 | 29 | 32 | 54 | 70 | 40 | 55 | 77 | 99 | 36 | 38 |
| | 9 Months | 48 | 41 | 51 | 73 | 104 | 61 | 74 | 108 | 140 | 52 | 56 |
| | 12 Months | 67 | 59 | 70 | 96 | 133 | 82 | 96 | 136 | 175 | 68 | 77 |
| | 15 Months | 85 | 72 | 89 | 121 | 161 | 103 | 121 | 161 | 216 | 83 | 96 |
| | 18 Months | 104 | 89 | 105 | 144 | 192 | 126 | 144 | 191 | 252 | 100 | 116 |
| | 21 Months | 127 | 105 | 123 | 170 | 220 | 149 | 169 | 217 | 291 | 118 | 139 |
| | 24 Months | 145 | 121 | 142 | 193 | 249 | 172 | 192 | 250 | — | 135 | 160 |

| | | Reference Example | | | | | | | |
|---|---|---|---|---|---|---|---|---|---|
| | | 12 | 13 | 14 | 15 | 16 | 17 | 18 | 19 |
| Long-Term Antifouling Property [Organism Adhesion Area (%)] | 3 Months | 0 | 0 | 0 | 0 | 0 | 0 | 0 | 0 |
| | 6 Months | 0 | 0 | 0 | 0 | 0 | 0 | 0 | 0 |
| | 12 Months | 0 | 0 | 0 | 0 | 0 | 0 | 0 | 0 |
| | 18 Months | 5 | 0 | 0 | 5 | 0 | 0 | 0 | 0 |
| | 24 Months | 10 | 0 | 0 | 10 | 0 | 0 | 0 | 0 |
| Adhesiveness with Underlying Substrate (Cross-Cut Adhesion Test) | Test Plate A | 10 | 10 | 10 | 10 | 10 | 10 | 10 | 10 |
| | Test Plate B | 10 | 10 | 10 | 10 | 10 | 10 | 101 | 0 |
| Resistance to Cracking | Immersion in Seawater | A | A | A | A | A | A | A | A |
| | Repeated Drying and Wetting | A | A | A | A | A | A | A | A |
| Polishing Property [Amount of Consumption of Coating Film (μm)] | 3 Months | 44 | 17 | 50 | 11 | 22 | 42 | 11 | 17 |
| | 6 Months | 77 | 33 | 99 | 22 | 46 | 73 | 26 | 34 |
| | 9 Months | 109 | 45 | 150 | 33 | 68 | 104 | 40 | 46 |
| | 12 Months | 143 | 58 | 191 | 42 | 86 | 136 | 53 | 59 |
| | 15 Months | 179 | 73 | 242 | 54 | 110 | 170 | 67 | 74 |
| | 18 Months | 211 | 87 | 293 | 67 | 134 | 200 | 82 | 88 |
| | 21 Months | 248 | 100 | — | 80 | 159 | 236 | 97 | 102 |
| | 24 Months | 281 | 115 | — | 92 | 179 | 267 | 112 | 117 |

TABLE 15

| | | Reference Example | | | | | | | | | | |
|---|---|---|---|---|---|---|---|---|---|---|---|---|
| | | 20 | 21 | 22 | 23 | 24 | 25 | 26 | 27 | 28 | 29 | 30 |
| Long-Term Antifouling Property [Organism Adhesion Area (%)] | 3 Months | 0 | 0 | 0 | 0 | 0 | 0 | 0 | 0 | 0 | 0 | 0 |
| | 6 Months | 0 | 0 | 0 | 0 | 0 | 0 | 0 | 0 | 0 | 0 | 0 |
| | 12 Months | 0 | 0 | 0 | 0 | 0 | 0 | 0 | 0 | 0 | 0 | 0 |
| | 18 Months | 10 | 0 | 0 | 0 | 0 | 0 | 0 | 0 | 0 | 10 | 0 |
| | 24 Months | 15 | 5 | 0 | 0 | 0 | 0 | 0 | 0 | 0 | 15 | 5 |
| Adhesiveness with Underlying Substrate (Cross-Cut Adhesion Test) | Test Plate A | 10 | 10 | 10 | 10 | 10 | 10 | 10 | 10 | 10 | 10 | 10 |
| | Test Plate B | 10 | 10 | 10 | 10 | 10 | 10 | 10 | 10 | 10 | 10 | 10 |
| Resistance to Cracking | Immersion in Seawater | A | A | A | A | A | A | A | A | A | A | A |
| | Repeated Drying and Wetting | A | A | A | A | A | A | A | A | A | A | A |
| Polishing Property [Amount of Consumption of Coating Film (μm)] | 3 Months | 12 | 13 | 43 | 23 | 18 | 21 | 30 | 29 | 30 | 19 | 18 |
| | 6 Months | 27 | 35 | 85 | 45 | 32 | 39 | 55 | 56 | 59 | 39 | 42 |
| | 9 Months | 43 | 54 | 127 | 67 | 45 | 57 | 79 | 83 | 86 | 57 | 61 |
| | 12 Months | 58 | 71 | 171 | 90 | 61 | 80 | 106 | 112 | 114 | 75 | 79 |
| | 15 Months | 71 | 89 | 212 | 114 | 79 | 98 | 132 | 139 | 142 | 94 | 99 |
| | 18 Months | 85 | 108 | 251 | 141 | 98 | 122 | 154 | 162 | 172 | 114 | 119 |
| | 21 Months | 101 | 126 | 292 | 165 | 117 | 143 | 179 | 185 | 200 | 136 | 138 |
| | 24 Months | 116 | 145 | — | 188 | 133 | 164 | 204 | 213 | 228 | 153 | 158 |

TABLE 15-continued

|  |  | Reference Example |  |  |  |  |  |  |  |
|---|---|---|---|---|---|---|---|---|---|
|  |  | 31 | 32 | 33 | 34 | 35 | 36 | 37 | 38 |
| Long-Term Antifouling Property [Organism Adhesion Area (%)] | 3 Months | 0 | 0 | 0 | 0 | 0 | 0 | 0 | 0 |
|  | 6 Months | 0 | 0 | 0 | 0 | 0 | 0 | 0 | 0 |
|  | 12 Months | 0 | 0 | 0 | 0 | 0 | 0 | 0 | 0 |
|  | 18 Months | 0 | 0 | 0 | 0 | 0 | 0 | 0 | 0 |
|  | 24 Months | 0 | 0 | 0 | 0 | 0 | 0 | 0 | 0 |
| Adhesiveness with Underlying Substrate (Cross-Cut Adhesion Test) | Test Plate A | 10 | 10 | 10 | 10 | 10 | 10 | 10 | 10 |
|  | Test Plate B | 10 | 10 | 10 | 10 | 10 | 10 | 10 | 10 |
| Resistance to Cracking | Immersion in Seawater | A | A | A | A | A | A | A | A |
|  | Repeated Drying and Wetting | A | A | A | A | A | A | A | A |
| Polishing Property [Amount of Consumption of Coating Film (μm)] | 3 Months | 21 | 14 | 37 | 16 | 16 | 15 | 40 | 14 |
|  | 6 Months | 38 | 24 | 69 | 30 | 37 | 30 | 79 | 24 |
|  | 9 Months | 57 | 34 | 102 | 43 | 53 | 46 | 118 | 34 |
|  | 12 Months | 78 | 46 | 137 | 58 | 69 | 61 | 158 | 47 |
|  | 15 Months | 97 | 59 | 170 | 73 | 85 | 75 | 199 | 60 |
|  | 18 Months | 117 | 73 | 198 | 89 | 103 | 92 | 240 | 74 |
|  | 21 Months | 139 | 86 | 230 | 103 | 121 | 107 | 281 | 88 |
|  | 24 Months | 158 | 100 | 262 | 118 | 138 | 122 | — | 102 |

TABLE 16

|  |  | Reference Example |  |  |  |  |  |  |  |  |  |  |  |
|---|---|---|---|---|---|---|---|---|---|---|---|---|---|
|  |  | 39 | 40 | 41 | 42 | 43 | 44 | 45 | 46 | 47 | 48 | 49 | 50 |
| Long-Term Antifouling Property [Organism Adhesion Area (%)] | 3 Months | 0 | 0 | 0 | 0 | 0 | 0 | 0 | 0 | 0 | 0 | 0 | 0 |
|  | 6 Months | 0 | 0 | 0 | 0 | 0 | 0 | 0 | 0 | 0 | 0 | 0 | 0 |
|  | 12 Months | 0 | 0 | 0 | 0 | 0 | 0 | 0 | 0 | 0 | 0 | 0 | 0 |
|  | 18 Months | 0 | 0 | 0 | 0 | 0 | 0 | 0 | 0 | 0 | 0 | 0 | 0 |
|  | 24 Months | 0 | 0 | 0 | 0 | 0 | 0 | 0 | 0 | 0 | 0 | 0 | 0 |
| Adhesiveness with Underlying Substrate (Cross-Cut Adhesion Test) | Test Plate A | 10 | 10 | 10 | 10 | 10 | 10 | 10 | 10 | 10 | 10 | 10 | 10 |
|  | Test Plate B | 10 | 10 | 10 | 10 | 10 | 10 | 10 | 10 | 10 | 10 | 10 | 10 |
| Resistance to Cracking | Immersion in Seawater | A | A | A | A | A | A | A | A | A | A | A | A |
|  | Repeated Drying and Wetting | A | A | A | A | A | A | A | A | A | A | A | A |
| Polishing Property [Amount of Consumption of Coating Film (μm)] | 3 Months | 22 | 23 | 28 | 15 | 15 | 13 | 14 | 18 | 17 | 14 | 17 | 17 |
|  | 6 Months | 47 | 41 | 51 | 39 | 33 | 29 | 32 | 39 | 42 | 30 | 37 | 36 |
|  | 9 Months | 65 | 63 | 79 | 61 | 51 | 46 | 51 | 59 | 68 | 46 | 58 | 55 |
|  | 12 Months | 82 | 85 | 106 | 79 | 68 | 63 | 69 | 79 | 88 | 61 | 77 | 73 |
|  | 15 Months | 103 | 106 | 133 | 99 | 86 | 80 | 88 | 100 | 111 | 77 | 97 | 92 |
|  | 18 Months | 120 | 125 | 156 | 115 | 103 | 95 | 105 | 121 | 129 | 93 | 117 | 112 |
|  | 21 Months | 138 | 144 | 180 | 134 | 121 | 109 | 120 | 142 | 150 | 109 | 137 | 131 |
|  | 24 Months | 154 | 164 | 205 | 150 | 139 | 124 | 136 | 164 | 169 | 125 | 158 | 150 |

|  |  | Reference Example |  |  |  |  |  |  |  |  |
|---|---|---|---|---|---|---|---|---|---|---|
|  |  | 51 | 52 | 53 | 54 | 55 | 56 | 57 | 58 | 59 |
| Long-Term Antifouling Property [Organism Adhesion Area (%)] | 3 Months | 0 | 0 | 0 | 0 | 0 | 0 | 0 | 0 | 0 |
|  | 6 Months | 0 | 0 | 0 | 0 | 0 | 0 | 0 | 0 | 0 |
|  | 12 Months | 0 | 0 | 0 | 0 | 0 | 0 | 0 | 0 | 0 |
|  | 18 Months | 0 | 0 | 0 | 0 | 0 | 0 | 0 | 0 | 0 |
|  | 24 Months | 0 | 0 | 0 | 0 | 0 | 0 | 0 | 0 | 0 |
| Adhesiveness with Underlying Substrate (Cross-Cut Adhesion Test) | Test Plate A | 10 | 10 | 10 | 10 | 10 | 10 | 10 | 10 | 10 |
|  | Test Plate B | 10 | 10 | 10 | 10 | 10 | 10 | 10 | 10 | 10 |
| Resistance to Cracking | Immersion in Seawater | A | A | A | A | A | A | A | A | A |
|  | Repeated Drying and Wetting | A | A | A | A | A | A | A | A | A |
| Polishing Property [Amount of Consumption of | 3 Months | 23 | 10 | 14 | 14 | 16 | 24 | 13 | 15 | 21 |
|  | 6 Months | 50 | 25 | 36 | 30 | 36 | 43 | 28 | 33 | 45 |
|  | 9 Months | 77 | 40 | 55 | 48 | 56 | 66 | 42 | 51 | 62 |

TABLE 16-continued

| | | | | | | | | | | |
|---|---|---|---|---|---|---|---|---|---|---|
| Coating Film (μm)] | 12 Months | 102 | 51 | 72 | 66 | 75 | 90 | 56 | 68 | 78 |
| | 15 Months | 129 | 64 | 90 | 84 | 94 | 113 | 71 | 86 | 98 |
| | 18 Months | 154 | 75 | 105 | 100 | 113 | 133 | 86 | 104 | 114 |
| | 21 Months | 182 | 87 | 122 | 114 | 133 | 154 | 100 | 122 | 131 |
| | 24 Months | 209 | 98 | 137 | 130 | 153 | 174 | 115 | 140 | 146 |

TABLE 17

| | | Comparative Reference Example | | | | | | |
|---|---|---|---|---|---|---|---|---|
| | | 1 | 2 | 3 | 4 | 5 | 6 | 7 |
| Long-Term Anti- | 3 Months | 60 | 10 | 0 | 40 | 30 | 0 | 0 |
| fouling Property | 6 Months | 100 | 40 | 30 | 80 | 70 | 0 | 10 |
| [Organism | 12 Months | 100 | 80 | 70 | 100 | 90 | 50 | 30 |
| Adhesion | 18 Months | 100 | 100 | 100 | 100 | 100 | 80 | 50 |
| Area (%)] | 24 Months | 100 | 100 | 100 | 100 | 100 | 100 | 70 |
| Adhesiveness with | Test | 0 | 10 | 10 | 8 | 4 | 8 | 10 |
| Underlying Substrate | Plate A | | | | | | | |
| (Cross-Cut | Test | 0 | 10 | 10 | 8 | 4 | 8 | 10 |
| Adhesion Test) | Plate B | | | | | | | |
| Resistance to | Immersion | B | A | A | B | A | B | A |
| Cracking | in Seawater | | | | | | | |
| | Repeated | 10 | A | A | 16 | A | 16 | A |
| | Drying and | | | | | | | |
| | Wetting | | | | | | | |
| Polishing | 3 Months | 0 | 19 | 82 | 32 | 8 | 20 | 19 |
| Property | 6 Months | 0 | 35 | 99 | 57 | 20 | 45 | 35 |
| [Amount of | 9 Months | 0 | 51 | 111 | 79 | 31 | 67 | 51 |
| Consumption of | 12 Months | 0 | 71 | 124 | 101 | 40 | 89 | 71 |
| Coating Film | 15 Months | 0 | 89 | 127 | 127 | 50 | 115 | 89 |
| (μm)] | 18 Months | 0 | 107 | 129 | 168 | 58 | 156 | 107 |
| | 21 Months | 0 | 127 | 134 | 222 | 67 | 210 | 127 |
| | 24 Months | 0 | 144 | 137 | 272 | 75 | 260 | 144 |

As shown in Tables 14 to 17, the antifouling coating film obtained from the antifouling paint in the reference example containing hydrolyzable resin (i) or (ii) is excellent in a long-term antifouling property, adhesiveness with an underlying substrate, and resistance to cracking. On the other hand, the antifouling coating film obtained from the antifouling paint in the comparative reference example was not sufficient in a long-term antifouling property, and some were poor in resistance to cracking or adhesiveness with an underlying substrate.

The invention claimed is:

1. A method of forming an antifouling coating film on a surface of an object to be coated, comprising the steps of:

[1] preparing a colored antifouling paint containing a hydrolyzable resin and a color pigment and satisfying such conditions that (a) a coating film formed from said colored antifouling paint having a target dry film thickness T completely hides the surface of said object to be coated, (b) a color difference ΔE1 between the coating film formed from said colored antifouling paint having the target dry film thickness T and a coating film formed from said colored antifouling paint having a dry film thickness of 0.8 T is equal to or greater than 2.0, and (c) said hydrolyzable resin contains a hydrolyzable resin (ii); and

[2] coating the surface of said object to be coated with said colored antifouling paint until the surface of said object to be coated is completely hidden by the coating film formed from said colored antifouling paint, said hydrolyzable resin (ii) being a hydrolyzable resin having at least one type of a silicon-containing group selected from the group consisting of a group expressed in a general formula (I)

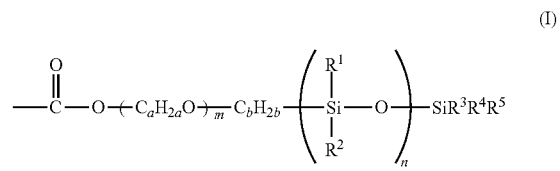

[where a and b each independently represent an integer from 2 to 5, m represents an integer from 0 to 50, n represents an integer from 3 to 80, and $R^1$ to $R^5$ each independently represent an alkyl group, an alkoxy group, a phenyl group, a substituted phenyl group, a phenoxy group, or a substituted phenoxy group], a group expressed in a general formula (II)

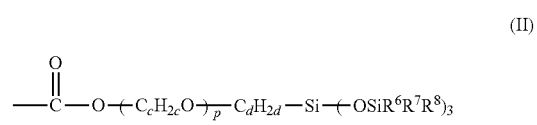

[where c and d each independently represent an integer from 2 to 5, p represents an integer from 0 to 50, and $R^6$, $R^7$, and $R^8$ each independently represent an alkyl group, $R^a$, or $R^b$, with $R^a$ being

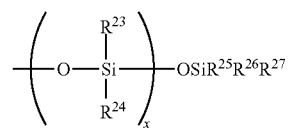

(where x represents an integer from 0 to 20 and $R^{23}$ to $R^{27}$ are identical or different and represent an alkyl group), with $R^b$ being

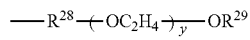

(where y represents an integer from 1 to 20 and $R^{28}$ and $R^{29}$ are identical or different and represent an alkyl group)], a group expressed in a general formula (III)

(III)

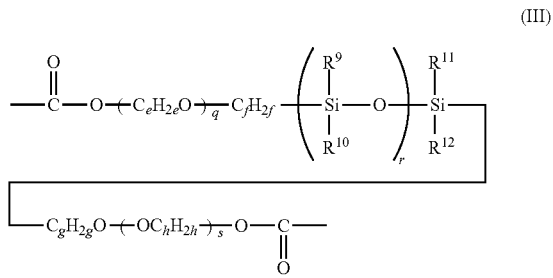

[where e, f, g, and h each independently represent an integer from 2 to 5, q and s each independently represent an integer from 0 to 50, r represents an integer from 3 to 80, and $R^9$ to $R^{12}$ each independently represent an alkyl group, an alkoxy group, a phenyl group, a substituted phenyl group, a phenoxy group, or a substituted phenoxy group], and a group expressed in a general formula (IV)

(IV)

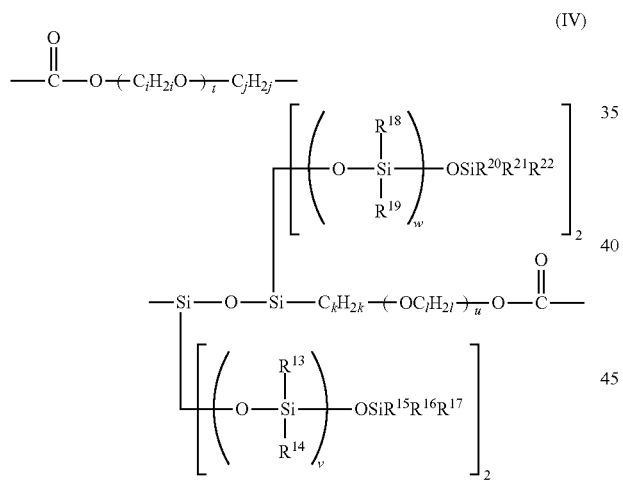

[where i, j, k, and l each independently represent an integer from 2 to 5, t and u each independently represent an integer from 0 to 50, v and w each independently represent an integer from 0 to 20, and $R^{13}$ to $R^{22}$ are identical or different and represent an alkyl group], and a triorganosilyloxy carbonyl group expressed in a general formula (V)

(V)

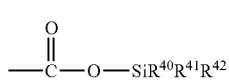

[where $R^{40}$, $R^{41}$, and $R^{42}$ are identical or different and represent a hydrocarbon residue having a carbon number from 1 to 20], wherein said color pigment is 0.3 to 30 mass % of the solid content of the colored antifouling paint, wherein said hydrolyzable resin (ii) includes a constitutional unit derived from at least one type of a silicon-containing polymerizable monomer (a) selected from the group consisting of a monomer (a1) expressed in a general formula (I') below, a monomer (a2) expressed in a general formula II' below, a monomer (a3), expressed in a general formula (III') below, and a monomer (a4) expressed in a general formula (IV') below and a constitutional unit derived from triorganosilyl(meth)acrylate (c) expressed in a general formula (V') below (I')

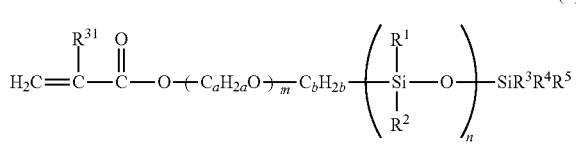

[where $R^{31}$ represents a hydrogen atom or a methyl group, and a, b, m, n, and $R^1$ to $R^5$ represent meaning as described previously]

(II')

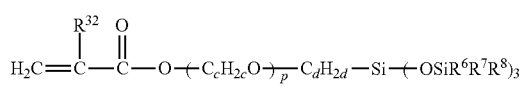

[where $R^{32}$ represents a hydrogen atom or a methyl group, and c, d, p, and $R^6$ to $R^8$ represent meaning as described previously]

(III')

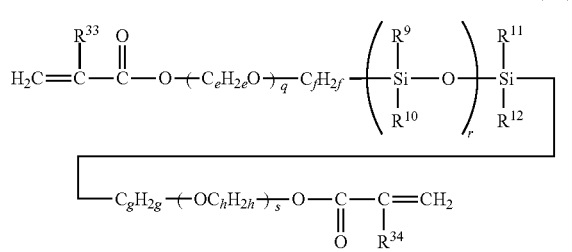

[where $R^{33}$ and $R^{34}$ represent a hydrogen atom or a methyl group, and e, f, g, h, q, r, s, and $R^9$ to $R^{12}$ represent meaning as described previously]

(IV')

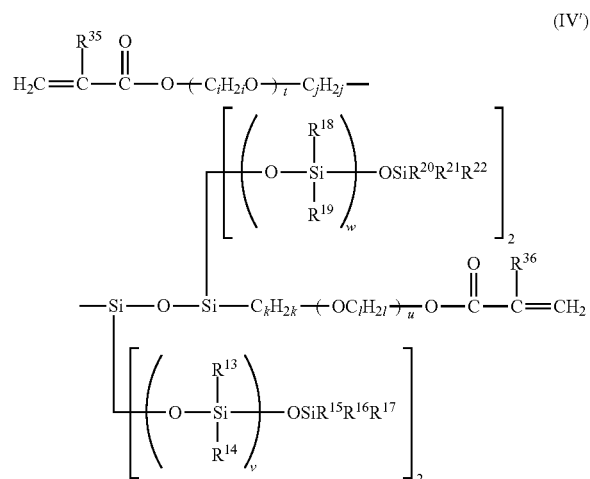

[where $R^{35}$ and $R^{36}$ represent a hydrogen atom or a methyl group, and i, j, k, l, t, u, v, w, and $R^{13}$ to $R^{22}$ represent meaning as described previously]

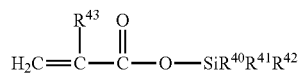

(V')

[where $R^{43}$ represents a hydrogen atom or a methyl group and $R^{40}$ to $R^{42}$ represent meaning as described previously], and wherein the ratio between the content of the constituent unit derived from said silicon-containing polymerizable monomer (a) and the content of the constituent unit derived from said triorganosilyl(meth)acrylate (c) is within the range of 20/80 to 80/20 by mass ratio.

2. The method of forming an antifouling coating film according to claim 1, wherein
said color difference ΔE1 is not smaller than 2.5.

3. The method of forming an antifouling coating film according to claim 1, wherein
said colored antifouling paint satisfies such a condition (d) that a color difference ΔE2 between the coating film formed from said colored antifouling paint having the target dry film thickness T and a coating film formed from said colored antifouling paint having a dry film thickness of 1.2 T is less than 1.

4. The method of forming an antifouling coating film according to claim 3, wherein
said color difference ΔE2 is not greater than 0.5.

5. The method of forming an antifouling coating film according to claim 1, wherein
said hydrolyzable resin (ii) further has at least one type of metal-atom-containing group selected from the group consisting of groups expressed in general formulae (VI) and (VII)

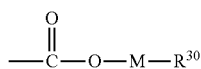

(VI)

[where M represents a divalent metal atom and $R^{30}$ represents an organic acid residue or an alcohol residue]

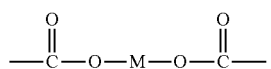

(VII)

[where M represents a divalent metal atom].

6. The method of forming an antifouling coating film according to claim 1, wherein
said hydrolyzable resin (ii) further includes a constitutional unit derived from at least one type of a metal-atom-containing polymerizable monomer (b) selected from the group consisting of a monomer (b1) expressed in a general formula (VI') below and a monomer (b2) expressed in a general formula (VII') below

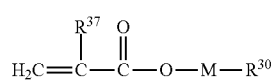

(VI')

[where $R^{37}$ represents a hydrogen atom or a methyl group and M and $R^{30}$ represent meaning as described previously]

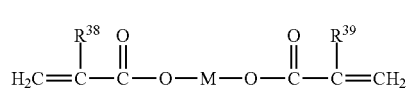

(VII')

[where $R^{38}$ and $R^{39}$ represent a hydrogen atom or a methyl group and M represents meaning as described previously].

7. The method of forming an antifouling coating film according to claim 1, wherein
said colored antifouling paint further contains an antifouling agent, and
a content of said antifouling agent is equal to or lower than 10 mass % in a paint solid content.

8. The method of forming an antifouling coating film according to claim 1, wherein
said colored antifouling paint further contains a thermoplastic resin and/or a plasticizer, and
a total content of said thermoplastic resin and said plasticizer is 3 to 100 parts by mass with respect to 100 parts by mass of said hydrolyzable resin.

9. The method of forming an antifouling coating film according to claim 1, wherein
said colored antifouling paint is prepared by mixing two or more types of antifouling paints satisfying said conditions (a) to (c), and
said two or more types of antifouling paints are different from one another in content of the color pigment.

10. The method of forming an antifouling coating film according to claim 1, wherein
said object to be coated has an undercoat coating film formed from an anti-corrosive paint or an antifouling paint on its surface, and a surface of said undercoat coating film is coated with said colored antifouling paint.

11. The method of forming an antifouling coating film according to claim 1, wherein
said object to be coated is made of steel, plastic, or concrete.

\* \* \* \* \*